(12) United States Patent
Kishi et al.

(10) Patent No.: US 8,573,654 B2
(45) Date of Patent: Nov. 5, 2013

(54) PIPE JOINT

(75) Inventors: Shozo Kishi, Hyogo (JP); Yoshinori Itani, Hyogo (JP); Kohei Ikeda, Hyogo (JP); Takashi Yokomizo, Hyogo (JP); Takaaki Kagawa, Hyogo (JP)

(73) Assignee: Kubota Corporation, Osaka (JP)

( * ) Notice: Subject to any disclaimer, the term of this patent is extended or adjusted under 35 U.S.C. 154(b) by 133 days.

(21) Appl. No.: 13/146,256

(22) PCT Filed: Jan. 22, 2010

(86) PCT No.: PCT/JP2010/050755
§ 371 (c)(1),
(2), (4) Date: Jul. 26, 2011

(87) PCT Pub. No.: WO2010/087275
PCT Pub. Date: Aug. 5, 2010

(65) Prior Publication Data
US 2011/0278835 A1 Nov. 17, 2011

(30) Foreign Application Priority Data

| Jan. 27, 2009 | (JP) | 2009-014835 |
| Jan. 27, 2009 | (JP) | 2009-014836 |
| Jan. 27, 2009 | (JP) | 2009-014838 |
| Apr. 30, 2009 | (JP) | 2009-110223 |
| May 13, 2009 | (JP) | 2009-116035 |
| May 14, 2009 | (JP) | 2009-117098 |
| May 18, 2009 | (JP) | 2009-119368 |
| Jun. 10, 2009 | (JP) | 2009-138737 |
| Jun. 23, 2009 | (JP) | 2009-148148 |
| Sep. 11, 2009 | (JP) | 2009-209878 |
| Sep. 14, 2009 | (JP) | 2009-211170 |
| Oct. 8, 2009 | (JP) | 2009-234064 |
| Oct. 14, 2009 | (JP) | 2009-236788 |
| Oct. 23, 2009 | (JP) | 2009-243942 |

(51) Int. Cl.
*F16L 17/00* (2006.01)

(52) U.S. Cl.
USPC .......................................... 285/374; 285/110

(58) Field of Classification Search
USPC .......... 285/110, 108, 345, 344, 374, 403, 404
See application file for complete search history.

(56) References Cited

U.S. PATENT DOCUMENTS 5,613,714 A * 3/1997 Toshima et al. ................. 285/39

FOREIGN PATENT DOCUMENTS

| EP | 0 748 973 | 12/1996 |
| JP | 52-17124 | 4/1977 |

(Continued)

OTHER PUBLICATIONS

Int'l Search Report from corresponding Int'l Patent Application No. PCT/JP2010/050755, 4 Pages.

*Primary Examiner* — Aaron Dunwoody
(74) *Attorney, Agent, or Firm* — Kusner & Jaffe

(57) ABSTRACT

An annular sealing material seals a pipe joint between a socket and a spigot. The sealing material includes a bulb part which is composed of a first bulb, a second bulb located closer to the inner side of the socket than the first bulb, and a narrow part present between the first and second bulbs. The first bulb is pressed against the inner circumferential surface of the socket. The second bulb is pressed against the outer peripheral surface of the spigot. The second bulb is inclined towards the pipe center from the first bulb in a natural state before it is provided between the socket and the spigot. The inner diameter of the second bulb is smaller than the outer diameter of the spigot in the natural state. The second bulb is extensible in the pipe diameter direction due to elastic deformation of the narrow part.

4 Claims, 51 Drawing Sheets

(56) References Cited

FOREIGN PATENT DOCUMENTS

| | | |
|---|---|---|
| JP | 57-51088 | 3/1982 |
| JP | 64-45083 | 3/1989 |
| JP | 03-009598 | 3/1991 |
| JP | 4-90790 | 8/1992 |
| JP | 05-026384 | 2/1993 |
| JP | 05-231570 | 9/1993 |
| JP | 05231570 A * | 9/1993 |
| JP | 05231572 A * | 9/1993 |
| JP | 06137472 A * | 5/1994 |
| JP | 06-069574 | 9/1994 |
| JP | 7-38871 | 7/1995 |
| JP | 07-280147 | 10/1995 |
| JP | 08-312848 | 11/1996 |
| JP | 10-038157 | 2/1998 |
| JP | 2001-279420 | 10/2001 |
| JP | 2001-295969 | 10/2001 |
| JP | 2002-310354 | 10/2002 |
| JP | 2003-106485 | 4/2003 |
| JP | 2003-161393 | 6/2003 |
| JP | 2003-240170 | 8/2003 |
| JP | 2004-197875 | 7/2004 |
| JP | 2004-270190 | 9/2004 |
| JP | 2004-340228 | 12/2004 |
| JP | 2006-057728 | 3/2006 |
| JP | 2006-170296 | 6/2006 |
| JP | 2006-322611 | 11/2006 |
| JP | 2007-292268 | 11/2007 |
| JP | 2008-039122 | 2/2008 |
| JP | 2008-196607 | 8/2008 |
| JP | 2008-298155 | 12/2008 |
| JP | 2008-309252 | 12/2008 |
| JP | 2008-309276 | 12/2008 |

* cited by examiner

F I G. 4
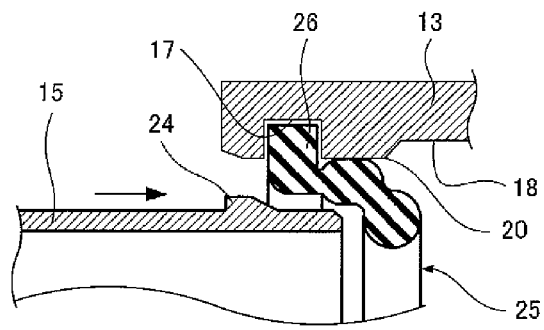
F I G. 5
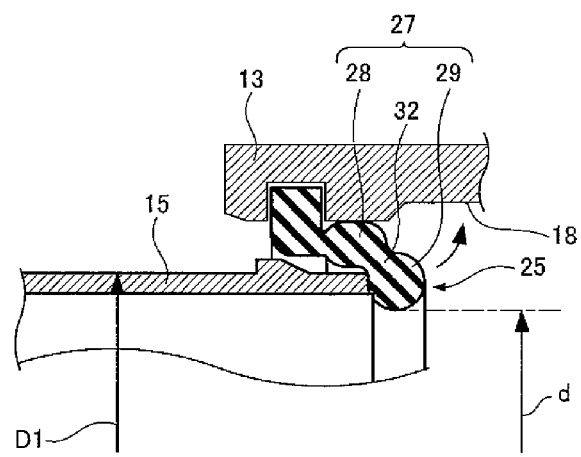
F I G. 6
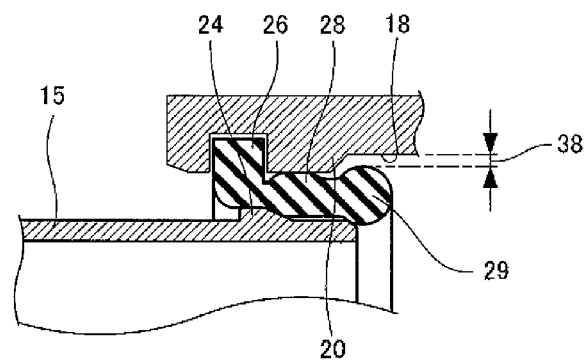

F I G. 1 5
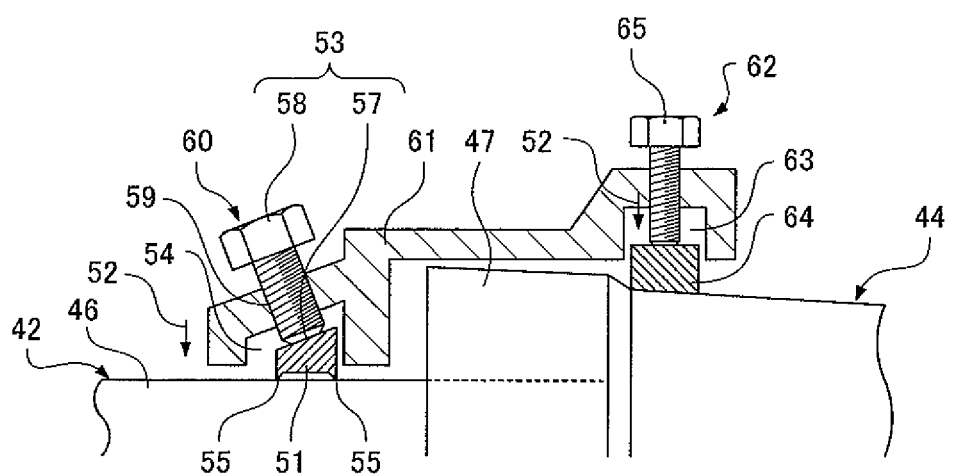

F I G. 4 9
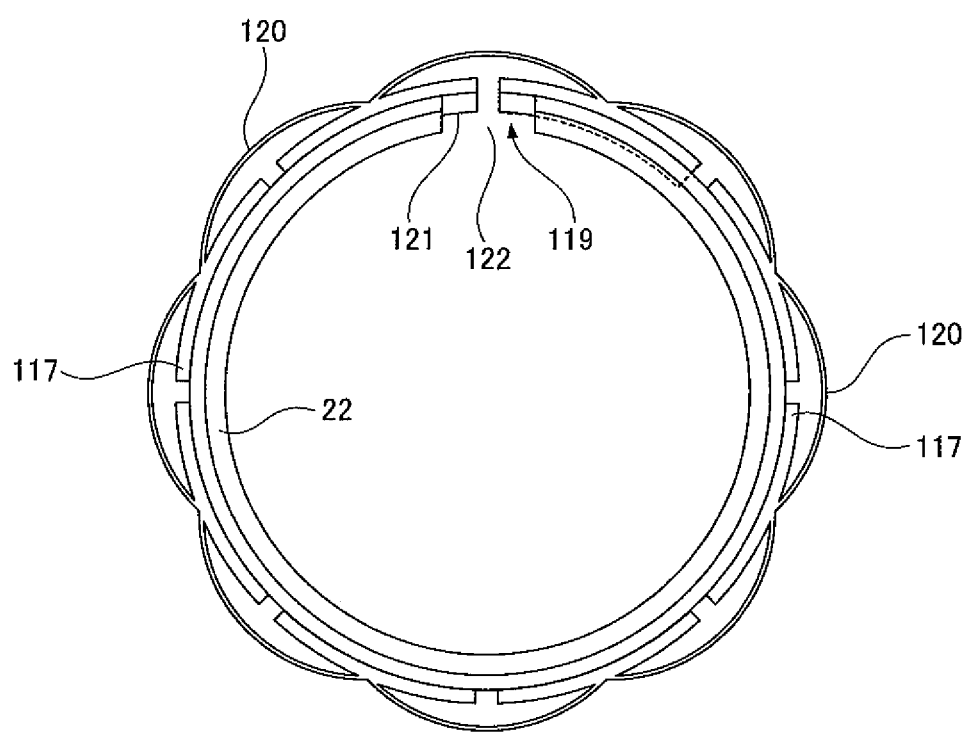

F I G. 7 0
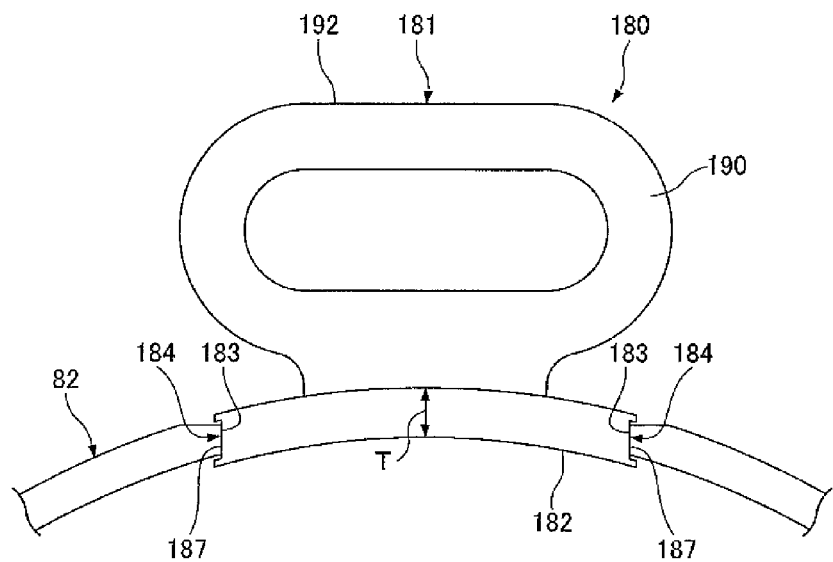
F I G. 7 1
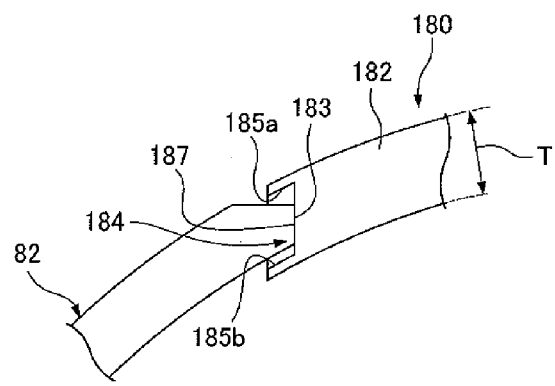

F I G. 7 5
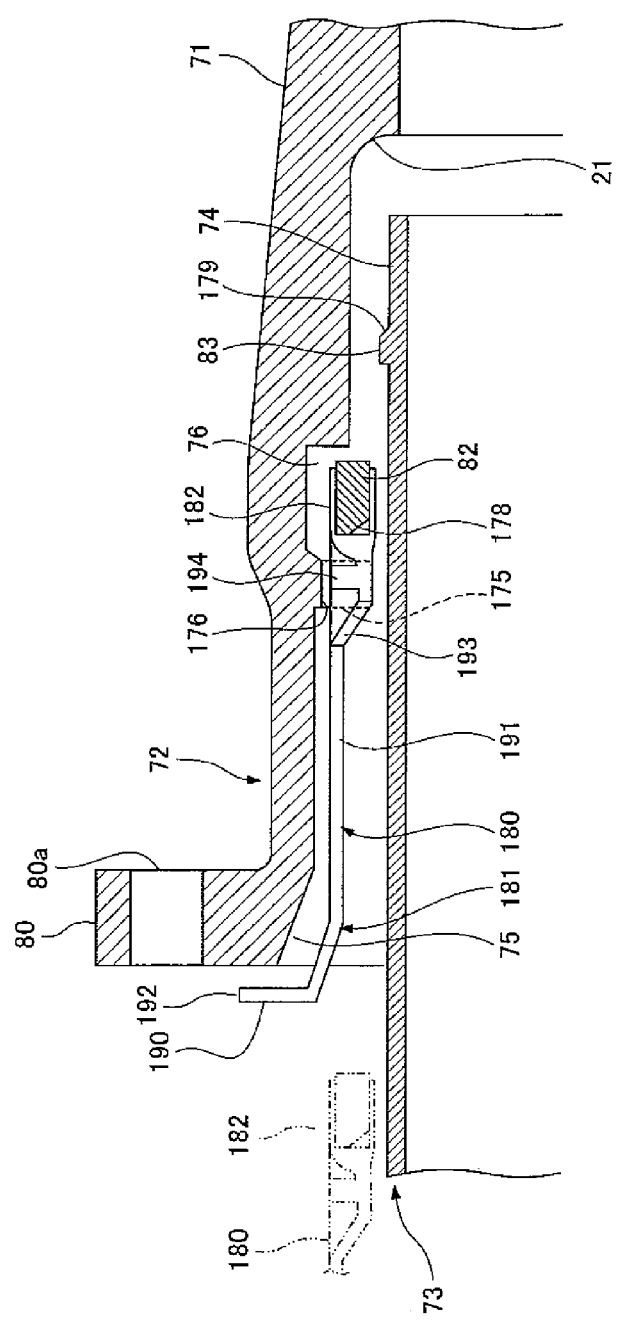

F I G. 7 7
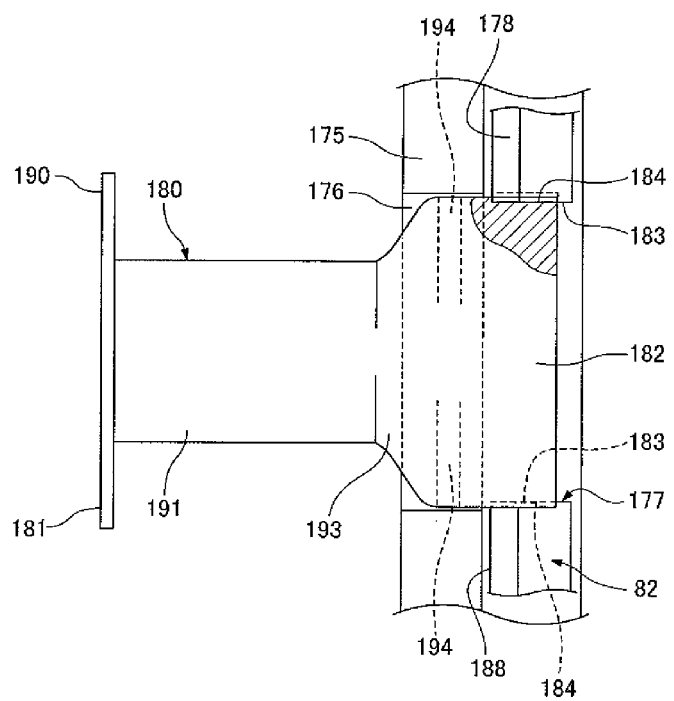
F I G. 7 8
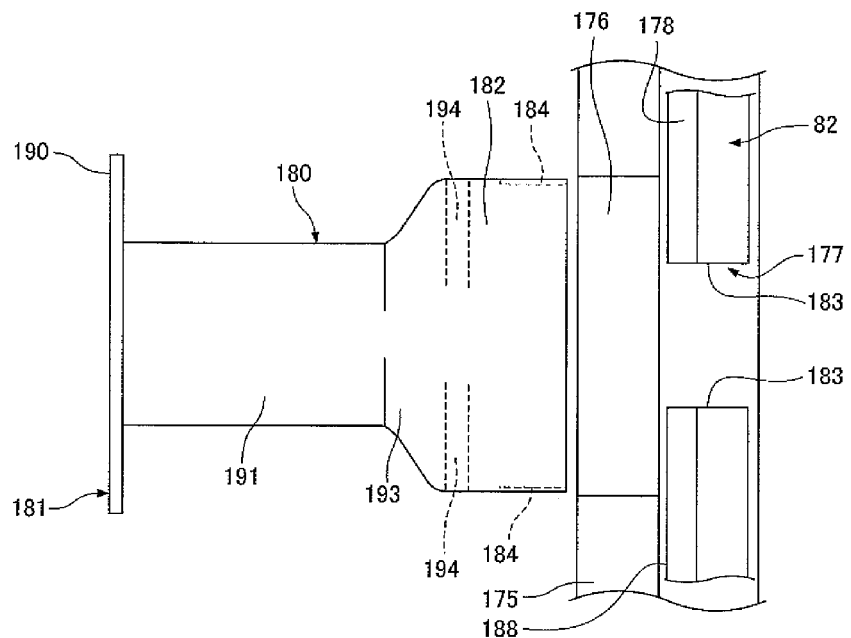

F I G. 7 9
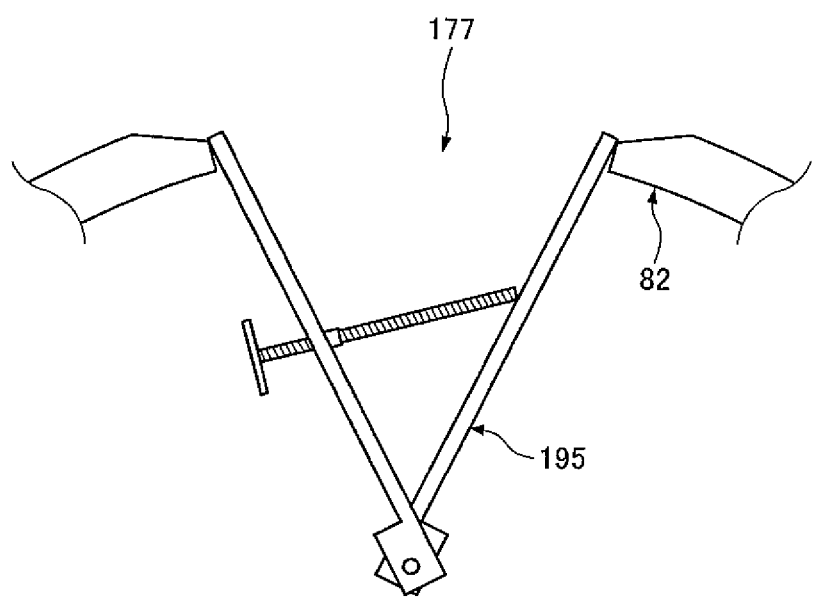

PIPE JOINT

RELATED APPLICATIONS

This application is a U.S. National Stage Application of International Application No. PCT/JP10/50755, filed Jan. 22, 2010, which claims priority from Japanese Patent Application No. 2009-014838, filed Jan. 27, 2009; Japanese Patent Application No. 2009-014836, filed Jan. 27, 2009; Japanese Patent Application No. 2009-014835, filed Jan. 27, 2009; Japanese Patent Application No. 2009-110223, filed Apr. 30, 2009; Japanese Patent Application No. 2009-116035, filed May 13, 2009; Japanese Patent Application No. 2009-117098, filed May 14, 2009; Japanese Patent Application No. 2009-119368, filed May 18, 2009; Japanese Patent Application No. 2009-138737, filed Jun. 10, 2009; Japanese Patent Application No. 2009-148148, filed Jun. 23, 2009; Japanese Patent Application No. 2009-209878, filed Sep. 11, 2009; Japanese Patent Application No. 2009-211170, filed Sept. 14, 2009; Japanese Patent Application No. 2009-234064, filed Oct. 8, 2009; Japanese Patent Application No. 2009-236788, filed Oct. 14, 2009; and Japanese Patent Application No. 2009-243942, filed Oct. 23, 2009; said patent applications hereby fully incorporated herein by reference.

TECHNICAL FIELD

The present invention relates to a pipe joint, particularly to a pipe joint in which a spigot formed at an end of one pipe is inserted into a socket formed at an end of another pipe, the pipes being joined to each other and made of, for example, ductile cast iron.

BACKGROUND ART

A so-called slip-on detachment preventive pipe joint known as this kind of pipe joint is described in, for example, Japanese Patent Laid-Open No. 5-231570 (1993). In the pipe joint, a lock ring is attached to the inner circumference of a socket, and an annular sealing material made of rubber is disposed to seal the pipe joint over the periphery between the inner circumferential surface of the socket and the outer peripheral surface of a spigot. The sealing material includes a heel part held by the socket and a bulb part compressed between the inner circumferential surface of the socket and the outer peripheral surface of the spigot to generate a sealing surface pressure. The inner diameter of the bulb part is reduced towards the socket inner side, and the bulb part has a substantially elliptical cross-section formed so as to project obliquely towards the pipe center. A projection formed on the outer periphery of the distal end of the spigot is engaged with the lock ring to exhibit a detachment prevention function between the socket and the spigot.

In the pipe joint configured thus, when joining the pipes to each other by inserting the spigot into the socket, the inner circumferential portion of the bulb part is bent and deformed (diameter expansion) outward in the pipe diameter direction, while the projection of the spigot passes by the inner circumference of the sealing material towards the inner side of the socket.

After the projection of the spigot passes by the inner circumference of the sealing material, the bulb part is compressed between the outer peripheral surface of the spigot and the inner circumferential surface of the socket, so that a sealing surface pressure is obtained.

SUMMARY OF INVENTION

Technical Problem

In the above-described known configuration, however, a large force is required to deform the bulb part so as to bend (diameter expansion) outward in the pipe diameter direction when the spigot is inserted into the socket. Thus, a large insertion force (joining force) has to be applied when the spigot is inserted into the socket.

An object of the present invention is to provide a pipe joint in which a spigot is inserted into a socket with a small insertion force (joining force).

Another object of the present invention is to efficiently attach a sealing material in a satisfactory pressed state in a so-called mechanical-type pipe joint.

Another object of the present invention is to eliminate the need for the control of a tightening torque for a bolt and a nut pressing a push ring, bring a sealing material into surface contact with a socket and a spigot uniformly over a wide area to exhibit sealing properties, and maintain desired sealing properties even if a part of the sealing material contributing to the sealing properties moves in the pipe axial direction, in a so-called mechanical-type pipe joint.

Another object of the present invention is to join pipes even with bent pipe axes while satisfactorily maintaining a detachment prevention function, and satisfactorily perform centering of a lock ring without controlling the orientation of a lock ring centering member.

Another object of the present invention is to reduce the weight and cost of a pipe joint by making a liner disposed between the inner end of a socket and the distal end of a spigot arrangeable onto the axes of the socket and the spigot.

Another object of the present invention is to effectively prevent the occurrence of corrosion of a press claw and pipes in a detachment preventive pipe joint using the press claw.

Another object of the present invention is to prevent the diameter expansion maintaining portion of a spacer from being misaligned with a lock ring, when the diameter expansion maintaining portion of the spacer is inserted into a space between two ends of a constituent member at the divided part of the lock ring, in a pipe joint in which the spacer is fitted in the divided part in the circumferential direction of the lock ring provided in a socket to keep the lock ring in a diameter-expanded state while a spigot is inserted into the socket.

Solution to Problem

A pipe joint according to a first aspect of the present invention in which a spigot formed at an end of one pipe is inserted into a socket formed at an end of another pipe, the one pipe and the other pipe being joined to each other, the pipe joint comprising:

a fitting groove formed on the inner circumferential surface of the socket; and an annular sealing material for sealing a gap between the socket and the spigot over the periphery, the sealing material including a heel part fitted into the fitting groove, and a bulb part interposed between the inner circumferential surface of the socket and the outer peripheral surface of the spigot, closer to the inner side of the socket than the heel part, the bulb part including a first bulb continuous with the heel part, a second bulb positioned closer to the inner side of the socket than the first bulb, and a narrow part present on the boundary between the first bulb and the second bulb, the first bulb having a first sealing portion formed on the outer peripheral portion of the first bulb, the first sealing portion being pressed against the inner circumferential surface of the socket, the second bulb having a second sealing portion formed on the inner circumferential portion of the second bulb, the second sealing portion being pressed against the outer peripheral surface of the spigot, wherein the second bulb is inclined from the first bulb towards a pipe center in a natural state before the second bulb is provided between the socket and the spigot, the inner diameter of the second bulb is smaller than the outer diameter of the spigot in the natural state, and the second bulb is expansible and contractible in the pipe diameter direction due to elastic deformation of the narrow part.

A pipe joint according to a second aspect of the present invention in which a spigot formed at an end of one pipe is inserted into a socket formed at an end of another pipe, the pipes being joined to each other, the pipe joint comprising:

an annular sealing material interposed and compressed between the inner circumferential surface of the socket and the outer peripheral surface of the spigot to exhibit desired sealing properties; and a push ring fastened to the socket to keep the sealing material in a compressed state in which the sealing material is interposed between the inner circumferential surface of the socket and the outer peripheral surface of the spigot.

A pipe joint according to a third aspect of the present invention, the pipe joint comprising a sealing material compressed between the outer peripheral surface of a spigot and the inner circumferential surface of a socket formed parallel to the outer peripheral surface of the spigot to exhibit desired sealing properties, wherein the sealing material includes a cylindrical portion having an outer peripheral surface formed parallel to the inner circumferential surface of the socket and an inner circumferential surface formed parallel to the outer peripheral surface of the spigot, and the cylindrical portion is brought into surface contact with the outer peripheral surface of the spigot and the inner circumferential surface of the socket when the sealing material is compressed between the socket and the spigot.

A pipe joint according to a fourth aspect of the present invention, the pipe joint comprising:

a lock ring accommodating groove formed on the inner circumference of a socket;

a lock ring accommodated in the accommodating groove and singularly divided in a circumferential direction;

an annular centering member disposed between the inner circumferential surface of the accommodating groove and the outer peripheral surface of the lock ring, for holding the lock ring centered with respect to the socket when a spigot is not inserted into the socket; and a protrusion which is formed on the outer periphery of the distal end of the spigot, is capable of elastically pushing out the lock ring accommodated in the accommodating groove with the spigot inserted into the socket in the pipe diameter direction to pass through the inner circumference side of the lock ring, and is capable of being engaged with the lock ring from the inner side of the socket when a detachment force is applied in the pipe axial direction between the socket and the spigot joined to each other to prevent the spigot from being detached from the socket, the centering member including a plurality of divided parts in the pipe circumferential direction, and a connecting part connecting the adjacent divided parts in the pipe circumferential direction, the divided part including a holder holding the lock ring from the outer peripheral side, and a hold width protruding inward in the diameter direction from the socket inner side portion of the holder so as to be engaged with the lock ring in the pipe axial direction, wherein the connecting part is disposed closer to the outer peripheral side than the divided parts and is elastically deformable in the pipe diameter direction in response to the elastically pushed-out lock ring.

A pipe joint according to a fifth aspect of the present invention, the pipe joint comprising:

a liner pushed into the inner side of a socket by a spigot and disposed between the distal end surface of the spigot and the inner end surface of the socket when the spigot is inserted into the socket; and a guiding surface formed on the inner surface of the socket for guiding the liner in the pipe diameter direction such that the axis of the liner is positioned at the axis of the socket and the spigot when the liner is pushed into the inner side of the socket by the spigot.

A pipe joint according to a sixth aspect of the present invention, the pipe joint comprising:

a press claw disposed on the inner circumferential portion of a socket, or disposed on the inner circumferential portion of an annular member fitted onto a portion of a spigot on the outer side of the socket and connected to the socket; and a press bolt for pushing the press claw to fix the press claw pressed against the outer surface of the spigot to the spigot, wherein the press claw is made of an iron material and has an anticorrosive coating formed on a surface of a portion in contact with the spigot, and the anticorrosive coating contains any one of a Zn—Sn alloy sprayed coating, a Zn—Sn—Mg alloy sprayed coating, and a Zn—Al alloy sprayed coating.

A spacer according to the present invention for a pipe joint in which a spigot formed at an end of one pipe is inserted into a socket formed at an end of another pipe, the pipes being joined to each other, an annular lock ring is accommodated in a lock ring accommodating groove formed on the inner circumference of the socket, the lock ring including divided parts in the circumferential direction and being elastically expansible in diameter, a protrusion is formed on the outer periphery of the spigot, and the protrusion of the spigot is allowed to pass through the lock ring having an expanded diameter, and the diameter-expanded state of the lock ring is released after the passage of the protrusion, the spacer being capable of being inserted into and removed out from the divided part of the lock ring and maintaining the diameter-expanded lock ring when the spacer is inserted into the divided part, the spacer comprising:

a diameter-expanded maintaining portion being capable of being inserted into and removed out from a gap between two ends of the lock ring along the circumferential direction at the divided part, and being interposed between the two ends when the maintaining portion is inserted; and a handle reaching from the diameter-expanded maintaining portion outside the socket beyond a socket opening portion when the diameter-expanded maintaining portion is interposed between the two ends of the lock ring, wherein the spacer is capable of being removed out from the gap between the two ends of the lock ring at the divided part after the spigot is inserted into the socket, passing through a space between the socket and the spigot and being collected outside the socket beyond the socket opening portion, the spacer further comprises insertion grooves on two side portions of the diameter-expanded maintaining portion, the two ends of the lock ring can be fitted into the insertion grooves when the diameter-expanded maintaining portion is inserted into the gap between the two ends of the lock ring at the divided part, and the diameter-expanded maintaining portion is capable of being detached in a removal direction from the two ends of the lock ring when the diameter-expanded maintaining portion moves to be removed out from the gap between the two ends of the lock ring at the divided part.

Advantageous Effects of Invention

According to the present invention, the sealing material including the first bulb, the second bulb, and the narrow part is provided, so that high sealing properties can be exhibited between the socket and the spigot as well as reducing an insertion force (joining force) required when the spigot is inserted into the socket.

According to the present invention, provided are the annular sealing material interposed and compressed between the inner circumferential surface of the socket and the outer peripheral surface of the spigot to exhibit desired sealing properties, and a push ring fastened to the socket to keep the sealing material in a compressed state in which the sealing material is interposed between the inner circumferential surface of the socket and the outer peripheral surface of the spigot. Thus, the push ring can be efficiently attached without minutely controlling the interval between the push ring and a flange. Accordingly, the operation efficiency can be improved and the sealing material can be easily kept in a favorable compressed state. As a result, the reliability of the pipe joint can be improved.

According to the present invention, the sealing material has a cylindrical portion having an outer peripheral surface formed parallel to the inner circumferential surface of the socket, and an inner circumferential surface formed parallel to the outer peripheral surface of the spigot. The cylindrical portion is brought into surface contact with the outer peripheral surface of the spigot and the inner circumferential surface of the socket when the sealing material is compressed between the socket and the spigot. Thus, sealing properties can be maintained by bringing the sealing material into surface contact with the spigot and the socket uniformly over a wide area. Further, desired sealing properties can be obtained even when the sealing material receives a pressure in pipe to move a portion of the sealing material exhibiting the sealing properties.

According to the present invention, the centering member includes a plurality of divided parts in the pipe circumferential direction and a connecting part connecting the adjacent divided parts in the pipe circumferential direction. The divided part has a holder holding the lock ring from the outer peripheral side, and a hold width which projects inward in the diameter direction from the socket inner side portion of the holder and is engageable with the lock ring in the pipe axial direction. The connecting part is disposed closer to the outer peripheral side of the lock ring than the divided part and is elastically deformable in the pipe diameter direction in response to the elastically pushed-out lock ring. Thus, the lock ring can be reliably prevented from being detached from the accommodating groove, and the detachment preventive function can be satisfactorily maintained, to improve the reliability of the pipe joint. Further, the lock ring can be elastically pressed inward in the diameter direction of the socket by a reaction force of the elastically deformed connecting part. Thus, the lock ring can be satisfactorily centered by the centering member.

According to the present invention, when the spigot is inserted into the socket, provided are the liner pushed into the inner side of the socket by the spigot and disposed between the distal end surface of the spigot and the inner end surface of the socket, and the guiding surface for guiding the liner in the pipe diameter direction such that the axis of the liner is located at the axis of the socket and the spigot when the liner is pushed into the inner side of the socket by the spigot. The liner can be self-aligned, so that the outer diameter and thickness of the liner can be reduced according to the outer diameter and thickness of the spigot. Thus, the liner can be reduced in weight and cost.

According to the present invention, the press claw pressed against the outer surface of the spigot by being pushed by the press bolt in the annular member and fixed to the spigot is made of an iron material, and contains any one of a Zn—Sn alloy sprayed coating, a Zn—Sn—Mg alloy sprayed coating, and a Zn—Al alloy sprayed coating on the surface of a portion in contact with the spigot, thereby exerting an excellent anticorrosive effect. Further, an anticorrosive effect due to a sprayed coating can be expected even when the distal end portion of the press claw cuts into the spigot of the pipe. Thus, the occurrence of corrosion can be effectively prevented in the press claw and the pipe.

According to the present invention, the spacer used for the divided part of the lock ring has insertion grooves on two side portions of the diameter-expanded maintaining portion. Two ends of the lock ring at the divided part can be fitted into the insertion grooves when the diameter-expanded maintaining portion is inserted into a gap between the two ends of the lock ring. Further, the diameter-expanded maintaining portion can be detached in a removal direction from the gap between the two ends of the lock ring when the diameter-expanded maintaining portion moves to be removed out from the gap between the two ends of the lock ring at the divided part. Thus, the diameter-expanded maintaining portion of the spacer can be prevented from being displaced in the diameter direction and the insertion direction from the lock ring when the diameter-expanded maintaining portion of the spacer is inserted into the divided part of the lock ring to keep the lock ring in a diameter-expanded state. Consequently, the diameter-expanded maintaining portion can be set at a normal position of the divided part of the lock ring without being displaced.

BRIEF DESCRIPTION OF DRAWINGS

FIG. 4 shows the joining operation of the pipe joint of FIG. 1.

FIG. 5 shows the operating stage following the joining operation of FIG. 4.

FIG. 6 shows the operating stage following the stage of FIG. 5.

FIG. 15 shows a pipe joint according to another embodiment of the present invention.

FIG. 49 shows the positional relationship between the centering member and a lock ring.

FIG. 70 is a right side view showing the spacer of FIG. 69.

FIG. 71 is an enlarged view showing the essential part of the spacer of FIG. 70.

FIG. 75 shows the joining operation of the pipe joint of FIG. 66.

FIG. 77 is a bottom view showing the spacer and the vicinity of the spacer in the pipe joint of FIG. 75.

FIG. 78 is a bottom view showing that the spacer is separated from a lock ring accommodating groove in the pipe joint of FIG. 75.

FIG. 79 shows the diameter-expanded state of a lock ring before the spacer of FIGS. 68 to 78 is used.

DESCRIPTION OF EMBODIMENTS

Figure 1:
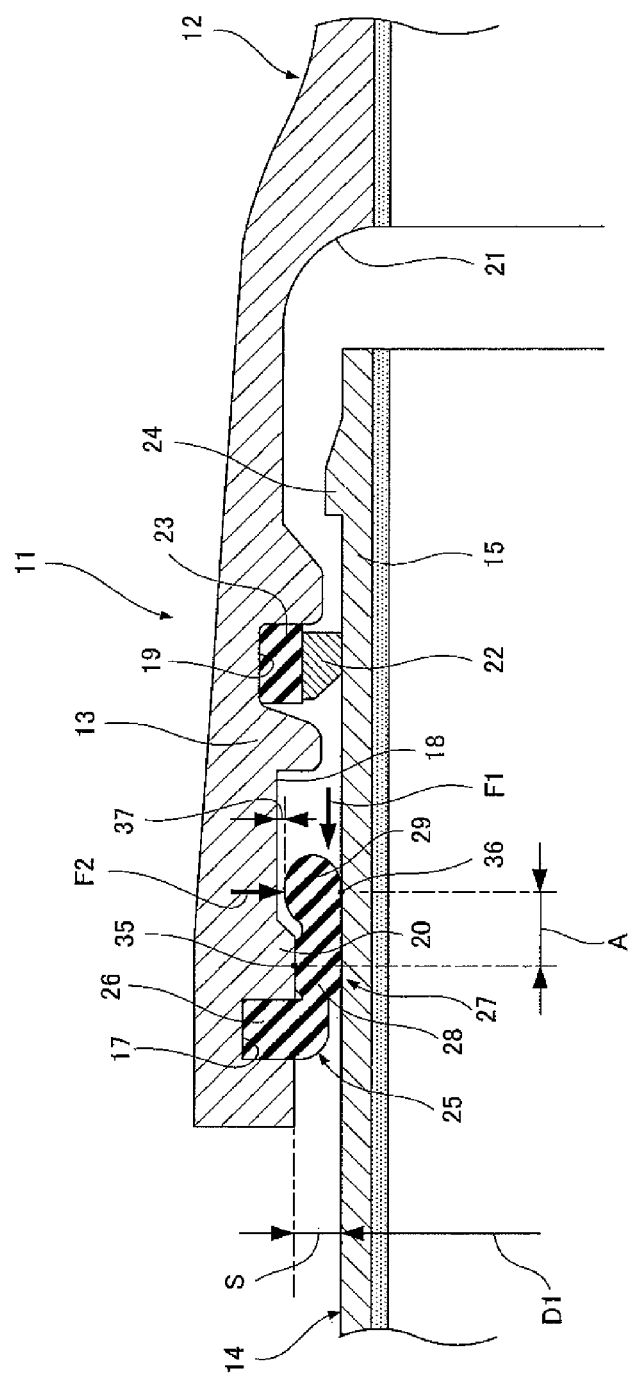
FIG. 1 is a cross-sectional view showing the essential part of a pipe joint according to an embodiment of the present invention.

In a push-on detachment preventive pipe joint 11 of FIG. 1, a spigot 15 formed at an end of one ductile cast-iron pipe 14 is inserted into a socket 13 formed at an end of another ductile cast-iron pipe 12, the pipes 12 and 14 being joined to each other.

On the inner circumferential surface of the socket 13, a fit-in groove 17, a recess 18 located closer to the socket inner side than the fit-in groove 17, and a lock ring accommodating groove 19 located closer to the socket inner side than the recess 18 are formed across the periphery. A projection 20 is formed between the fit-in groove 17 and the recess 18. An inner end surface 21 is formed in the pipe diameter direction on the socket inner side in the interior of the socket 13, away from the lock ring accommodating groove 19.

The lock ring accommodating groove 19 accommodates a lock ring 22 which is made of metal and singularly divided in the circumferential direction. The lock ring 22 has such an elastic diameter reducing force that the lock ring 22 is elastically pressed against the outer peripheral surface of the spigot 15. A centering rubber 23 is disposed between the outer peripheral surface of the lock ring 22 and the bottom surface of the lock ring accommodating groove 19. The centering rubber 23 facilitates the insertion of the spigot 15 into the lock ring 22, so that the lock ring 22 can be held to be centered with respect to the socket 13 when the spigot 15 is not inserted into the socket 13. A projection 24 is formed on the outer periphery of the distal end portion of the spigot 15, the projection 24 being engageable with the lock ring 22 from the socket inner side. The projection 24 is formed in the pipe axial direction at a predetermined distance from the distal end surface of the spigot 15. The projection 24 is engaged with the lock ring 22 from the socket inner side, thereby preventing the spigot 15 from being detached from the socket 13.

An annular sealing material 25 made of rubber seals the pipe joint over the periphery between the socket 13 and the spigot 15. The sealing material 25 is configured as follows.

Figure 2:
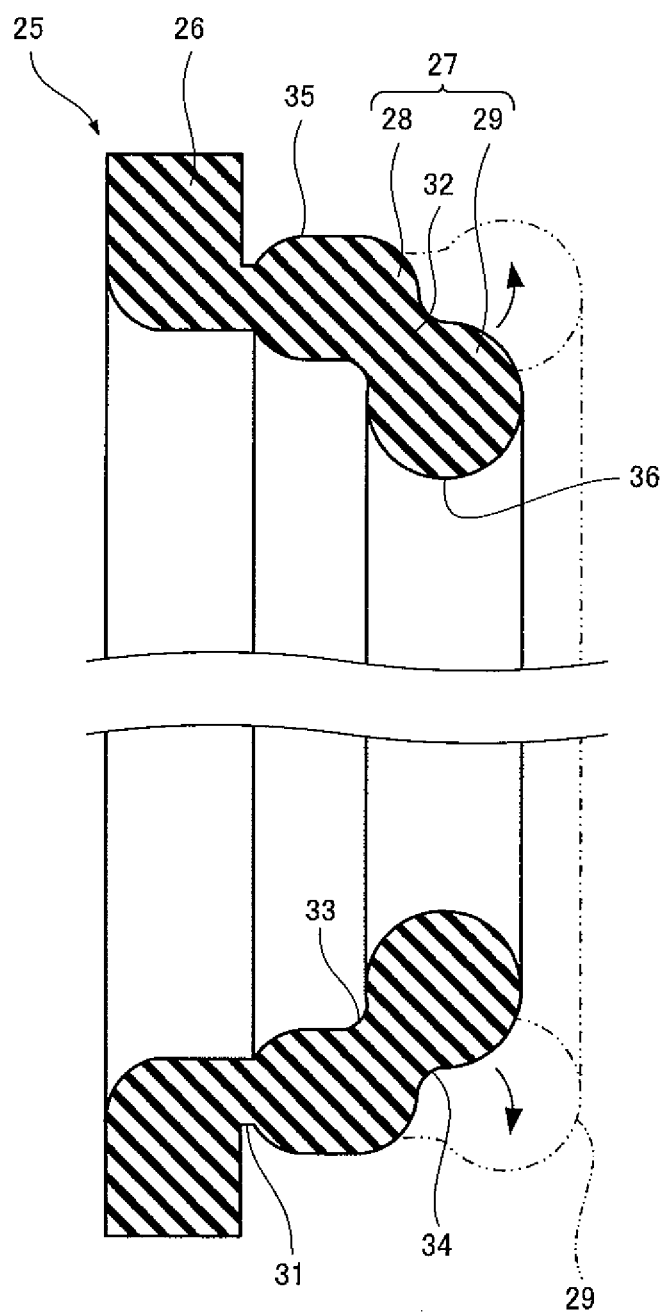
FIG. 2 is a cross-sectional view showing a sealing material of FIG. 1.
Figure 3:
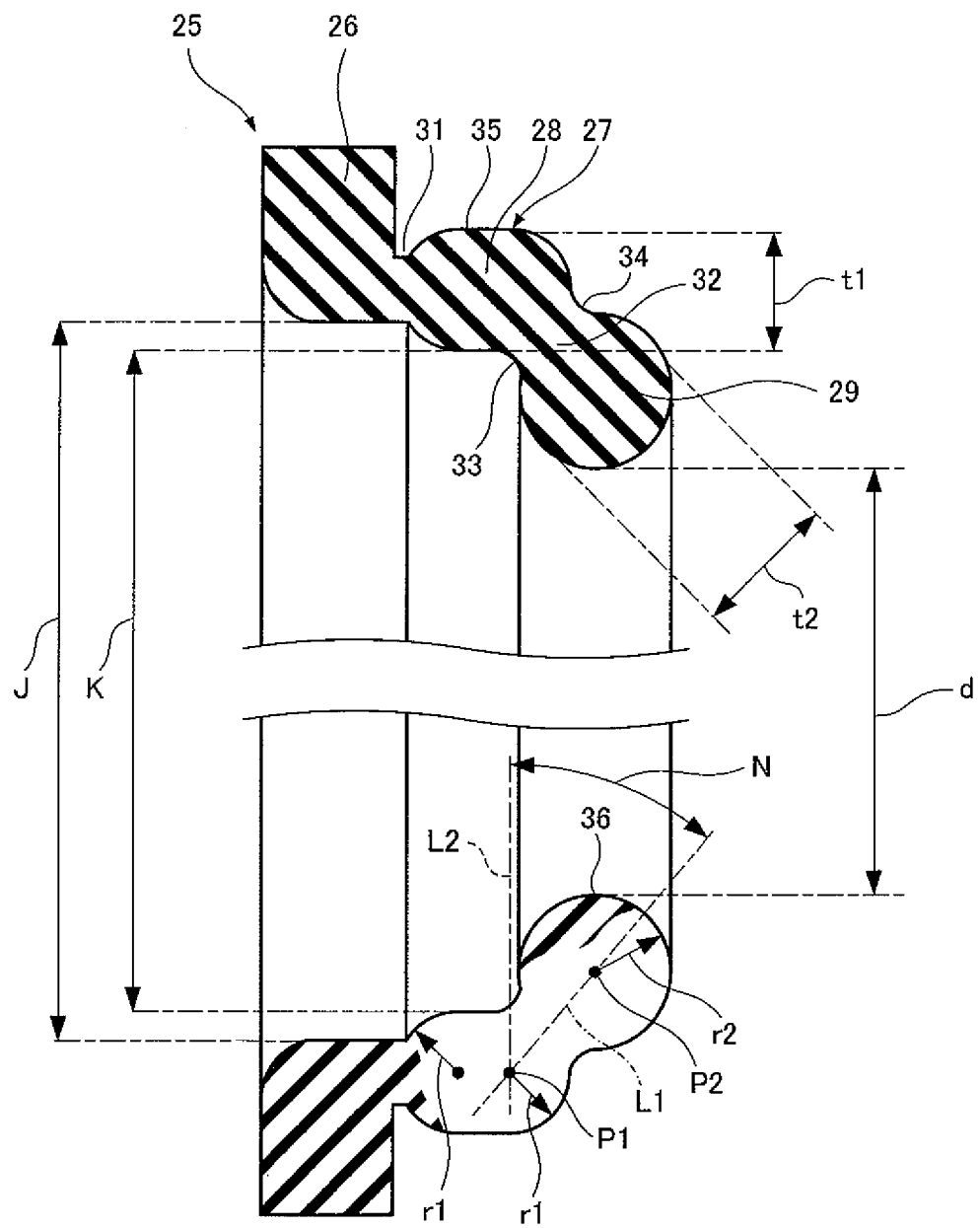
FIG. 3 is an explanatory diagram showing the dimension of the sealing material.

As shown in FIGS. 1 to 3, the sealing material 25 integrally includes a hard heel part 26 fitted in the fit-in groove 17 and a bulb part 27, which is softer than the heel part 26, interposed between the inner circumferential surface of the socket 13 and the outer peripheral surface of the spigot 15. The heel part 26 is an annular member with a rectangular traverse section.

The bulb part 27 is annularly formed and includes a first bulb 28 and a second bulb 29 joined to each other. The traverse section of the first bulb 28 is elliptically elongated in the pipe axial direction with two ends along the pipe axial direction each having a semicircular portion with radius r1. The traverse section of the second bulb 29 is circular-shaped with radius r2. Radius r1 is smaller than radius r2, and thickness t1 of the first bulb 28 along the pipe diameter direction is smaller than thickness t2 of the second bulb 29. The diameter (=2×r2) of the traverse section of the second bulb 29 is larger than space S in the pipe diameter direction between the inner circumferential surface of the projection 20 and the outer peripheral surface of the spigot 15.

The first bulb 28 is joined to the heel part 26, and an annular recess 31 is formed on the outer peripheral portion of the joint between the first bulb 28 and the heel part 26. Inner diameter K of the first bulb 28 is slightly smaller than the outer diameter of the spigot 15, and the outer diameter of the first bulb 28 is slightly larger than the inner diameter of the projection 20.

The first bulb 28 is located closer to the inner side of the socket 13 than the heel part 26. A narrow part 32 is formed at the joint of the first bulb 28 and the second bulb 29, and the narrow part 32 is smaller in thickness than the first bulb 28 and the second bulb 29. On the inner circumferential surface and the outer peripheral surface of the narrow part 32, annular recesses 33 and 34 with arc-like cross-sections are formed, respectively.

The second bulb 29 is located closer to the inner side of the socket 13 than the first bulb 28, and is inclined from the first bulb 28 towards the pipe center. As shown in FIG. 3, a line containing center P1 of the semicircular portion of the end of the first bulb 28 closer to the second bulb 29 and center P2 of the second bulb 29 is denoted as L1, a line containing the center P1 and extending along the diameter direction of the sealing material 25 is denoted as L2, and inclination angle N of the line L1 with respect to the line L2 is set to be 15° to 35°. The second bulb 29 has an inner diameter (d) smaller than outer diameter D1 of the spigot 15, and is expansible and contractible in the pipe diameter direction due to the elastic deformation of the narrow part 32. Inner diameter J of the heel part 26 is larger than the inner diameter K of the first bulb 28.

A first sealing portion 35 is formed in the pipe axial direction over the outer periphery of the first bulb 28 so as to be pressed against the inner circumferential surface of the projection 20 of the socket 13. A second sealing portion 36 is formed over the inner circumference of the second bulb 29 so as to be pressed against the outer peripheral surface of the spigot 15. The first sealing portion 35 is not aligned with the second sealing portion 36 in the pipe axial direction. As shown in FIG. 1, a gap 37 is present in the pipe diameter direction across the periphery between the outer periphery of the second bulb 29 and the bottom surface of the recess 18 of the socket 13. The length of the projection 20 of the socket 13 in the pipe axial direction is set such that the second bulb 29 is not compressed.

In the above configuration, when the other pipe 12 and the one pipe 14 are joined to each other, first, the centering rubber 23 and the lock ring 22 are accommodated in the lock ring accommodating groove 19. As shown in FIG. 4, the heel part 26 of the sealing material 25 is fitted in the fit-in groove 17, so that the sealing material 25 is attached into the socket 13.

Next, the spigot 15 is inserted into the socket 13. At this point in time, as shown in FIG. 5, the distal end of the spigot 15 is inserted into the inner circumference of the first bulb 28, is brought into contact with the second bulb 29 and pushes the second bulb 29 in the insertion direction. Thus, the second bulb 29 is elastically expanded (diameter expansion) in the pipe diameter direction.

After that, when the spigot 15 is inserted further into the socket 13, as shown in FIG. 6, the projection 24 of the spigot 15 passes by the inner circumference of the heel part 26 and is brought into contact with the inner circumference of the first bulb 28. The first bulb 28 is then interposed between the outer peripheral surface of the projection 24 and the inner circumferential surface of the projection 20 of the socket 13, and is compressed in the pipe diameter direction. At this point, a gap 38 is kept across the periphery between the outer periphery of the second bulb 29 elastically diameter-expanded in the pipe diameter direction and the bottom surface of the recess 18.

Figure 7:
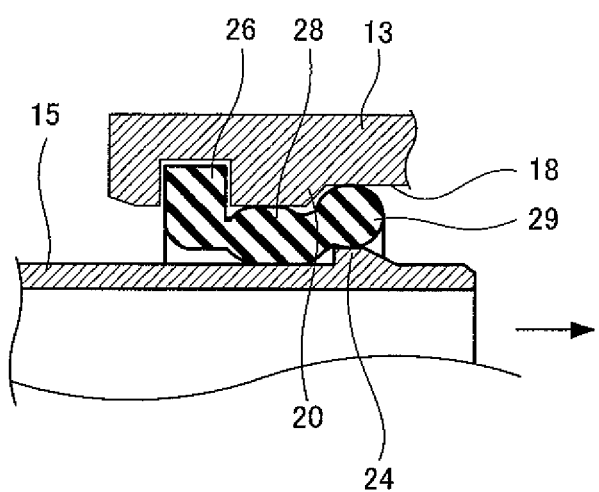
FIG. 7 shows the operating stage following the stage of FIG. 6.

When the spigot 15 is inserted further into the socket 13, as shown in FIG. 7, the projection 24 of the spigot 15 passes by the inner circumference of the first bulb 28, and is brought into contact with the inner circumference of the second bulb 29. At this point, since the gap 38 is formed as shown in FIG. 6, the second bulb 29 can be displaced outward in the pipe diameter direction to escape from the projection 24.

Thereafter, when the spigot 15 is inserted further into the socket 13, as shown in FIG. 1, after passing by the inner circumference of the second bulb 29, the projection 24 of the spigot 15 passes by the lock ring 22 from the socket outer side towards the socket inner side while elastically expanding the lock ring 22 in diameter. Thus, the other pipe 12 and the one pipe 14 are joined to each other. At this point, the second bulb 29 is elastically expanded in the pipe diameter direction, so that the second bulb 29 sticks to the outer peripheral surface of the spigot 15. The diameter expansion of the second bulb 29 pushes the first bulb 28 outward in the pipe diameter direction. Thus, the first sealing portion 35 of the first bulb 28 is pressed against the inner circumferential surface of the projection 20 of the socket 13, and the second sealing portion 36 of the second bulb 29 is pressed against the outer peripheral surface of the spigot 15, so that high sealing properties can be obtained between the socket 13 and the spigot 15.

When the spigot 15 is inserted into the socket 13, the narrow part 32 smaller in thickness than the first and second bulbs 28 and 29 is elastically deformed, so that the second bulb 29 can be easily expanded in the pipe diameter direction. Thus, only a small force is sufficient to expand the second bulb 29 in the pipe diameter direction. As a result, the spigot 15 can be inserted into the socket 13 with a small insertion force (joining force).

As shown in FIG. 5, first, the distal end of the spigot 15 expands the second bulb 29 in the pipe diameter direction. After that, as shown in FIG. 6, the projection 24 compresses the first bulb 28. Thus, the expansion of the second bulb 29 in the pipe diameter direction does not coincide with the compression of the first bulb 28, so that the spigot 15 can be inserted into the socket 13 with a small insertion force (joining force). Further, since the inner diameter J of the heel part 26 is larger than the inner diameter K of the first bulb 28 as shown in FIG. 3, when the first bulb 28 is compressed, a part of the first bulb 28 can escape into a gap between the heel part 26 and the spigot 15. Also with this configuration, the spigot 15 can be inserted into the socket 13 with a small insertion force.

As shown in FIG. 6, when the first bulb 28 is interposed and compressed between the outer peripheral surface of the projection 24 and the inner circumferential surface of the projection 20, the recesses 31, 33, and 34 specifically shown in FIG. 2 serve as a relief margin, so that the amount of the compressed second bulb 29 is reduced. Thus, the projection 24 of the spigot 15 can smoothly pass by the inner circumference of the first bulb 28, so that the spigot 15 can be inserted into the socket 13 with a small insertion force (joining force). As shown in FIG. 3, since the thickness t1 of the first bulb 28 is smaller than the thickness t2 of the second bulb 29, the amount of the compressed first bulb 28 in the pipe diameter direction can be reduced, and the projection 24 of the spigot 15 can smoothly pass by the inner circumference of the first bulb 28, thereby enabling the spigot 15 to be inserted into the socket 13 with a small insertion force (joining force).

As shown in FIG. 7, when the projection 24 of the spigot 15 passes inside the annular second bulb 29, the gap 38 of FIG. 6 serves as a relief margin, and the second bulb 29 is elastically displaced (diameter expansion) outward in the pipe diameter direction to escape from the projection 24. Thus, the spigot 15 can be inserted into the socket 13 with an even smaller insertion force (joining force).

If hydraulic pressure is applied in the pipes 12 and 14 joined to each other, as shown in FIG. 1, push-out force F1 is applied by the hydraulic pressure to push out the bulb part 27 from the inner side towards the opening side of the socket 13. On the other hand, the first sealing portion 35 is not aligned with the second sealing portion 36 in the pipe axial direction, so that the bulb part 27 can be prevented from being pushed out from the inner side to the opening side of the socket 13 by the push-out force F1. In particular, as the amount of misalignment (A) between the first sealing portion 35 and the second sealing portion 36 in the pipe axial direction in FIG. 1 increases, the bulb part 27 can be prevented from being pushed out by larger push-out force F1. Thus, the sealing properties between the socket 13 and the spigot 15 are improved.

Since the diameter of traverse section of the second bulb 29 (=2×r2) is larger than the space S in the pipe diameter direction between the inner circumferential surface of the projection 20 of the socket 13 and the outer peripheral surface of the spigot 15, even if the bulb part 27 is pushed out by the push-out force F1, the second bulb 29 hardly passes through the space S. Thus, the bulb part 27 can be prevented from being pushed out from the inner side to the opening side of the socket 13.

Moreover, hydraulic pressure is applied also to the gap 37, push-out force F2 is applied towards the pipe center onto the second bulb 29. Thus, the second sealing portion 36 of the second bulb 29 is pressed hard against the outer peripheral surface of the spigot 15, so that the sealing properties are further improved between the socket 13 and the spigot 15.

In the configuration of FIG. 1, when the other pipe 12 and the one pipe 14 are joined to each other with the spigot 15 inserted into the socket 13, the inner circumferential surface of the first bulb 28 contacts the outer peripheral surface of the spigot 15. Instead of this configuration, a gap may be formed between the inner circumferential surface of the first bulb 28 and the outer peripheral surface of the spigot 15. In this case, when the bulb part 27 is pushed out by the push-out force F1, the second bulb 29 is pushed so as to enter the gap between the inner circumferential surface of the first bulb 28 and the outer peripheral surface of the spigot 15, so that an improvement in sealing properties between the socket 13 and the spigot 15 can be expected.

In a known technique, a straight pipe having a prescribed length is cut based on an actually measured pipe dimension at a construction site to adjust the pipe length, so that the cut pipe may be connected to another pipe. Referring to FIGS. 8 to 15, the following will describe an example in which the pipe joint shown in FIGS. 1 to 7 is applied when the cut pipe is connected to the other pipe.

Figure 8:
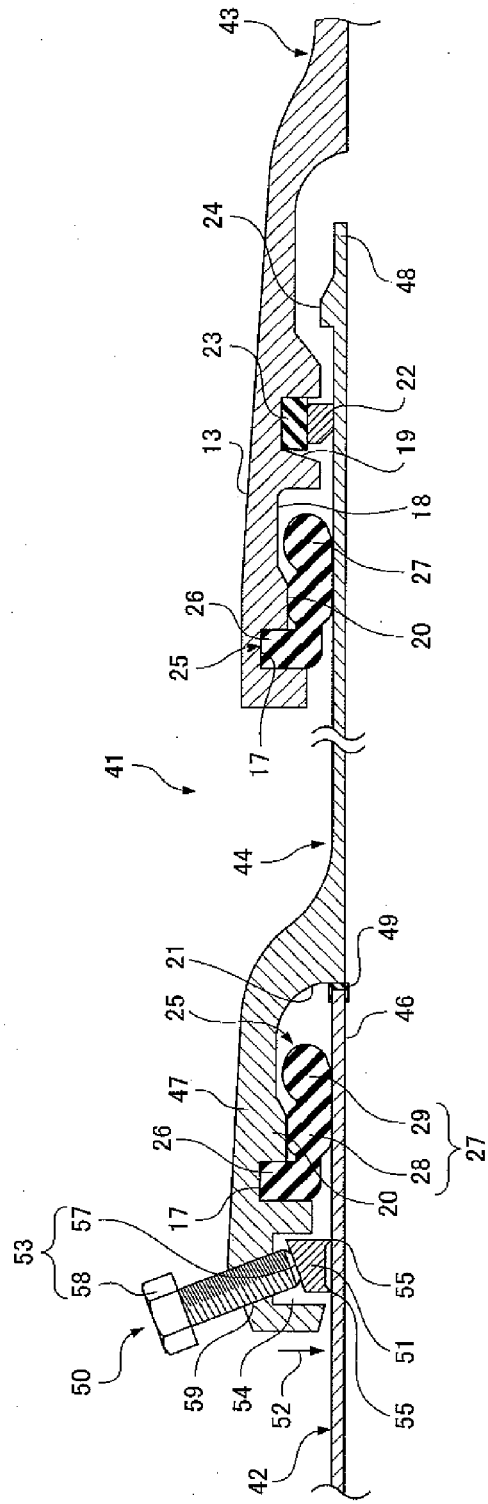
FIG. 8 is a vertical cross-sectional view showing the essential part of a pipe joint according to another embodiment of the present invention.

In FIG. 8, reference numeral 41 denotes a pipe joint in which a cut pipe 42 is connected to another pipe 43 via a connecting pipe 44. The cut pipe 42 is obtained by cutting a pipe at a conduit construction site to have a prescribed length. The cut end of the pipe 42 constitutes a spigot 46. The other pipe 43 is a standard straight pipe having a spigot (not shown) at one end and a socket 13 at the other end.

The connecting pipe 44 is made of ductile cast iron, and has a socket 47 at one end and a spigot 48 at the other end. The spigot 46 of the cut pipe 42 is inserted into the socket 47 of the connecting pipe 44, and a spigot 48 of the connecting pipe 44 is inserted into the socket 13 of the other pipe 43. Onto the cut end of the spigot 46 of the cut pipe 42, an annular anticorrosive material 49 which is made of, for example, rubber with water-tightness is attached.

The socket 47 of the connecting pipe 44 includes a detachment preventive mechanism 50 for preventing the socket 47 and the spigot 46 of the cut pipe 42 from being detached from each other and a sealing material 25. The socket 13 of the other pipe 43 includes a similar sealing material 25 and a lock ring 22.

Figure 9:
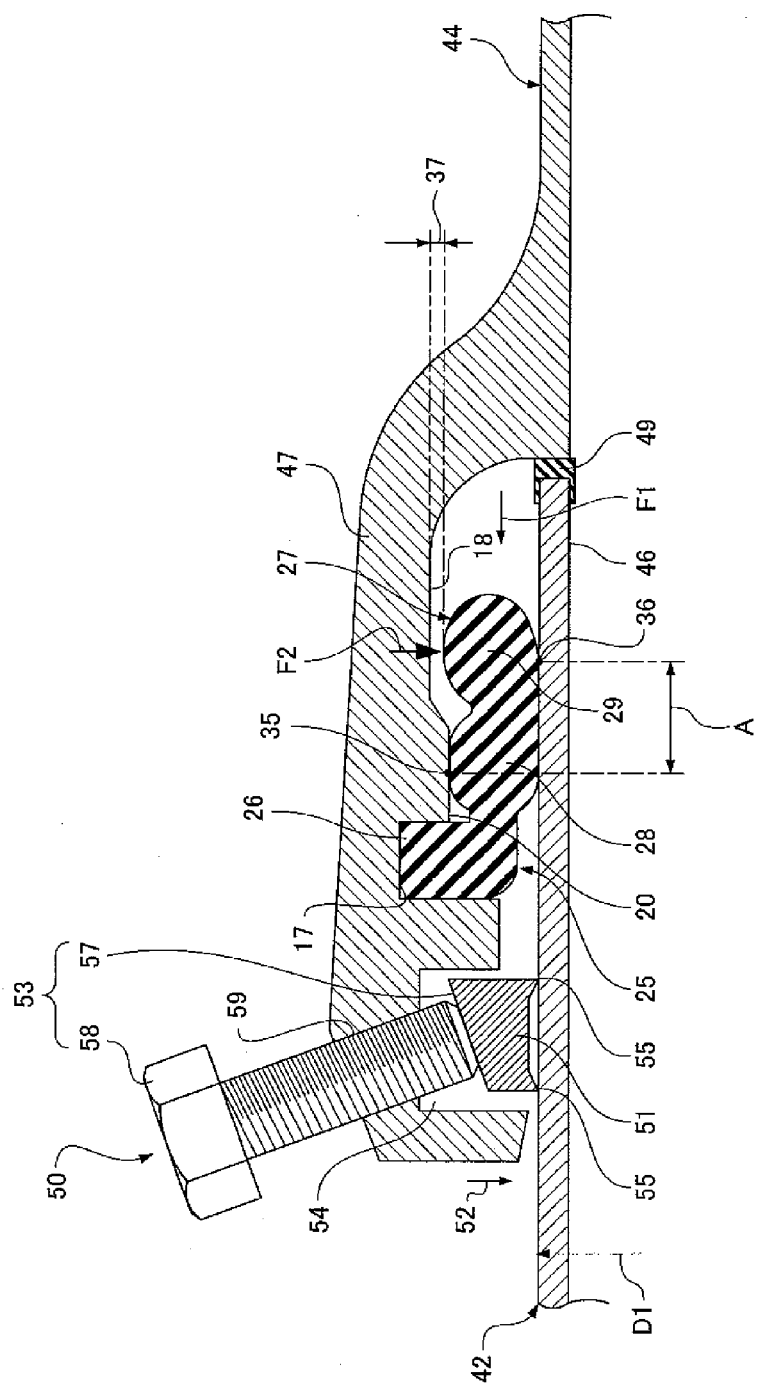
FIG. 9 is an enlarged view showing the essential part of the part shown in FIG. 8.
Figure 10:
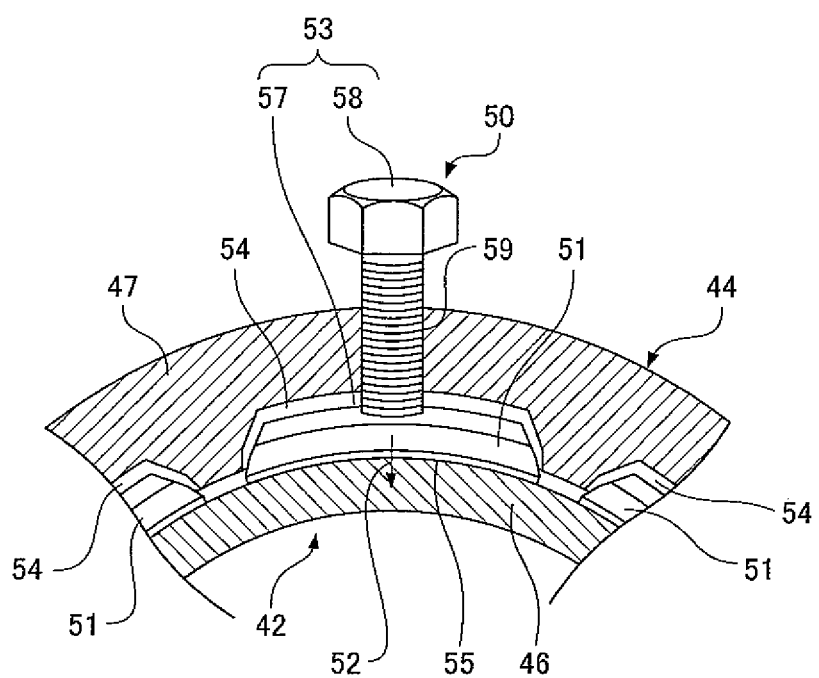
FIG. 10 is a transverse cross-sectional view showing the essential part of the part shown in FIG. 9.

As shown in FIGS. 9 and 10, the detachment preventive mechanism 50 has a plurality of retaining members 51 disposed in the circumferential direction of the socket 47 and a wedging mechanism 53. The retaining members 51 can cut into the outer peripheral surface of the spigot 46 of the cut pipe 42 and move in the pipe diameter direction, and the wedging mechanism 53 causes the retaining members 51 to cut in and move towards an inward 52 side in the pipe diameter direction when the spigot 46 and the socket 47 are relatively moving in a detachment direction.

A plurality of retaining recesses 54 are formed at intervals in the circumferential direction on the inner circumferential surface of the socket 47 of the connecting pipe 44. The retaining recesses 54 open towards the inward 52 in the pipe diameter direction. The retaining members 51 are fitted in the retaining recesses 54 so as to cut in and move towards the inward 52 in the pipe diameter direction. Edge cutting-in projections 55 are formed on the inner surfaces of the retaining members 51.

The wedging mechanism 53 has a receiving surface 57 formed on the outer surface of the retaining member 51 and a press bolt 58 for pressing the retaining member 51 towards the inward 52 in the pipe diameter direction via the receiving surface 57. The receiving surface 57 is inclined outward in the pipe diameter direction as the receiving surface 57 is closer to the inner side of the socket 47. The press bolt 58 is screwed with a screw hole 59 penetrating the inner and outer sides of the socket 47, and is inclined in an orthogonal direction to the receiving surface 57 with a distal end in contact with the receiving surface 57.

The configuration of the socket 47 of the connecting pipe 44 for attaching the sealing material 25 is the same as that in the pipe joint of FIGS. 1 to 7.

The joint structure of the cut pipe 42 and the other pipe 43 including the configuration of the sealing material 25 is the same as that in the pipe joint of FIGS. 1 to 7.

Figure 11:
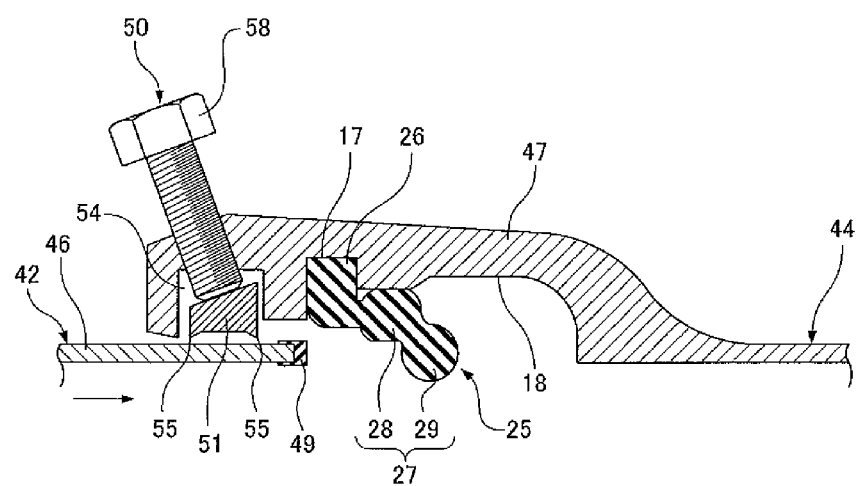
FIG. 11 shows the joining operation of the pipe joint of FIG. 8.

In order to connect the cut pipe 42 to the other pipe 43 via the connecting pipe 44, as shown in FIG. 11, the sealing material 25 is attached inside the socket 47 of the connection pipe 44.

Figure 12:
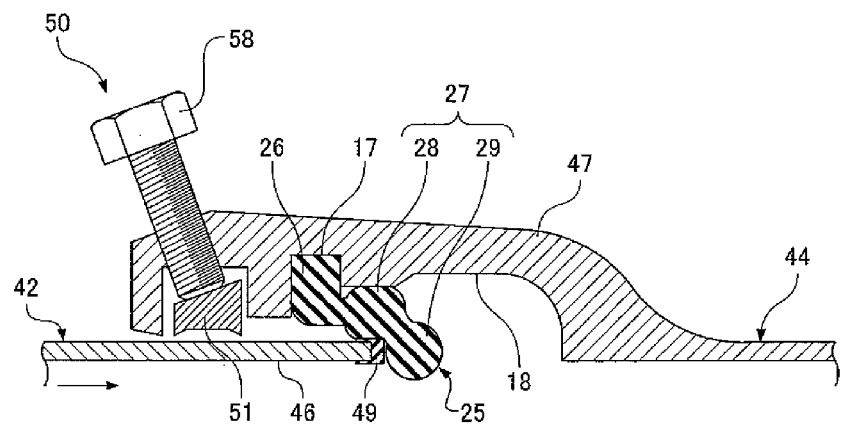
FIG. 12 shows the operating stage following the joining operation of FIG. 11.
Figure 13:
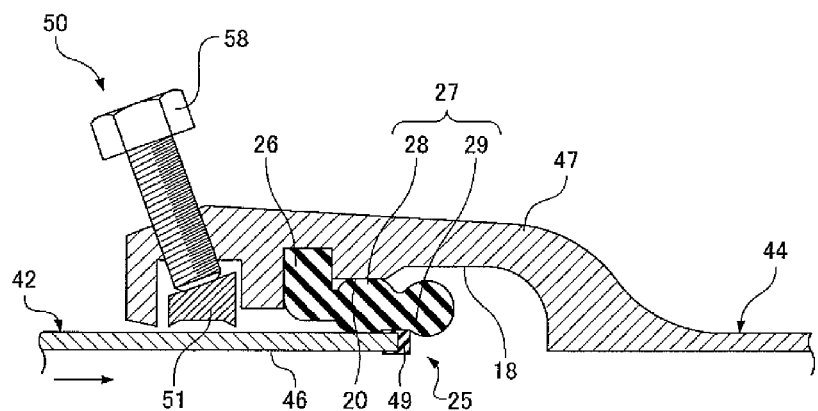
FIG. 13 shows the operating stage following the stage of FIG. 12.
Figure 14:
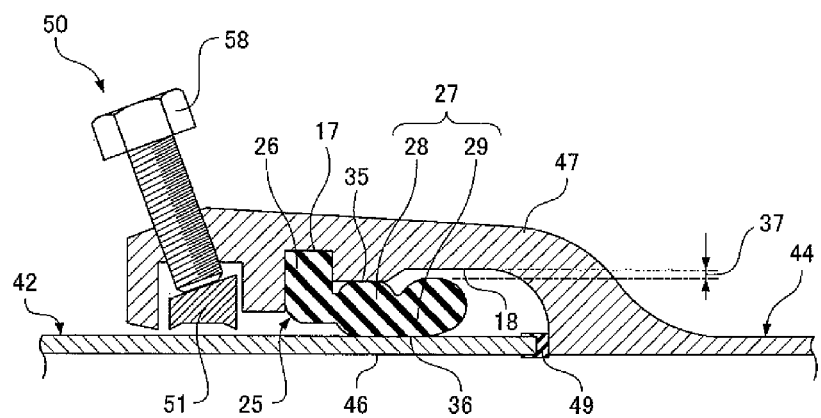
FIG. 14 shows the operating stage following the stage of FIG. 13.

After that, the spigot 46 of the cut pipe 42 is inserted into the socket 47. At this point, as shown in FIG. 12, the distal end of the spigot 46 is inserted to the inward side of a first bulb 28 and is brought into contact with a second bulb 29 to push the second bulb 29 in the insertion direction. Thus, as shown in FIG. 13, the second bulb 29 is elastically expanded (diameter expansion) in the pipe diameter direction, so that a gap is formed across the periphery between the outer periphery of the expanded second bulb 29 and the bottom surface of a recess 18. Then, as shown in FIG. 14, the spigot 46 is further inserted into the socket 47, so that the cut pipe 42 and the connecting pipe 44 are connected to each other.

Subsequently, as shown in FIG. 9, the press bolts 58 are tightened up and the retaining members 51 are pressed towards the inward 52 in the pipe diameter direction, so that the cutting-in projections 55 of the retaining members 51 cut into the outer peripheral surface of the spigot 46.

The process of joining the spigot 48 of the connecting pipe 44 to the socket 13 of the other pipe 43 is the same as that in the pipe joint of FIGS. 1 to 7.

A conduit including a pipe joint having such a configuration is buried in the ground in many cases. When earthquake deformation causes a detachment force (removal force) to be applied to the pipe joint 41, and the connecting pipe 44 and the other pipe 43 are being detached and moved relatively from each other, a projection 24 of the spigot 48 is engaged with the lock ring 22 from the socket inner side, so that the spigot 48 and the socket 13 are largely prevented from being detached and moved from each other.

Further, when the detachment force is applied to relatively detach and move the cut pipe 42 and the connecting pipe 44 from each other, the wedging mechanism 53 moves the retaining members 51 towards the inward 52 side in the pipe diameter direction. Thus, the cutting-in projections 55 cut into the outer peripheral surface of the spigot 46 of the cut pipe 42, so that the connection between the spigot 46 and the socket 47 is forcibly maintained.

The cut end surface of the spigot 46 of the cut pipe 42 is not coated but the anticorrosive material 49 is attached to the cut pipe 42. Thus, the cut end surface can be prevented from being corroded.

The detachment preventive structure of the other pipe 43 and the connecting pipe 44 and the detachment preventive structure of the connecting pipe 44 and the cut pipe 42 may be any structure in addition to the above-described structure.

FIG. 15 is a modification example of the pipe joint shown in FIGS. 8 to 14.

In FIG. 15, a detachment preventive mechanism 60 is provided on an annular detachment preventive ring 61 which is externally fitted across a spigot 46 of a cut pipe 42 and a portion beyond a socket 47 of a connecting pipe 44. Similarly to the pipe joint of FIGS. 8 to 14, the detachment preventive mechanism 60 has a plurality of retaining members 51 and wedging mechanisms 53. A plurality of retaining recesses 54 are formed in the inner circumference of one end of the detachment preventive ring 61 in the pipe axial direction.

On the other end of the detachment preventive ring 61 in the pipe axial direction, a fixing mechanism 62 for fixing the detachment preventive ring 61 on the outer periphery of the socket 47 of the connecting pipe 44 is provided. The fixing mechanism 62 has a groove 63 formed over the inner circumference of the detachment preventive ring 61, a fixed ring 64 fitted into the groove 63, and a plurality of fixing bolts 65 for pressing the fixed ring 64 towards inward 52 in the pipe diameter direction.

The fixed ring 64 is a metal ring singularly divided in the circumferential direction, and is fitted onto the socket 47 of the connecting pipe 44. The fixing bolts 65 are provided at intervals in the circumferential direction of the fixed ring 64.

In such a configuration, during piping construction, the detachment preventive ring 61 is fitted onto the connecting pipe 44 from the opening side of the socket 47 with the fixed ring 64 fitted into the groove 63, and the fixing bolts 65 are tightened up to press the fixed ring 64 towards the inward 52 in the pipe diameter direction. Thus, the fixed ring 64 is pressed against the outer peripheral surface of the neck of the socket 47 while being engaged with the neck of the socket 47 of the connecting pipe 44, so that the detachment preventive ring 61 is fixed on the outer periphery of the connecting pipe 44.

Next, the retaining members 51 are fitted into the retaining recesses 54. In this state, the spigot 46 of the cut pipe 42 is inserted into the socket 47 of the connecting pipe 44, and then a press bolt 58 is tightened up to press the retaining member 51 towards the inward 52 in the pipe diameter direction. Thus, cutting-in projections 55 cut into the outer peripheral surface of the spigot 46 of the cut pipe 42.

With this configuration, when earthquake deformation causes a detachment force to be applied to the pipe joint, and the cut pipe 42 and the connecting pipe 44 are relatively detached and moved from each other, the wedging mechanisms 53 cause the retaining members 51 to cut in and move towards the inward 52 side in the pipe diameter direction, and the cutting-in projections 55 cut into the outer peripheral surface of the spigot 46. Thus, the connected state of the spigot 46 of the cut pipe 42 and the socket 47 of the connecting pipe 44 is forcibly maintained.

Figure 16:
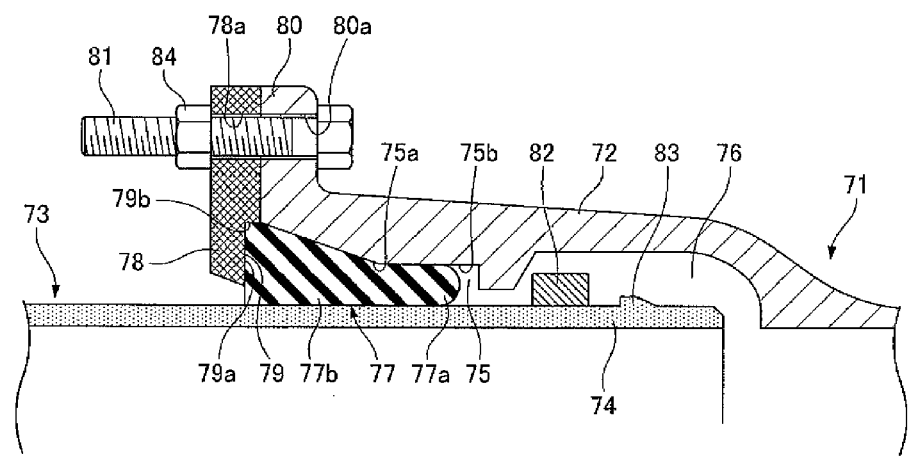
FIG. 16 shows a pipe joint according to another embodiment of the present invention.
Figure 17:
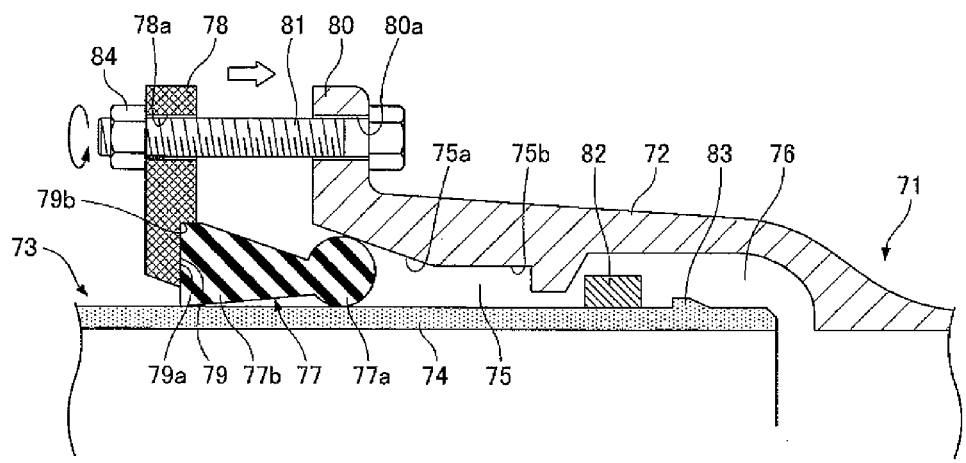
FIG. 17 shows the joining operation of the pipe joint of FIG. 16.

FIGS. 16 and 17 show the cross-sectional structure of a pipe joint of a mechanical type according to the present invention.

In the pipe joint, a socket 72 is formed on an end of one pipe 71 made of ductile cast iron, and a spigot 74 inserted into the socket 72 is formed on an end of another pipe 73 made of ductile cast iron, the pipes 71 and 73 being joined to each other. On the inner circumference of the socket 72, a sealing material accommodating portion 75 is formed at the opening end of the socket 72 and a lock ring accommodating groove 76 is formed closer to the socket inner side than the sealing material accommodating portion 75. The sealing material accommodating portion 75 has a tapered surface 75a reduced in diameter from the opening end towards the inner side of the socket 72, and a cylindrical surface 75b extended with a constant diameter from the inner end of the tapered surface 75a towards the inner side of the socket 72.

In a space where the sealing material accommodating part 75 is provided, that is, a space between the inner circumferential surface of the socket 72 and the outer peripheral surface of the spigot 74 where the sealing material accommodating part 75 is formed, an annular sealing material 77 made of rubber is accommodated. The sealing material 77 is pushed into the inner side of the socket 72 by an annular-plate-like push ring 78 made of metal. The push ring 78 is disposed on the outer periphery of a portion of the spigot 74 not inserted into the socket 72. Thus, the sealing material 77 is compressed between the inner circumferential surface of the socket 72 and the outer peripheral surface of the spigot 74 to seal the space between the inner circumferential surface of the socket 72 and the outer peripheral surface of the spigot 74.

The sealing material 77 integrally includes a circular distal end portion 77a formed at a point serving as the distal end of the sealing material 77 pushed into the socket 72, and a base portion 77b having a trapezoidal cross section. The circular distal end portion 77a has a circular cross section, and the trapezoidal cross section of the base portion 77b is thin at a point connected to the circular distal end portion 77a and is thicker as it is closer to the push ring 78.

In the push ring 78, a stepped concave 79 is formed, into which a part of the base portion 77b of the sealing material 77 is fitted, for preventing the part of the base portion 77b from moving in a diameter expansion direction (outward in the pipe diameter direction). Specifically, a portion inward in the pipe diameter direction on a surface of the plate-like push ring 78 facing the socket 72 is more recessed than a portion outward in the pipe diameter direction on the surface, so as to be thinner in the pipe axial direction. The stepped concave 79 has a concave bottom surface 79a and a stepped portion 79b formed at the boundary between the bottom surface 79a and the portion outward in the pipe diameter direction. The push ring 78 is attached such that the end of the base portion 77b of the sealing material 77 is fitted into the stepped concave 79 of the push ring 78.

As shown in FIG. 16, in a state in which the sealing material 77 is attached, a surface of the push ring 78 facing a flange 80 is closely attached to the end surface of the flange 80 formed on the outer periphery of the socket 72.

Figure 18:
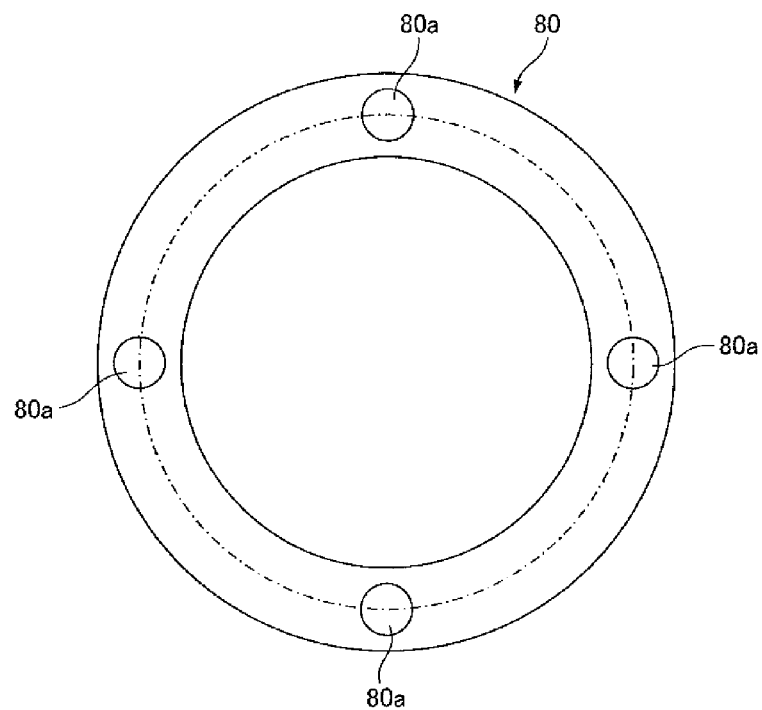
FIG. 18 shows the end surface of a socket flange in the pipe joint of FIG. 16.
Figure 19:
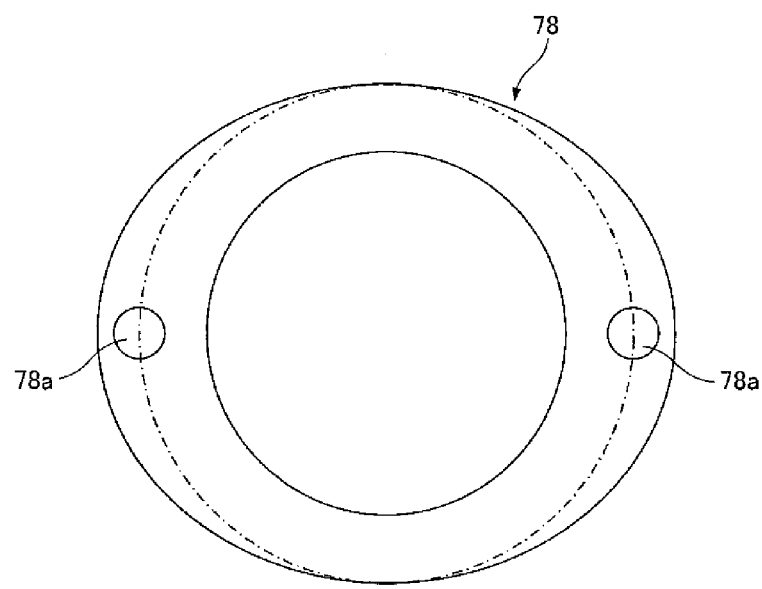
FIG. 19 is a front view showing a push ring in the pipe joint of FIG. 16.

Specifically, as shown in FIG. 18, through holes 80a extending in the pipe axial direction are formed in the flange 80. As shown in FIG. 19, through holes 78a extending in the pipe axial direction are formed also in the push ring 78. As shown in FIGS. 16 and 17, bolts 81 for fastening the push ring 78 to the flange 80 pass through the through holes 80a and 78a.

As many through holes 78a of the push ring 78 as the bolts 81 are equally spaced along the circumferential direction. Meanwhile, the through holes 80a of the flange 80 equally spaced along the circumferential direction are, for example, multiple times as many as the bolts 81.

In the illustration, two fastening bolts 81 are used. Correspondingly, in the push ring 78, two through holes 78a are formed at 180° intervals along the circumferential direction. In the flange 80, four through holes 80a are formed at 90° intervals along the circumferential direction.

In the lock ring accommodating groove 76, an annular lock ring 82 singularly divided in the circumferential direction is accommodated. When the lock ring 82 is accommodated, the lock ring 82 is elastically pressed against the outer periphery of the spigot 74. A projection 83 is formed on the outer periphery of the distal end portion of the spigot 74 so as to be engaged with the lock ring 82.

In the above configuration, when the pipes 71 and 73 are joined to each other, the lock ring 82 has been accommodated in the accommodating groove 76 of the socket 72, and the push ring 78 and the sealing material 77 have been fitted onto the spigot 74. The spigot 74 in this state is inserted into the socket 72. Thus the projection 83 of the spigot 74 elastically pushes out the lock ring 82 and passes through the lock ring 82 to the inner side of the socket 72. After the projection 83 passes through the lock ring 82, the lock ring 82 is pressed against the outer peripheral surface of the spigot 74 by the elastic force.

Thereafter, the sealing material 77 and the push ring 78 having been fitted onto the spigot 74 are disposed at positions shown in FIG. 17. Specifically, the distal end portion of the sealing material 77 comes into contact with the tapered surface 75a of the accommodating portion 75, and the sealing material 77 and the push ring 78 are disposed at such a position that the push ring 78 is in contact with the base portion 77b of the sealing material 77. Further, the bolts 81 are made to pass through the through holes 78a of the push ring 78 and the through holes 80a of the flange 80 to screw the bolts 81 into nuts 84.

At this point, since the stepped concave 79 is formed in the push ring 78, the base portion 77b of the sealing material 77 is fitted into the stepped concave 79 of the push ring 78 only by bringing the sealing material 77 into contact with the push ring 78. The centers of the sealing material 77 and push ring 78 are aligned with each other. Thus the centering of the sealing material 77 can be easily performed.

After that, the bolts 81 are tightly screwed into the nuts 84, thereby moving the push ring 78 towards the flange 80 to compress and insert the sealing material 77 into the accommodating portion 75. Specifically, first, as shown in FIG. 17, the circular distal end portion 77a of the sealing material 77 comes into contact with the tapered surface 75a of the sealing material accommodating portion 75, and the sealing material 77 is entirely accommodated in the accommodating portion 75 while being guided by the tapered surface 75a.

At this point, in response to the force of the push ring 78 pushing the sealing material 77, a reaction force is generated to push back the sealing material 77 to the push ring 78 side, from the tapered surface 75a of the sealing material accommodating portion 75 in contact with the circular distal end portion 77a of the sealing material 77 and the outer peripheral surface of the spigot 74. The reaction force moves the base portion 7b of the sealing material 77 along the pressing surface of the pressing ring 78 in the diameter expansion direction, with a contact portion of the outer peripheral surface of the spigot 74 and the inner circumferential surface of the socket 72 at the circular distal end portion 77a of the sealing material 77 as the fulcrum of moment.

However, since the stepped concave 79 is formed in the push ring 78 to prevent the base portion 77b of the sealing material 77 from moving in the diameter expansion direction, that is, outward in the pipe diameter direction, the sealing material 77 is prevented from being moved in the diameter expansion direction. As a result, the base portion 77b of the sealing material 77 does not move in the diameter expansion direction. Thus the sealing material 77 is satisfactorily accommodated in the accommodating portion 75 and is placed in a favorable compressed state. After that, until the push ring 78 is sufficiently brought into contact with the flange 80, that is, the push ring 78 and the flange 80 are in a metal touch state, the nuts 84 are tightened up.

In this configuration, since the sealing material 77 is pressed with the push ring 78 sufficiently brought into contact with the flange 80 formed on the outer periphery of the socket 72, the sealing material 77 is satisfactorily compressed between the socket 72 and the spigot 74 only by closely attaching the push ring 78 to the flange 80. This eliminates the need for carefully controlling intervals between the push ring and the flange, unlike in a known mechanical pipe joint. Thus, the push ring 78 can be efficiently attached to the flange 80 and the sealing material 77 can be easily held in a favorable compressed state.

Further, the push ring 78 is provided only to push the sealing material 77 into the accommodating portion 75 and hold the pushed sealing material 77 in the accommodating portion 75 against a fluid pressure in the socket 72. Compared to the known mechanical pipe joint in which a bolt causes a compression force to act on a sealing material to exhibit desired sealing properties, the present embodiment can reduce the tightening force and the number of bolts 81.

Moreover, the push ring 78 has the stepped concave 79, so that the sealing material 77 can be satisfactorily held in the accommodating portion 75 without moving in the diameter expansion direction when the push ring 78 presses the sealing material 77. Thus, even if the circular distal end portion 77a of the sealing material 77 has a larger cross section than that in the known pipe joint, the sealing material 77 can be inserted into the accommodating portion 75 without any difficulties. With this configuration, after the sealing material 77 is once accommodated in the accommodating portion 75, the circular distal end portion 77a of the compressed sealing material 77 receives a relatively large force to adhere tightly to the cylindrical surface 75b of the sealing material accommodating portion 75 and the outer peripheral surface of the spigot 74. In other words, after the push ring 78 is moved until the push ring 78 comes into close contact with the flange 80, it is not necessary to constantly apply a high specific pressure to the sealing material 77 by the push ring 78. Thus, even in the case where the nuts 84 are loosened, the sealing properties of the sealing material 77 can be favorably maintained.

In the illustration, in the flange 80 formed on the outer periphery of the socket 72, the through holes 80a twice as many as the bolts 81 actually used are formed. Thus, even in the case where the pipe 71 having the socket 72 is a deformed pipe buried in a predetermined orientation in the ground, the bolts 81 may be inserted into the through holes 80a of the socket 72 not positioned at the bottom of the pipe 71.

Specifically, when only two through holes 80a of the flange 80 of the socket 72 as many as the bolts 81 are formed, the through holes 80a may be forced to be arranged at the upper portion (pipe top) and the lower portion (pipe bottom) of the flange 80. In such a case, the bolts 81 have to pass through the through holes 80a and 78a at the pipe bottom serving as the ground contact area, and the nuts 84 have to be tightened up, thereby disadvantageously involving much time and effort. On the other hand, in the illustration, even in similar conditions, the through hole 80a in the side portion of the flange 80 may be selected to have the bolt 81 placed into the through hole 80a. Specifically, the bolts 81 can be placed away from the bottom of the pipe 71 and the bolts 81 can be efficiently tightened up.

The number of bolts 81 is not limited to two as in the illustration, but the same configuration may be adopted even when the number of bolts 81 is at least three. In such a case, the number of through holes 78a formed in the push ring 78 corresponds to the number of bolts 81, and through holes 80a twice (or an integer at least three times is possible) as many as the through holes 78a may be formed in the flange 80.

Since the push ring 78 can freely rotate about the axis, the through holes 78a as many as the bolts 81 have only to be formed.

In contrast, the through holes 80a as many as the bolts 81 (the through holes 78a of the push ring 78) may be formed in the flange 80. In addition, a sealing material having a circular distal end portion 77a which is not as large as that in the illustration may be used as in the known pipe joint. Thus, in the pipe joint having the known structure, only a push ring 78 is changed to the plate-like push ring having the stepped concave 79 as in the illustration, so that existing products may be used for parts other than the push ring 78.

Figure 20:
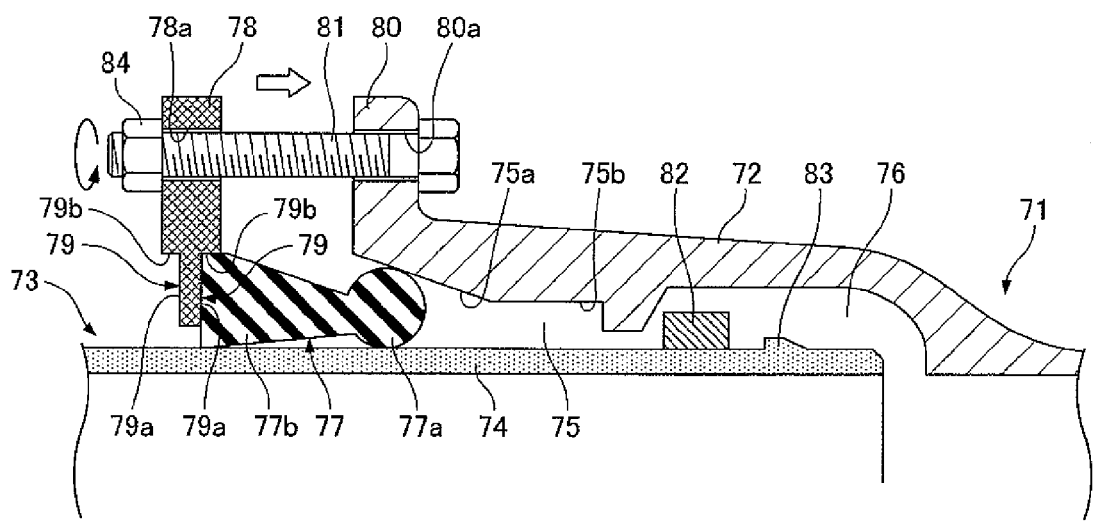
FIG. 20 shows a pipe joint according to another embodiment of the present invention.

As shown in FIGS. 16 and 17, the stepped concave 79 is formed only on the surface of the push ring 78 facing the socket 72. However, in addition to this, as shown in FIG. 20, a stepped concave 79 may be formed also on a surface opposed to the surface of the push ring 78 facing the socket 72. Specifically, stepped concaves 79 may be provided on two surfaces of the plate-like push ring 78.

In the configuration in which the stepped concaves 79 are provided on the two surfaces of the plate-like push ring 78, when the push ring 78 is fitted onto a spigot 74 beforehand, a sealing material 77 is reliably fitted into the stepped concave 79 in joining the pipes, no matter which one of the two surfaces of the push ring 78 the socket 72 faces. Regardless of the orientation of the surface of the push ring 78, nuts 84 can be tightened up until the push ring 78 is reliably brought into close contact with a flange 80.

Therefore, since the stepped concaves 79 are formed on the two surfaces of the push ring 78, when the push ring 78 is fitted onto the spigot 74, an operator does not have to worry about misorienting the surfaces of the push ring. Thus, operation errors can be avoided and the confirmation of orientation of the surfaces can be omitted, so that the operation efficiency can be improved.

FIGS. 21 to 24 show a modification example of the pipe joint according to the present invention.

Figure 21:
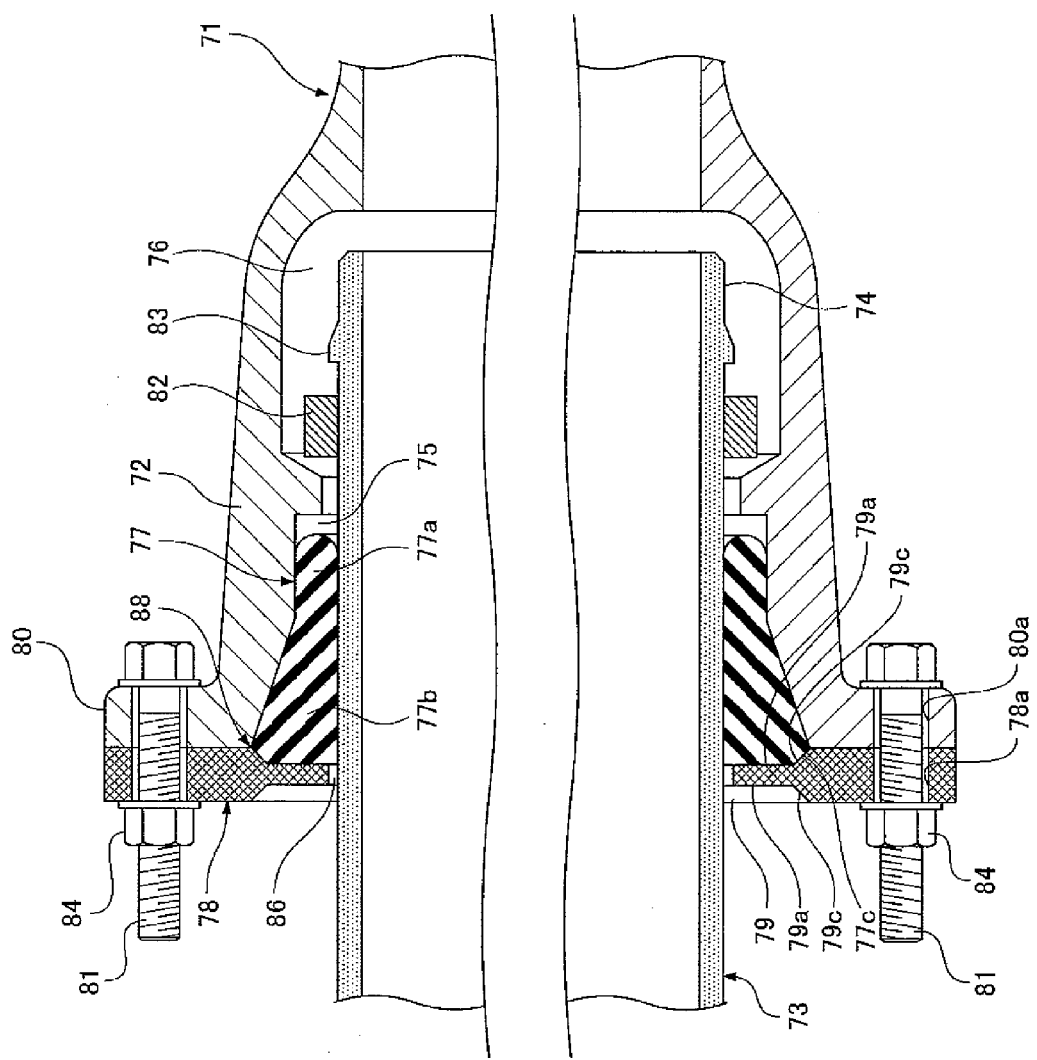
FIG. 21 shows a pipe joint according to another embodiment of the present invention.
Figure 22:
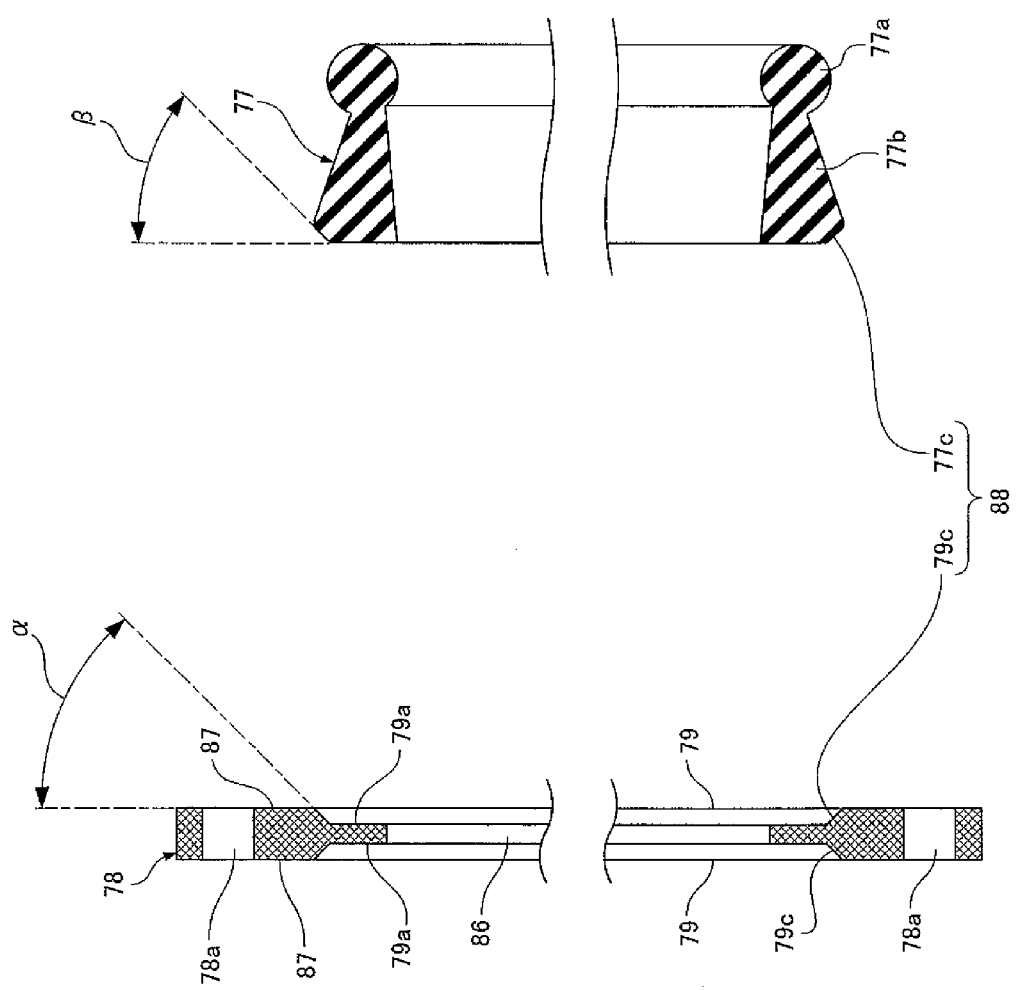
FIG. 22 shows a push ring and a sealing material in the pipe joint of FIG. 21.

As shown in FIGS. 21 and 22, a push ring 78 has a center hole portion 86 formed so as to penetrate the push ring, a plurality of through holes 78a formed in the circumferential direction for allowing bolts 81 to pass through the through holes 78a, and joint surfaces 87 in contact with the opening end surface of a socket 72. The inner diameter of the center hole portion 86 of the push ring 78 is set larger by a predetermined dimension than the outer diameter of a spigot 74.

On two surfaces of the push ring 78 along the pipe axial direction, annular stepped concaves 79 are formed. The end of a base portion 77b of a sealing material 77 is fitted into the stepped concave 79. The concave 79 has a bottom surface 79a and a constraint surface 79c formed in the vicinity of the bottom surface 79a.

Reference numeral 88 denotes a centering mechanism. The centering mechanism 88 has the constraint surface 79c of the stepped concave 79 of the push ring 78 and a tapered surface 77c formed over the outer peripheral edge of the base portion 77b of the sealing material 77.

The constraint surface 79c of the concave 79 is tapered such that the diameter of the constraint surface is gradually expanded towards the socket 72. The tapered surface 77c of the sealing material 77 is formed along the tapered portion of the constraint surface 79c. Specifically, the tapered surface 77c of the sealing material 77 is formed such that the diameter of the tapered surface 77c is gradually expanded towards a circular distal end portion.

Inclination angle α of the constraint surface 79c and inclination angle β of the tapered surface 77c with respect to the pipe diameter direction are the same and, for example, 60°. The concave bottom surface 79a of the push ring 78 and the end surface of the base portion 77b of the sealing material 77 are formed in the pipe diameter direction.

Figure 23:
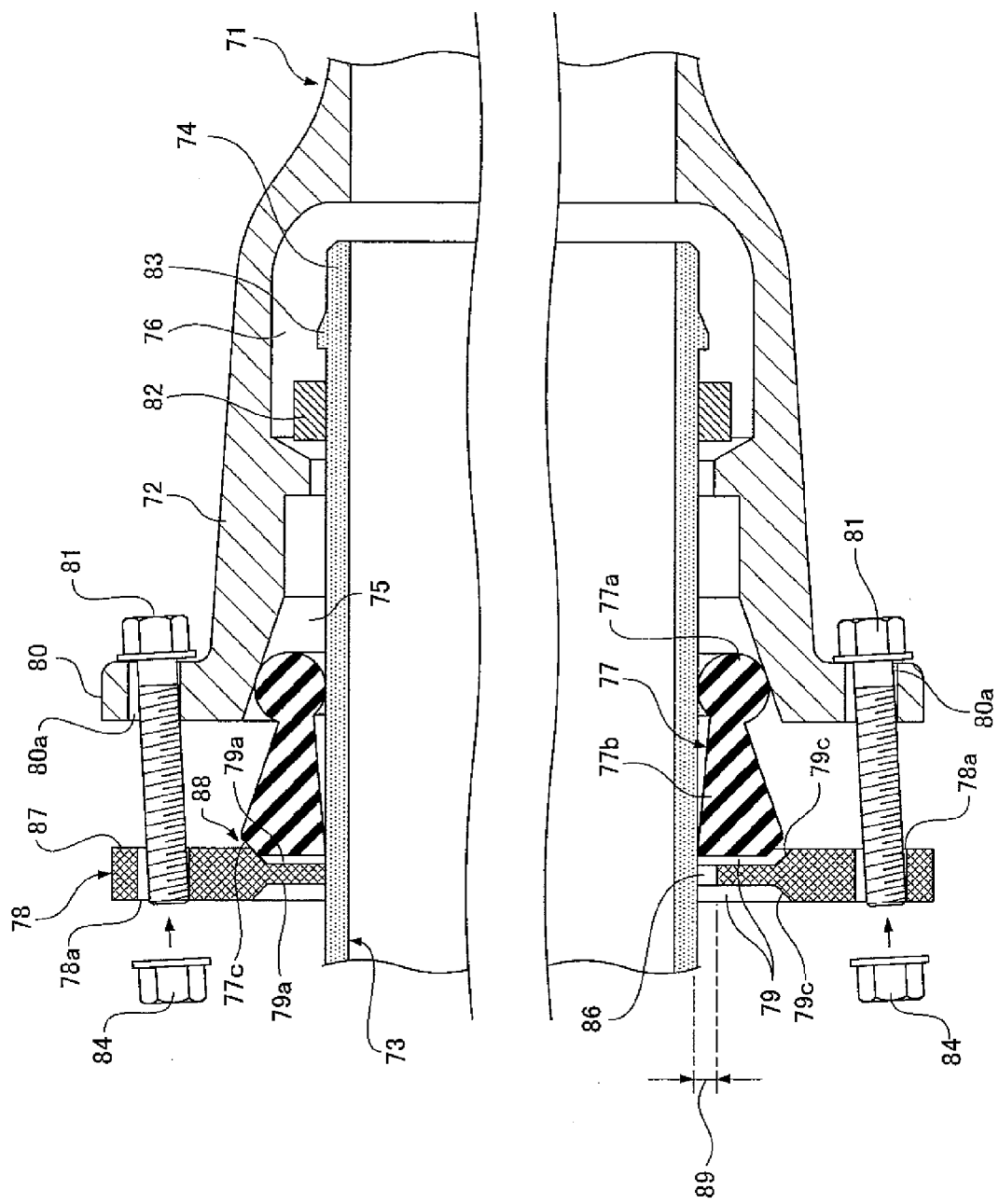
FIG. 23 shows the joining operation of the pipe joint of FIG. 21.

In such a configuration, when one pipe 71 and another pipe 73 are joined to each other, as shown in FIG. 23, first, a lock ring 82 is fitted into a lock ring accommodating groove 76 in the socket 72. Further, as in the illustration, the sealing material 77 and the push ring 78 are fitted onto the spigot 74, and the distal end portion of the base portion 77b of the sealing material 77 is fitted into the concave 79 of the push ring 78. In this state, the spigot 74 is inserted into the socket 72.

Figure 24:
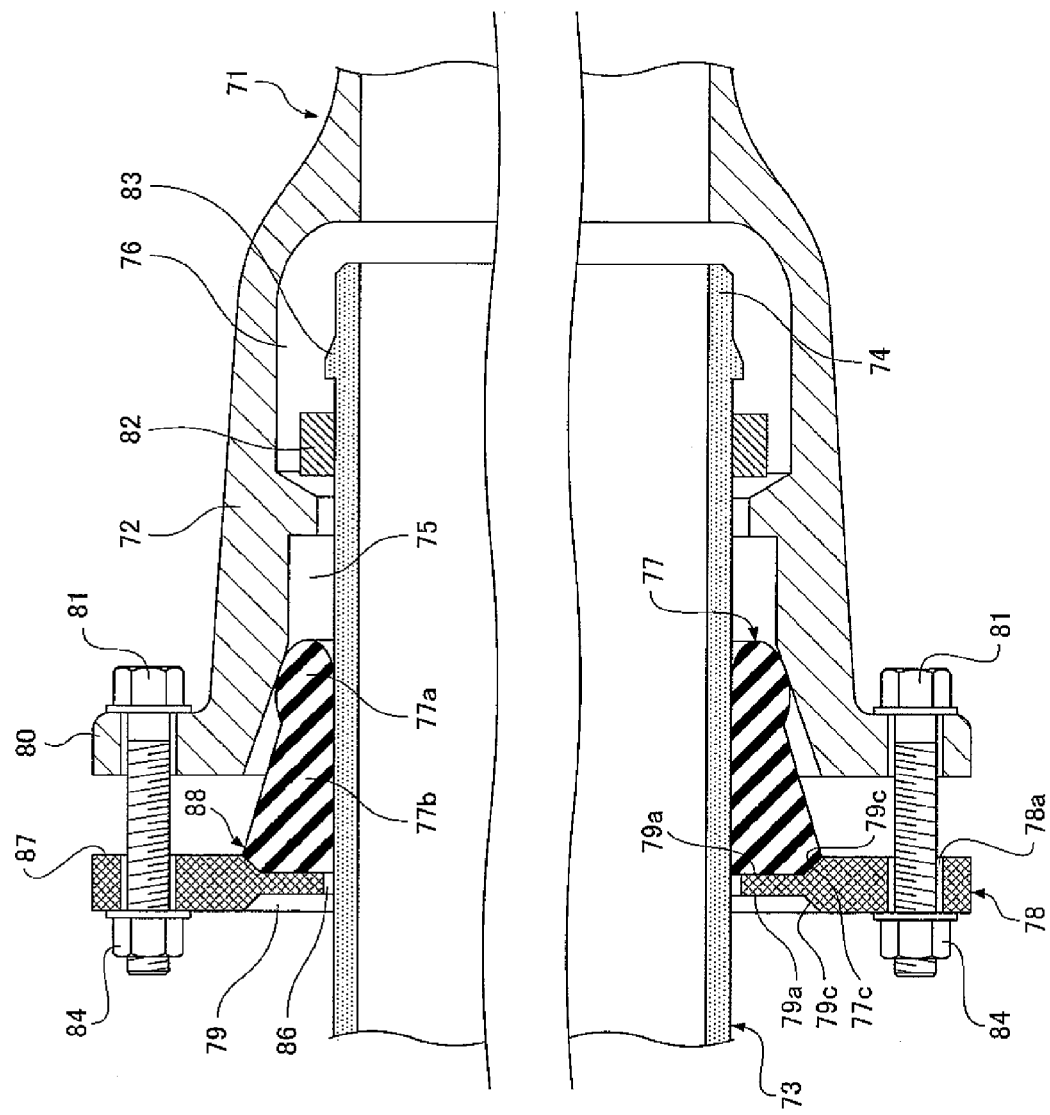
FIG. 24 shows the operating stage following the joining operation of FIG. 23.

When a projection 83 of the spigot 74 passes through the inner circumference of the lock ring 82 towards the inner side of the socket 72, the bolts 81 are inserted through the through holes 80a and the through holes 78a. As shown in FIG. 24, nuts 84 are tightened up to move the push ring 78 closer to the socket 72. Thus, as shown in FIG. 21, the sealing material 77 is pushed by the push ring 78 into a gap between the outer peripheral surface of the spigot 74 and the inner circumferential surface of the socket 72, and is accommodated in a sealing material accommodating portion 75. The nuts 84 are tightened up to bring the joint surface 87 of the plate-like push ring 78 into contact with the end surface of the socket 72.

At this point, the end of the base portion 77b of the sealing material 77 is constrained in the pipe diameter direction by the constraint surface 79c of the concave 79. Thus, the end of the base portion 77b of the sealing material 77 is prevented from moving (deforming) along the bottom surface 79a of the concave 79 in the pipe diameter direction, so that the base portion 77b of the sealing material 77 is not interposed between the joint surface 87 of the push ring 78 and the opening end surface of the socket 72 (effect of preventing the sealing material 77 from being interposed). In addition, the joint surface 87 of the push ring 78 is brought into surface contact with the opening end surface of the socket 72, so that the sealing material 77 can be satisfactorily inserted into the accommodating portion 75.

In the above-described joining step, as shown in FIG. 23, when the sealing material 77 and the push ring 78 are fitted onto the spigot 74, the center of the push ring 78 is placed below the pipe axis by the action of gravity. Thus, a gap 89 between the inner circumference of the center hole portion 86 of the push ring 78 and, the outer periphery of the spigot 74 is the smallest (=0) at the pipe top and the largest at the pipe bottom.

In this sate, when the nuts 84 are tightened up to move the push ring 78 in the pipe axial direction, as shown in FIG. 24, the constraint surface 79c of the push ring 78 is guided in contact with the tapered surface 77c of the sealing material 77 along the pipe diameter direction. Thus, the push ring 78 gradually rises against the spigot 74, so that the center of the push ring 78 is aligned with the pipe axis. That is, the push ring 78 is automatically centered (effect of automatically centering the push ring 78). While the centered state is maintained, as shown in FIG. 21, the one pipe 71 and the other pipe 73 are joined to each other. This saves an operator the effort of lifting up and moving the push ring 78 in the pipe diameter direction and centering the push ring 78.

As in the illustration, since the stepped concaves 79 are formed on the two surfaces of the push ring 78, when the pipes 71 and 73 are joined to each other, the push ring 78 may be fitted onto the spigot 74 in any direction.

Figure 25:
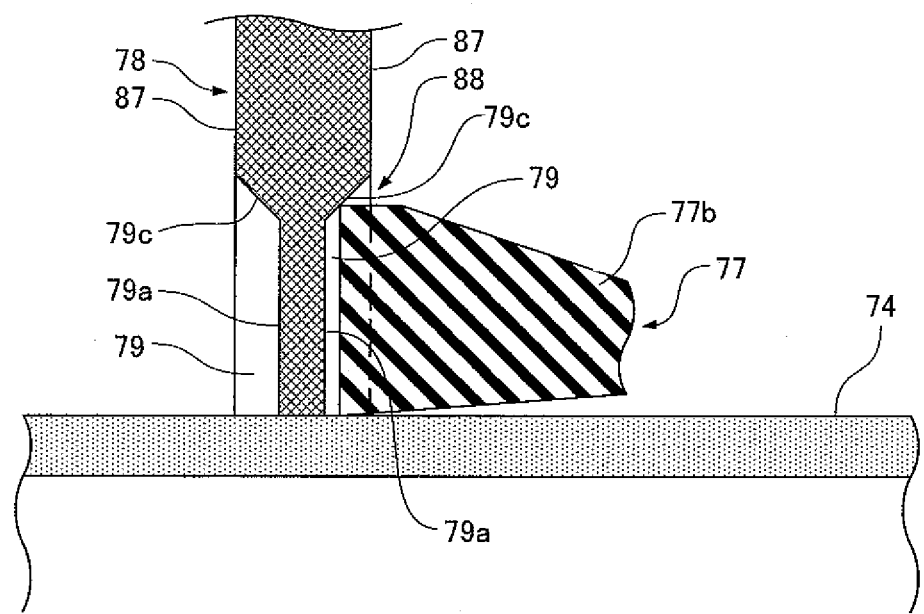
FIG. 25 shows a modification example of the pipe joint of FIG. 21.

FIG. 25 shows a modification example of the pipe joint shown in FIGS. 21 to 24. In the pipe joint shown in FIGS. 21 to 24, as specifically shown in FIG. 22, the centering mechanism 88 has the tapered constraint surface 79c formed in the stepped concave 79 of the push ring 78 and the tapered surface 77c formed at the end of the base portion 77b of the sealing material 77. Instead, in the modification example of FIG. 25, a sealing material 77 does not have a tapered surface, and a centering mechanism 88 has only a tapered constraint surface 79c.

In this configuration, the nuts 84 are tightened up to move the push ring 78 in a push direction, so that the constraint surface 79c of the push ring 78 is brought into contact with the outer peripheral edge of a base portion 77b of the sealing material 77 and guided in the pipe diameter direction.

Figure 26:
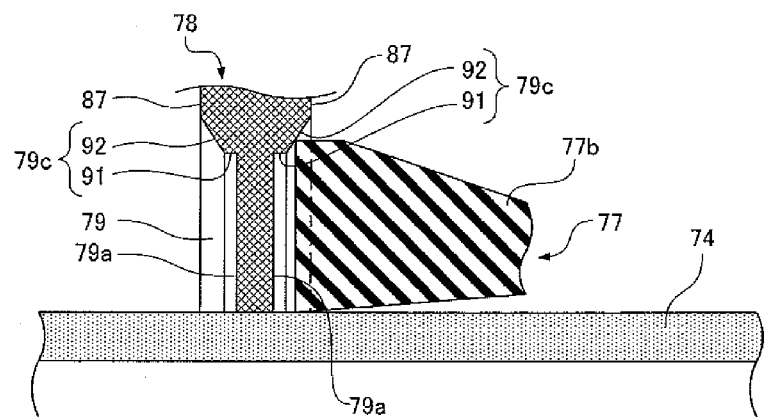
FIG. 26 shows the joining operation in another modification example of the pipe joint of FIG. 21.
Figure 27:
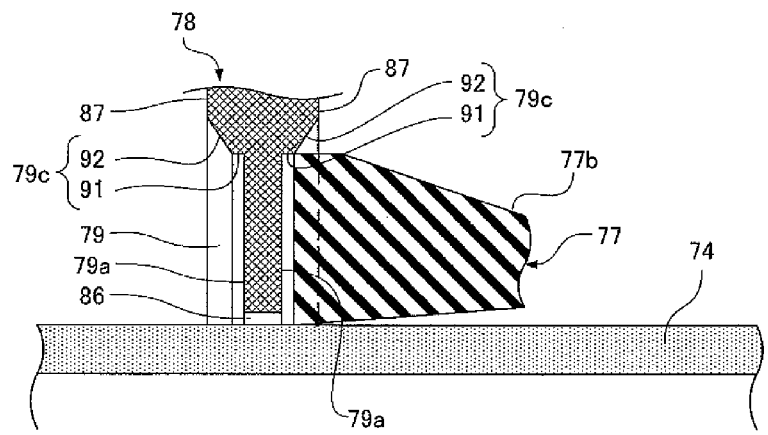
FIG. 27 shows the operating stage following the joining operation of FIG. 26.
Figure 28:
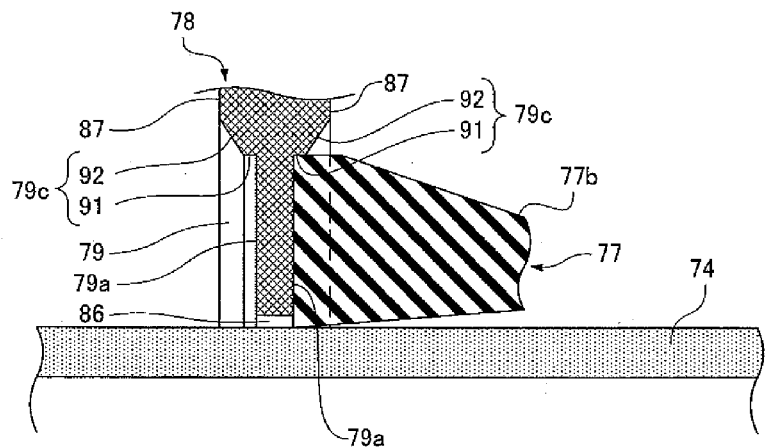
FIG. 28 shows the operating stage following the stage of FIG. 27.

FIGS. 26 to 28 show another modification example of the pipe joint shown in FIGS. 21 to 24. In the modification example, a constraint surface 79c has a straight portion 91 formed in a direction orthogonal to a bottom surface 79a, and a tapered portion 92 diameter-expanded towards the socket 72. The straight portion 91 is positioned on the bottom side of a concave 79, and the tapered portion 92 is positioned on the opening side of the concave 79. As shown in FIG. 28, the straight portion 91 is fitted into the end of the base portion 77b of the sealing material 77 having no tapered surface at the outer peripheral edge of the end of the base portion 77b.

In such a configuration, as shown in FIG. 26, when the nuts 84 are tightened up to move a push ring 78 closer to the socket 72, the tapered portion 92 of the constraint surface 79c of the push ring 78 is brought into contact with the peripheral edge of the end of the base portion 77b of the sealing material 77 and is guided in the pipe diameter direction. Thus, as shown in FIG. 27, the push ring 78 gradually rises against the spigot 74, the center of the push ring 78 is aligned with the pipe axis, and the push ring 78 is automatically centered. Further, as shown in FIG. 28, the end of the base portion 77b of the sealing material 77 is fitted into the straight portion 91 of the constraint surface 79c, and in this state, the one pipe 71 and the other pipe 73 are joined to each other.

As shown in FIG. 28, the end of the base portion 77b of the sealing material 77 is fitted into the straight portion 91 of the constraint surface 79c, so that the base portion 77b of the sealing material 77 is reliably constrained by the straight portion 91 of the constraint surface 79c in the diameter expansion direction. Thus, the base portion 77b of the sealing material 77 can be prevented from moving (deforming) along the bottom surface 79a of the concave 79 in the pipe diameter direction.

Figure 29:
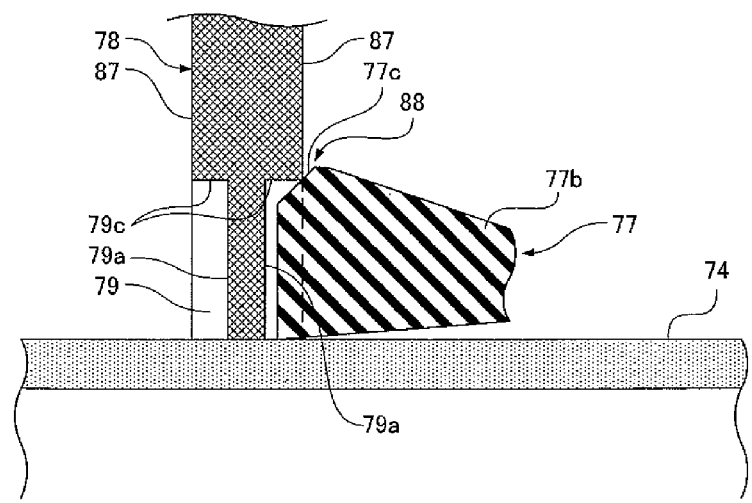
FIG. 29 shows another modification example of the pipe joint of FIG. 21.

FIG. 29 shows still another modification example of the pipe joint shown in FIGS. 21 to 24. In this modification example, constraint surfaces 79c of a push ring 78 are not tapered but straight in the pipe axial direction. Thus, a centering mechanism 88 includes only a tapered surface 77c of a sealing material 77.

In this configuration, the nuts 84 are tightened up to move the push ring 78 closer to the socket 72, so that the corner portion of the constraint surface 79c and a joint surface 87 of the push ring 78 is brought into contact with the tapered surface 77c of the sealing material 77. Thus, the push ring 78 is guided in the pipe diameter direction.

The following will describe the inclination angle α of the constraint surface 79c and the inclination angle β of the tapered surface 77c of the sealing material 77 which are shown in FIG. 22. It is preferable that the inclination angles α and β are set to be 60° as described above, but the inclination angles may be set in a range of 50° to 80°.

Table 1 shows experimental results obtained by determining whether the above-described "effect of preventing the sealing material 77 from being interposed" is produced and whether the above-described "effect of automatically centering the push ring 78" is produced when the inclinations angles α and β are changed. As described above, "the effect of preventing the sealing material 77 from being interposed" is an effect of preventing the end of the base portion 77b of the sealing material 77 from being interposed between the joint surface 87 of the push ring 78 and the opening end surface of the socket 72. Further, "the effect of automatically centering the push ring 78" is an effect of automatically centering the push ring 78 with respect to the spigot 74.

As shown in Table 1, the inclination angles α and β are set in a range of 50° to 80°, so that both the effect of preventing the sealing material 77 from being interposed and the effect of automatically centering the push ring 78 are surely exerted.

In contrast, in the case where the inclination angles α and β are set less than 50°, the constraint function of the constraint surface 79c is insufficient for the base portion 77b of the sealing material 77, so that the base portion 77b of the sealing material 77 easily slides along the constraint surface 79c and moves (deforms) in the diameter expansion direction. Conversely, in the case where the inclination angles α and β exceed 80°, the push ring 78 insufficiently rises against the spigot 74, the center of the push ring 78 is not aligned with the pipe axis.

The inclination angle α of the constraint surface 79c of the push ring 78 and the inclination angle β of the tapered surface 77c of the sealing material 77 may be the same or different from each other within a range of 50° to 80°.

TABLE 1

| Inclination angle (°) | Effect of preventing sealing material from being interposed | Effect of automatically centering push ring |
|---|---|---|
| 30 | Not produced | Produced |
| 35 | Not produced | Produced |
| 40 | Not produced | Produced |
| 45 | Not produced | Produced |
| 50 | Produced | Produced |
| 55 | Produced | Produced |
| 60 | Produced | Produced |
| 65 | Produced | Produced |
| 70 | Produced | Produced |
| 75 | Produced | Produced |
| 80 | Produced | Produced |
| 85 | Produced | Not produced |
| 90 | Produced | Not produced |

In the embodiment of FIGS. 21 to 29, the stepped concaves 79 are formed on the two surfaces of the plate-like push ring 78. However, the concave 79 may be formed on only one of the two surfaces of the plate-like push ring 78.

FIGS. 30 to 33 show another embodiment of the present invention.

In the illustration, a stepped concave 79 and a sealing material 77 do not have a tapered surface. However, the stepped concave 79 and the sealing material 77 may have a tapered surface.

Figure 30:
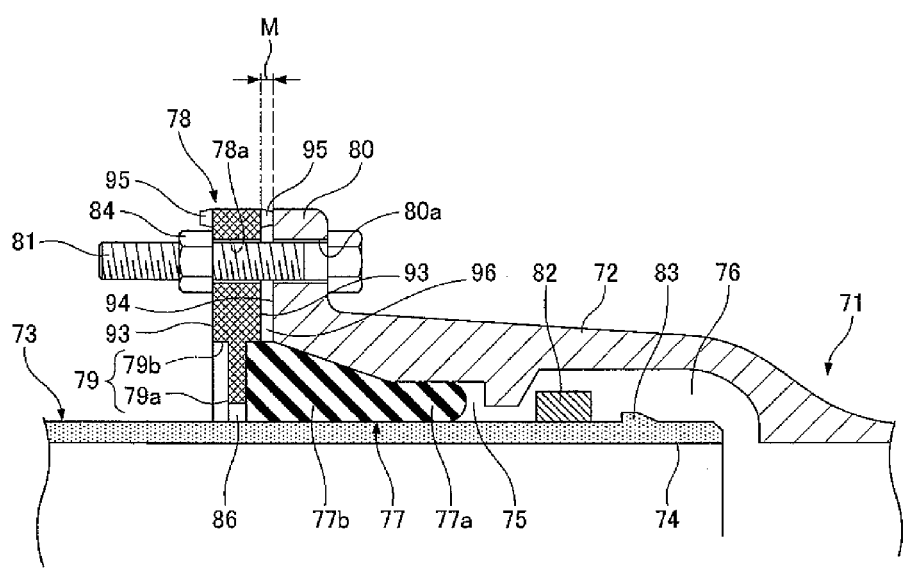
FIG. 30 shows a pipe joint according to another embodiment of the present invention.
Figure 31:
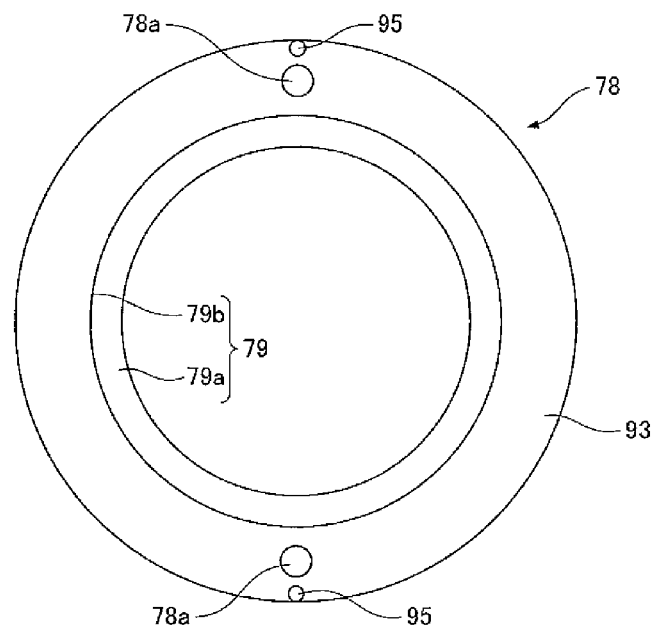
FIG. 31 shows a push ring in the pipe joint of FIG. 30.

A plurality of spacers 95 are interposed between a side surface 93 of a push ring 78 and an end surface 94 of a socket 72. As shown in FIGS. 30 and 31, the spacers 95 are integrally formed on two surfaces of the plate-like push ring 78 made of ductile cast-iron. In the illustration, two spacers 95 are disposed at 180° intervals along the circumferential direction of the push ring 78. Two through holes 78a of the push ring 78 are disposed at 180° intervals along the circumferential direction of the push ring 78. The spacers 95 and the through holes 78a are formed in the same positions along the circumferential direction of the push ring 78. The spacers 95 are formed closer to the outer side along the diameter direction of the push ring 78 than the through holes 78a. The spacers 95 are formed in a truncated conical shape so as to project from the push ring 78 in the pipe axial direction as in the illustration. Height M from the side surface 93 of the push ring 78 to the distal end portion of the spacer 95 is set constant.

Figure 32:
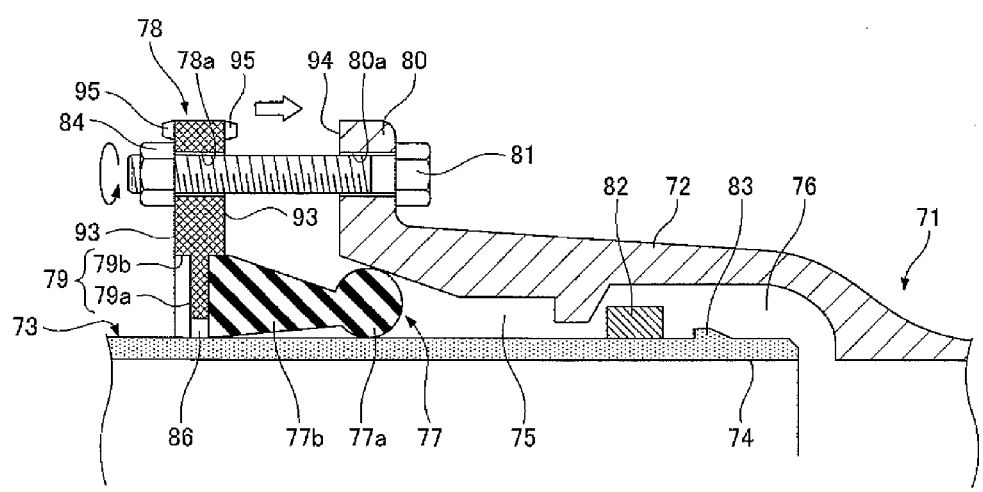
FIG. 32 shows the joining operation of the pipe joint of FIG. 30.

In this configuration, when one pipe 71 and another pipe 73 are joined to each other, as shown in FIG. 32, after a spigot 74 is inserted into the socket 72, bolts 81 are made to pass through the through holes 78a of the push ring 78, and nuts 84 are tightened up to move the push ring 78 closer to the socket 72. Thus, the sealing material 77 is pushed into a gap between the outer peripheral surface of the spigot 74 and the inner circumferential surface of the socket 72 by the push ring 78 and is accommodated in an accommodating portion 75.

The push ring 78 is moved closer to the socket 72 in this way, so that the distal ends of the spacers 95 hit against the end surface 94 of the socket 72. Thus, a gap 96 between the side surface 93 of the push ring 78 and the end surface 94 of the socket 72 can be accurately and easily kept at a value equal to the height M of the spacer 95. As a result, the sealing material 77 can be prevented from being insufficient in sealing properties and pushed by an excessive force.

Figure 33:
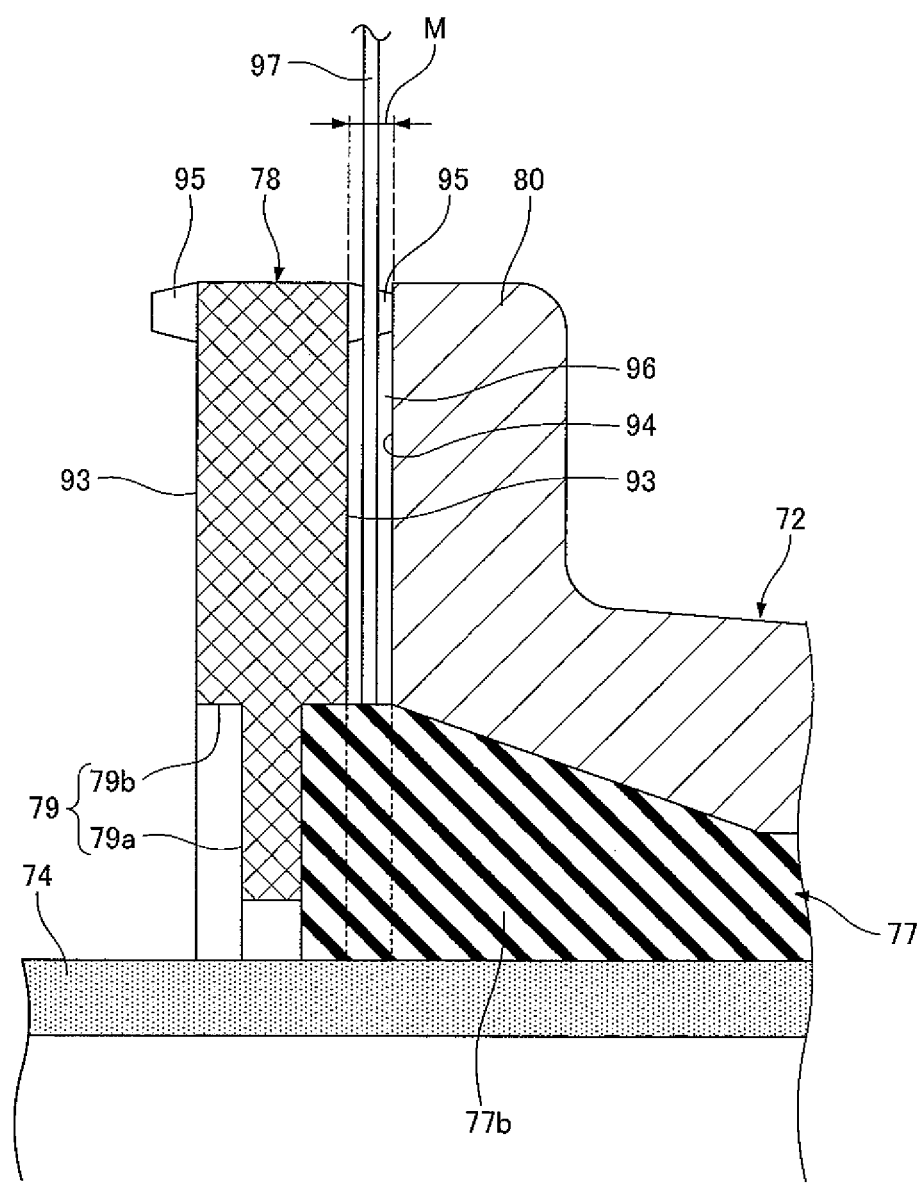
FIG. 33 shows a method for inspecting the pipe joint of FIG. 30.

Further, the state of the attached sealing material 77 can be visually confirmed through the gap 96. As shown in FIG. 33, a special thin-plate-like gauge 97 is inserted into the gap 96, and the distal end of the gauge 97 is brought into contact with the outer peripheral surface of a base portion 77b of the sealing material 77, so that a distance in the diameter direction from the outer peripheral surface of a flange 80 of the socket 72 or the outer peripheral surface of the push ring 78 to the outer peripheral surface of the base portion 77b of the sealing material 77 can be measured. Thus, the state of the attached sealing material 77 can be confirmed more accurately.

As in the illustration, since the spacers 95 are arranged along with the through holes 78a in the same diameter direction and the spacers 95 are positioned near the through holes 78a, as shown in FIG. 30, when the push ring 78 is fastened to the flange 80 of the socket 72 by the bolts 81 and the nuts 84, the tightening force of the bolts 81 acts in the vicinity of the spacers 95. Thus, the bending deflection of the push ring 78 in the thickness direction can be reduced.

Figure 34:
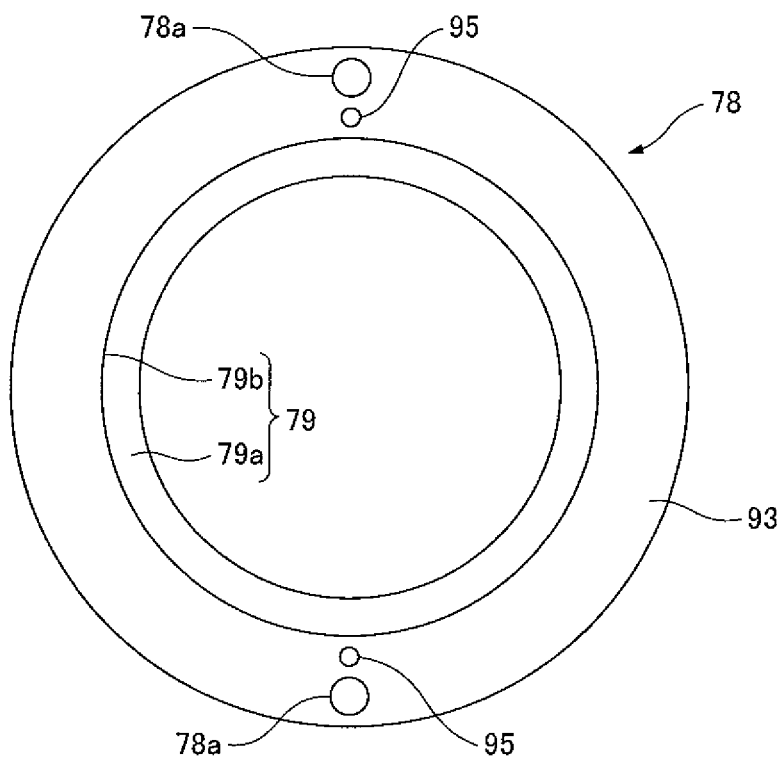
FIG. 34 shows a modification example of the push ring which can be used in the pipe joint of FIG. 30.

As shown in FIG. 34, the spacers 95 may be formed closer to the inner side in the diameter direction of the push ring 78 than the through holes 78a.

Figure 35:
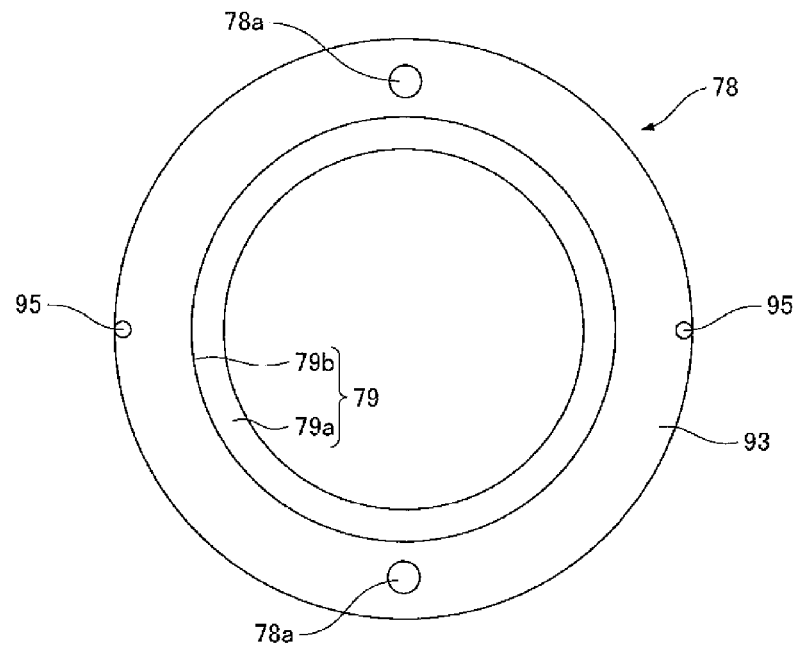
FIG. 35 shows another modification example of the push ring which can be used in the pipe joint of FIG. 30.
Figure 36:
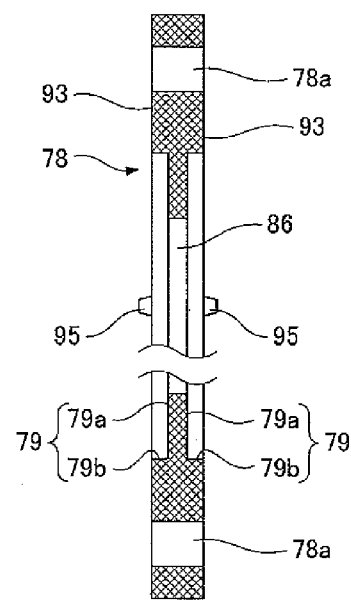
FIG. 36 is a cross-sectional view showing the push ring of FIG. 35.

As shown in FIGS. 35 and 36, the spacers 95 may be displaced from the through holes 78a by a predetermined angle in the direction of the push ring 78. In the illustration, the predetermined angle is 90°.

In the above-described embodiment, the through holes 78a and the spacers 95 are respectively formed at two points in the circumferential direction of the push ring 78, but the number of through holes 78a and spacers 95 is not limited to two. The through holes 78a and the spacers 95 may be formed at more than two points. The spacers 95 may be formed on only one of the two surfaces of the plate-like push ring 78. The number of through holes 78a and the number of spacers 95 provided on one of the side surfaces 93 of the push ring 78 may be the same or different from each other as described above.

The spacers 95 may be integrally formed not in the push ring 78 as described above but in the socket 72 of the pipe 71 made of ductile cast-iron. Alternatively, the spacers 95 may be formed on both the side surface 93 of the push ring 78 and the end surface 94 of the socket 72.

Figure 37:
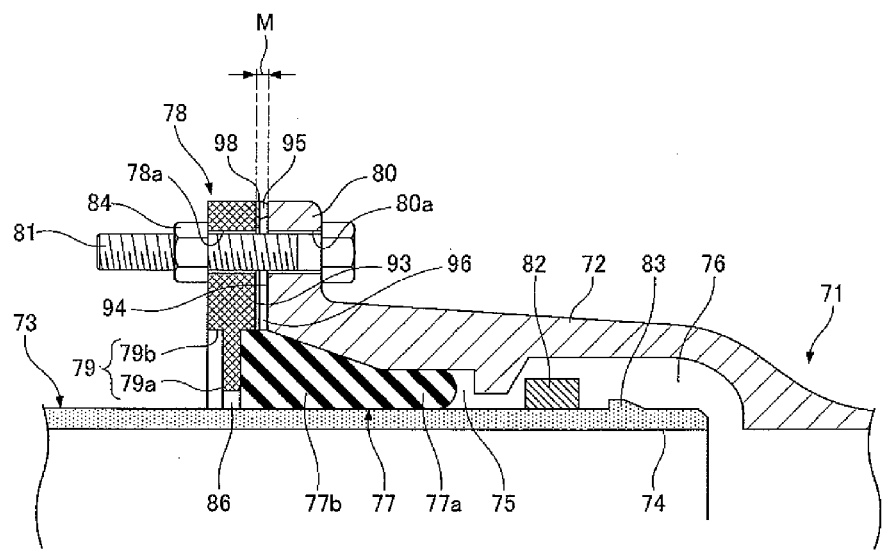
FIG. 37 shows a modification example of the pipe joint of FIG. 30.
Figure 38:
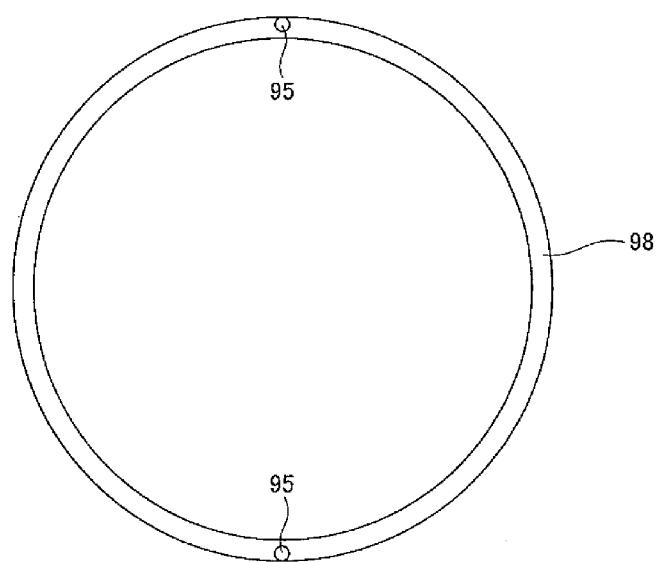
FIG. 38 is a side view showing the essential part of the pipe joint of FIG. 37.

As shown in FIGS. 37 and 38, the spacers 95 may be formed in a member separated from the push ring 78 and the socket 72. In the illustration, the spacers 95 are provided in an annular thin plate member 98. The spacers 95 and the thin plate member 98 may be integrally resin-molded. In this configuration, the sum of the height of the spacer 95 and the thickness of the thin plate member 98 is a predetermined dimension M.

In this configuration, the thin plate member 98 and the spacers 95 integrally formed are interposed and held between the side surface 93 of the push ring 78 and the end surface 94 of the socket 72. Thus, the gap 96 between the side surface 93 of the push ring 78 and the end surface 94 of the socket 72 can be accurately and easily kept at the predetermined dimension M.

Figure 39:
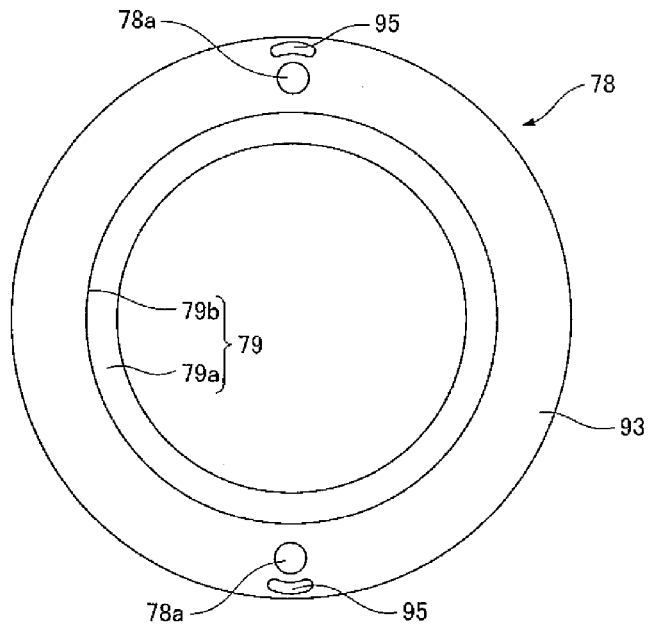
FIG. 39 shows another modification example of the push ring which can be used in the pipe joint of FIG. 30.

In the above-described embodiments, the spacers 95 are formed in a truncated conical shape but may be formed in any shape. For example, as shown in FIG. 39, the spacers 95 may be elliptical in the circumferential direction of the push ring 78 or the socket 72.

Even in the embodiment in which the spacers 95 are used, the stepped concaves 79 of the push ring 78 may be provided on the two surfaces or one of the two surfaces of the plate-like push ring 78.

Figure 40:
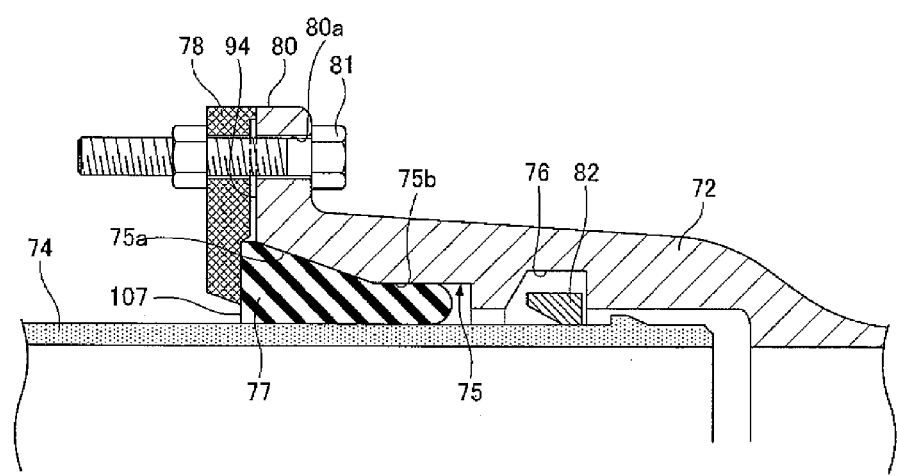
FIG. 40 shows a pipe joint according to another embodiment of the present invention.
Figure 41:
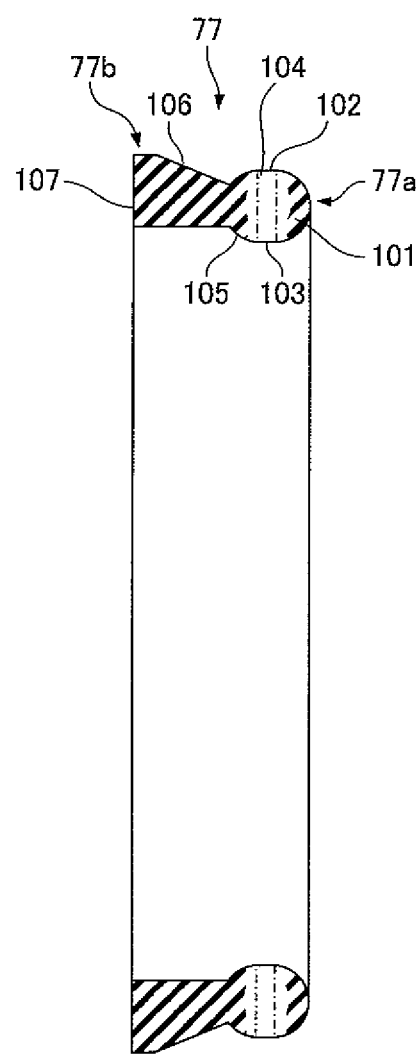
FIG. 41 is a cross-sectional view showing a sealing material shown in FIG. 40.

FIGS. 40 to 44 show still another embodiment of the present invention. This embodiment is different from the above-described embodiments in the configuration of a sealing material 77. FIG. 41 is a cross-sectional view showing an uncompressed sealing material 77. A base portion 77b of the sealing material 77 has the same configuration as that in FIG. 22. In contrast, a circular distal end portion 77a of the sealing material 77 is different from that in FIG. 22.

An arc portion 101 is formed at the distal end of the circular distal end portion 77a, and in continuity with the arc portion 101, a cylindrical portion 104 is formed which has an outer peripheral surface 102 and an inner circumferential surface 103 both formed in the pipe axial direction. In continuity with the cylindrical portion 104, an arc portion 105 connected to the base portion 77b is formed. On the outer periphery of the base portion 77b, a tapered surface 106 is formed, the diameter of which is gradually reduced towards the circular distal end portion 77a. Reference numeral 107 denotes the end surface of the base portion 77b.

Figure 42:
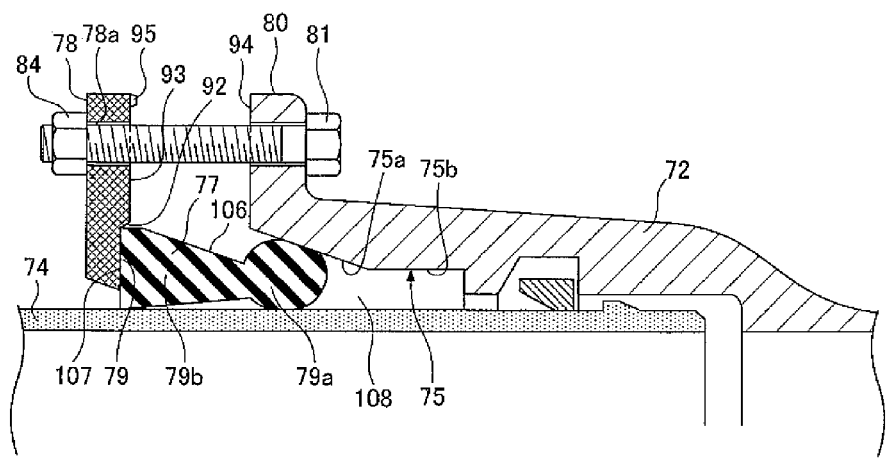
FIG. 42 shows the joining operation of the pipe joint of FIG. 40.
Figure 43:
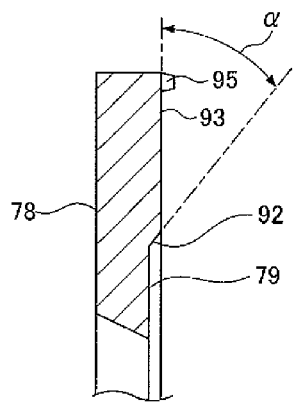
FIG. 43 is an enlarged view showing a push ring in FIG. 42.
Figure 44:
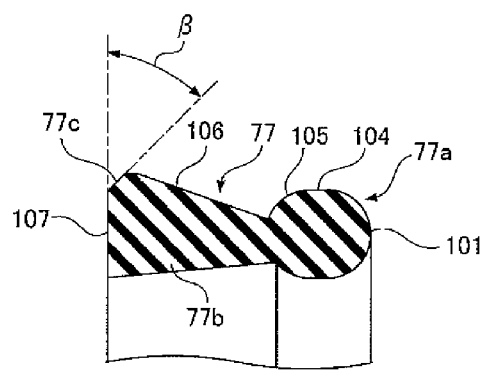
FIG. 44 is an enlarged view showing the sealing material in FIG. 42.
Figure 45:
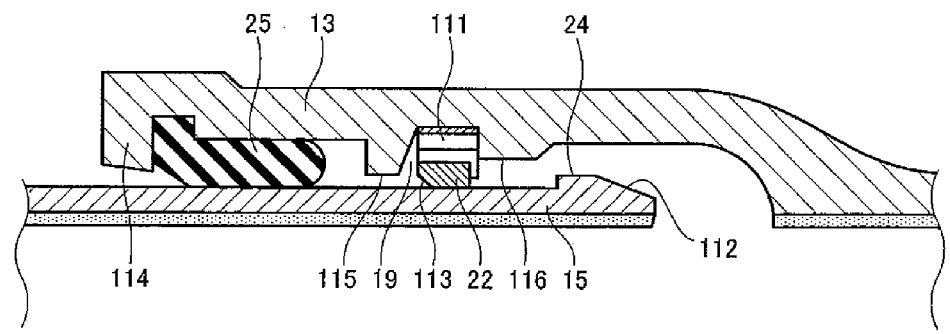
FIG. 45 shows a pipe joint according to another embodiment of the present invention.

FIG. 42 is a cross-sectional view showing the process of accommodating the sealing material 77 in an accommodating portion 75. As shown in FIG. 42, a push ring 78 is in contact with the end surface 107 of the base portion 77b and the end of the base portion 77b is fitted into a stepped concave 79, in a state in which the circular distal end portion 77a of the sealing material 77 is in contact with a tapered surface 75a of a socket 72. As shown in FIG. 43, the stepped concave 79 has a tapered portion 92 at inclination angle α. In the example of FIGS. 40 to 42, the sealing material 77 does not have a tapered surface, but as shown in FIG. 44, the sealing material may have a tapered surface 77c at inclination angle β.

When the sealing material 77 is pushed into the accommodating portion 75 further than the state of FIG. 42, the sealing material 77 is completely accommodated in the accommodating portion 75 as shown in FIG. 40. Thus, the tapered surface 106 of the sealing material 77 is brought into contact with the tapered surface 75a of the accommodating portion 75. When the tapered surfaces 106 and 75a contact each other, a spacer 95 of the push ring 78 is metal-touch-joined to an end surface 94 of the socket 72. Thus, after the tapered surface 106 of the sealing material 77 is brought into contact with the tapered surface 75a of the accommodating portion 75, the tapered surface 106 of the sealing material 77 is further pressed against the tapered surface 75a of the accommodating portion 75 to prevent the sealing material 77 from being deformed.

A cylindrical surface 75b of the accommodating portion 75 of the socket 72 and the outer peripheral surface of a spigot 74 form a space 108. The cylindrical surface 75b and the outer peripheral surface of the spigot 74 are arranged in a concentric manner. In the space 108, the circular distal end portion 77a of the sealing material 77 is accommodated, and the cylindrical portion 104 is brought into contact with the cylindrical surface 75b and the outer peripheral surface of the spigot 74. The outer peripheral surface 102 and the inner circumferential surface 103 forming the cylindrical portion 104 are uniformly compressed while keeping the concentric state even after the circular distal end portion 77a is accommodated in the space 108.

The outer peripheral surface 102 and the inner circumferential surface 103 are in surface-contact with the cylindrical surface 75b and the outer peripheral surface of the spigot 74 over the periphery and are uniformly compressed, so that desired sealing properties are exhibited. The circular distal end portion 77a does not exhibit sealing properties by receiving a reaction force against the force of the push ring 78 pressing the sealing material 77.

The following will describe the case where the sealing material 77 receives a fluid pressure in the pipe. The circular distal end portion 77a tends to expand in the pipe diameter direction by the fluid pressure, but the expansion is limited by the cylindrical surface 75b of the socket 72 and the outer peripheral surface of the spigot 74. Thus, the circular distal end portion 77a is additionally provided with a compression force by the fluid pressure. The outer peripheral surface 102 and the inner circumferential surface 103 are in surface-contact with the cylindrical surface 75b of the socket 72 and the outer peripheral surface of the spigot 74 over the periphery while keeping the concentric state even after the circular distal end portion 77a receives the fluid pressure in the pipe, and are uniformly compressed with the compression force added by the fluid pressure in the pipe. Thus, the sealing properties are sufficiently exhibited.

The following will describe the case where the circular distal end portion 77a is compressed by the fluid pressure in the pipe to move towards the opening side of the socket 72. If the circular distal end portion 77a moves within the length of the cylindrical portion 104 in the pipe axial direction, even after the circular distal end portion 77a moves, the surface-contact of the outer peripheral surface 102 and the inner circumferential surface 103 of the sealing material 77, the cylindrical surface 75b of the socket 72, and the outer peripheral surface of the spigot 74 over the periphery is kept within a certain area along the pipe axial direction. Thus, the desired sealing properties are maintained.

As described above, the sealing material 77 has the cylindrical portion 104 in which the outer peripheral surface 102 is formed concentrically with the cylindrical surface 75b of the socket 72, and the inner circumferential surface 103 is formed concentrically with the outer peripheral surface of the spigot 74. Thus, when the sealing material 77 is compressed between the socket 72 and the spigot 74, the cylindrical portion 104 is in surface-contact with the outer peripheral surface of the spigot 74 and the inner circumferential surface of the socket 72 over the periphery. As a result, the sealing material 77 can be uniformly brought into surface-contact with the socket 72 and the spigot over a wide area to maintain the sealing properties. Further, even when a portion of the sealing material 77 exhibiting sealing properties under a fluid pressure in the pipe moves, the desired sealing properties are maintained.

FIGS. 45 to 49 show a slip-on detachment preventive pipe joint according to another embodiment.

In the pipe joint, between the outer peripheral surface of a lock ring 22 and the inner circumferential surface of an accommodating groove 19, a centering member 111 made of rein is disposed for holding and centering the lock ring 22 before a spigot 15 is inserted into a socket 13. A tapered surface 112 is formed at the distal end of a projection 24 of the spigot 15 so as to be tapered towards the distal end side of the spigot 15. A tapered surface 113 is formed on the inner circumferential part of the lock ring 22 on the socket opening side, so as to expand towards the socket opening side. When the spigot 15 is inserted into the socket 13, the tapered surface 112 at the distal end of the projection 24 of the spigot 15 and the tapered surface 113 of the lock ring 22 are in slidable contact with each other, thereby elastically expanding the diameter of the lock ring 22.

As in the illustration, on the inner circumferential surface of the socket 13, three inner circumferential projections 114, 115, and 116 are formed in this order from the opening side towards the inner side of the socket 13. The three inner circumferential projections 114, 115, and 116 form an accommodating groove for accommodating a sealing material 25 and the lock ring accommodating groove 19. The three inner circumferential projections 114, 115, and 116 are formed to have a larger inner diameter than the outer diameter of the projection 24 such that the projection 24 of the spigot 15 can be inserted into the socket 13. More specifically, the inner circumferential projections 114 and 116 at the opening part and inner part of the socket are larger in inner diameter than the inner circumferential projection 115 at the middle part. In other words, the inner diameter of the inner circumferential projection 115 at the middle part is the smallest.

With this configuration, the spigot 15 can be swung about the inner circumferential projection 115 at the middle part such that the axis of the spigot 15 is bent and misaligned with the axis of the socket 13. As a result, the flexibility of connected state of the socket 13 and the spigot 15 is increased. Further, when the spigot 15 is inserted into the socket 13, the socket 13 and the spigot 15 can be satisfactorily connected to each other even in a state where the axes of the socket 13 and the spigot 15 are not accurately aligned with each other, for example, the axes are bent.

However, when the inner circumferential projection 116 on the socket inner side is larger in inner diameter than the inner circumferential projection 115 at the middle part, the lock ring 22 may not be prevented from projecting towards the socket inner side by being pushed by the projection 24 when the spigot 15 is inserted.

In order to address the problem, as shown in FIGS. 45 to 48, a holder 117 and a hold width 118 are integrally formed in the centering member 111 so that the traverse section of the holder and the hold width is L-shaped. The holder 117 is disposed between the inner circumferential surface of the accommodating groove 19 and the outer peripheral surface of the lock ring 22 to hold the lock ring 22 from the outer peripheral side thereof. The hold width 118 protrudes inward in the pipe diameter direction from the socket inner side part of the holder 117 and enters between the inner side surface of the accommodating groove 19 and the inner side surface of the lock ring 22, so that the hold width 118 is caught by the inner side surface of the lock ring 22 when the spigot 15 is inserted into the socket 13. Thus, the lock ring 22 is prevented from projecting from the accommodating groove 19 towards the inner side of the socket 13.

The hold width 118 and the holder 117 are plurally divided along the circumferential direction, and curved-plate-like connecting parts 120 are integrally formed on the outer peripheral surfaces of divided parts 119. The connecting parts 120 are disposed in arc shape on the divided parts 119 in an elastically deformable state and are brought into contact with the inner circumferential surface of the accommodating groove 19. Further, the divided parts 119 are connected to each other so as to move in the pipe diameter direction while elastically pushing each other inward in the pipe diameter direction.

The centering member 111 made of resin is formed of polypropylene or nylon 6. The overall centering member 111, that is, the holder 117, the hold width 118, and the connecting parts 120 are integrally formed.

In FIGS. 45 to 48, the connecting parts 120 and the holder 117 are formed with the same width but the present invention is not limited to this. The connecting parts 120 may be different from the holder 117 in width.

Figure 46:
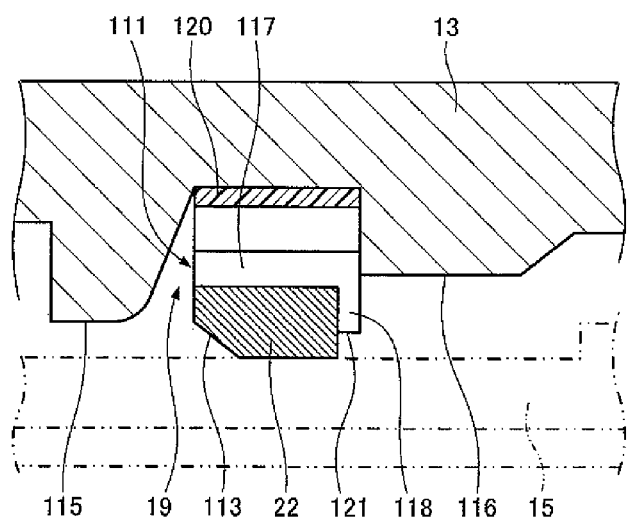
FIG. 46 is an enlarged view showing the essential part of FIG. 45.

As shown in FIG. 46 in an enlarged manner, the hold width 118 of the centering member 111 is formed in such a dimension that an end 121 of the hold width 118 on the inner side in the diameter direction protrudes more inward in the pipe diameter direction than the inner circumferential part of the inner circumferential protrusion 116 at the socket inner side while the centering member 111 is centered in the lock ring accommodating groove 19.

Since the connecting part 120 is smaller in thickness than the holder 117, the largest outer diameter of the centering member 111 is almost equal to the inner diameter of the accommodating groove 19. Specifically, when the centering member 111 is formed of polypropylene and nylon 6, it is preferable that the holder 117 is 2 mm to 5 mm and the connecting part 120 is 0.5 mm to 1.5 mm in thickness. However, the thicknesses of the holder 117 and the connecting part 120 are not limited and may be any values as long as the lock ring 22 may be satisfactorily centered by the elasticity of the connecting part 120 and the connecting part 120 may be appropriately bent when the pipes are connected to each other.

In this configuration, the inner circumferential protrusion 116 on the socket inner side is larger in inner diameter than the inner circumferential protrusion 115 at the middle part. Thus, the socket 13 and the spigot 15 can be favorably joined to each other and the efficiency of joining the socket and the spigot can be improved even in a state where the pipe axes of the socket 13 and the spigot 15 are bent. Further, since the hold width 118 is formed in the centering member 111, the hold width 118 is caught by the lock ring 22 when the spigot 15 is inserted, so that the lock ring 22 is prevented from projecting from the accommodating groove 19 towards the inner side of the socket 13. As a result, the detachment preventive function can be favorably maintained and the reliability can be improved. Since the end 121 of the hold width 118 on the inner side in the pipe diameter direction protrudes more inward in the pipe diameter direction than the inner circumferential protrusion 116 on the socket inner side while the centering member 111 is centered, the lock ring 22 can be prevented more reliably from projecting towards the socket inner side when the spigot 15 is inserted.

The centering member 111 is plurally divided along the circumferential direction, and the divided parts 119 are elastically pressed by the connecting parts 120 inward in the pipe diameter direction at least when the diameter of the lock ring 22 is expanded. Thus, the lock ring 22 can be favorably centered. Since the connecting parts 120 are provided in an elastically deformable orientation from the outer peripheral surfaces of the divided parts 119 towards the outside, the connecting parts 120 do not fit into a divided gap 122 of the singularly divided lock ring 22 shown in FIG. 49. Thus, the orientation of the centering member 111 in the circumferential direction does not need to be controlled with respect to the lock ring 22, so that the operation efficiency can be enhanced.

Since the connecting parts 120 are formed so as to extend in arc shape from the outer peripheral surfaces of the divided parts 119 and have a relatively simple configuration, the divided parts 119 can be satisfactorily elastically pressed inward in the pipe diameter direction, and the lock ring 22 can be favorably centered.

Figure 47:
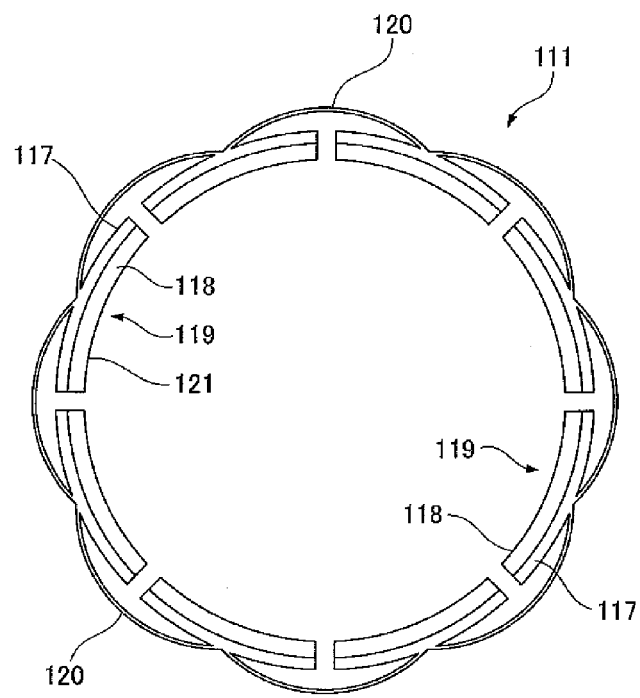
FIG. 47 is an overall side view showing a centering member of FIG. 45.
Figure 48:
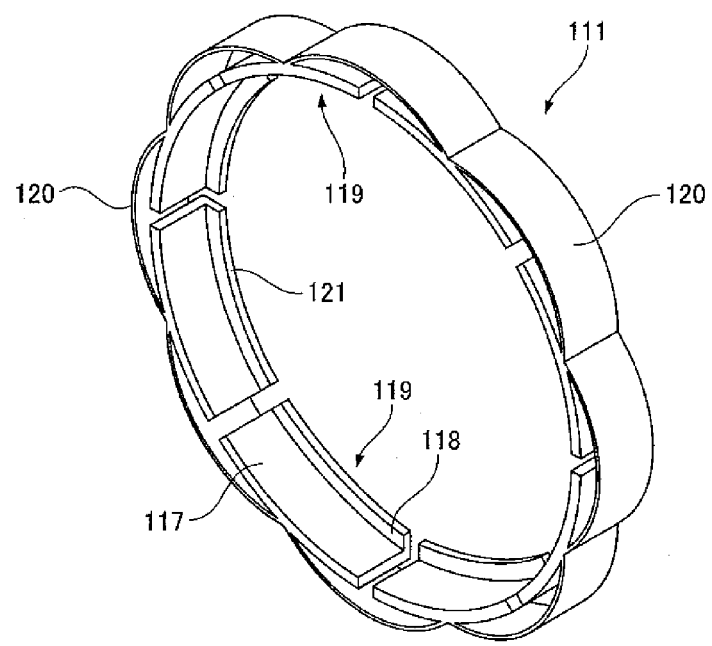
FIG. 48 is a three-dimensional view showing the centering member.

In FIGS. 47 to 49, the number of the holders 117 and hold widths 118 of the centering member 111 is eight along the circumferential direction, but the present invention is not limited to this. The centering member 111 is integrally made of resin, so that the manufacturing cost can be reduced as compared to a known centering member made of rubber, but the present invention is not limited to this.

As in the illustration, a portion of the socket 13 closer to the socket inner side than the inner circumferential protrusion 116 is larger in inner diameter than the inner circumferential protrusion 116 on the inner side of the socket 13. In this case, the projection 24 of the spigot 15 can be preferably swung in the pipe diameter direction. However, the present invention is not limited to this configuration, and the portion of the socket 13 closer to the socket inner side may be constant up to the inner end of the socket 13 in the same inner diameter as the inner circumferential projection 116.

Figure 52:
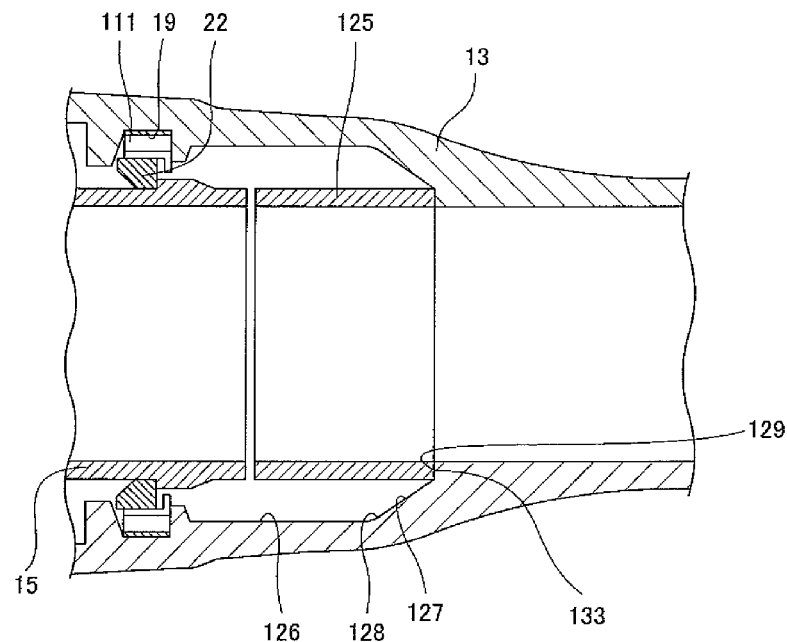
FIG. 52 shows the operating stage following the stage of FIG. 51.

The following will describe still another embodiment of the present invention. A force is not uniformly applied by a water pressure in a deformed pipe such as a bent pipe and a T-shaped pipe of a water pipeline. In order to prevent a water pipeline from being displaced from a normal position by such a non-uniform force, as shown in FIG. 52, a cylindrical liner 125 made of metal is attached between the inner end of a socket 13 and the distal end portion of a spigot 15, for the purpose of constraining the expansion and contraction and the bending of a pipe joint and obtaining predetermined bending rigidity. The outer diameter and thickness of the liner 125 are equal to those of the spigot 15.

Specifically, an inner circumferential surface 126 is formed in the pipe axial direction closer to the inner side of the socket 13 than a lock ring accommodating groove, on the inner circumference of the socket 13 horizontally provided. A tapered surface 127 is formed closer to the inner side of the socket than the inner circumferential surface 126. The tapered surface 127 serves as a guiding surface whose diameter is reduced towards the inner part of the socket. At a portion connecting the inner circumferential surface 126 and the tapered surface 127, a connecting part 128 having an arc-shaped cross section is formed. The inner circumferential surface 126 and the tapered surface 127 are smoothly connected to each other by the connecting part 128. An inner end surface 129 is formed in the pipe diameter direction closer to the inner side of the socket than the tapered surface 127.

Figure 50:
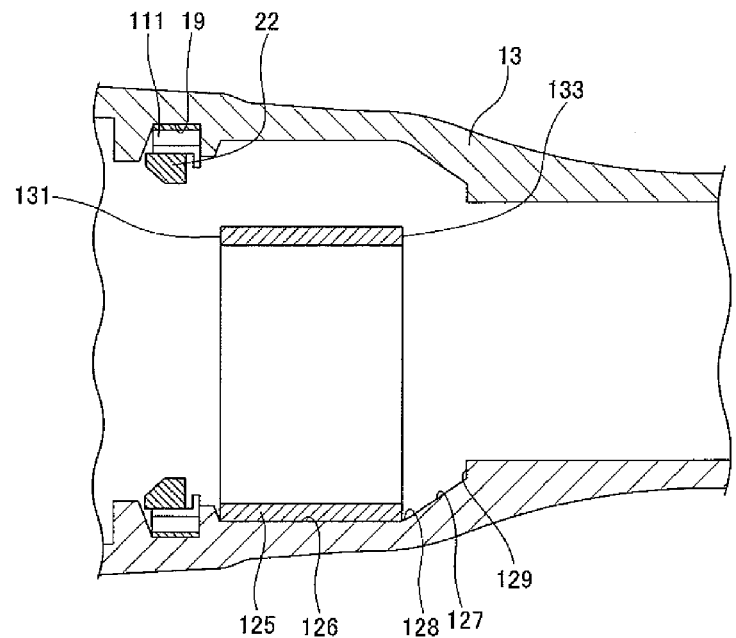
FIG. 50 shows the joining operation of the joint of a pipe joint according to another embodiment of the present invention.

In this configuration, when the socket 13 and the spigot 15 are joined to each other, as shown in FIG. 50, the liner 125 is inserted into the socket 13. Thus, the liner 125 is placed at the bottom of the inner circumferential surface 126 with the central axis parallel to the pipe axial direction.

Figure 51:
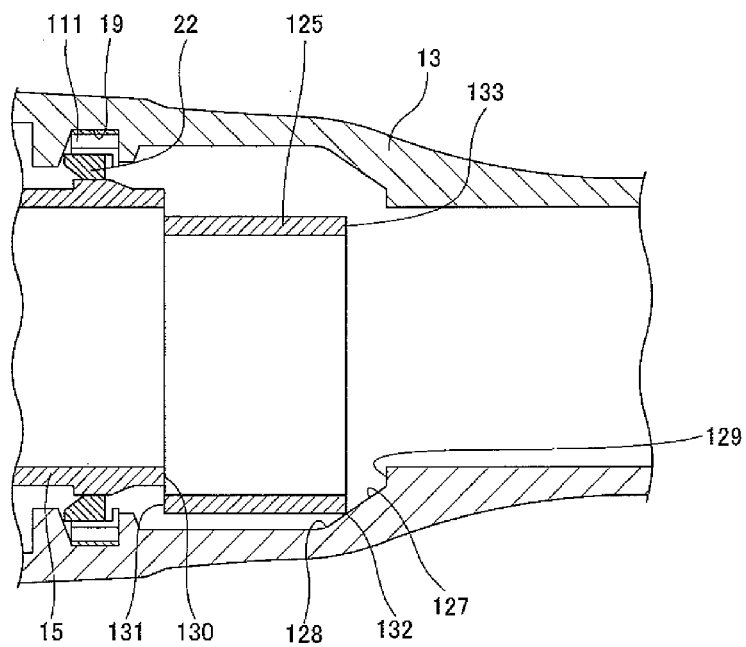
FIG. 51 shows the operating stage following the joining operation of FIG. 50.

Next, as shown in FIG. 51, when the spigot 15 is inserted into the socket 13, an end surface 130 of the spigot 150 is brought into contact with an end surface 131 of the liner 125 on the socket opening side in a non-concentric state. The liner 125 moves on the inner circumferential surface 126 towards the inner side of the socket 13 by being pushed by the spigot 15. Since the inner circumferential surface 126 is connected to the tapered surface 127 via the connecting part 128, the distal end portion of the liner 125 can move smoothly from the inner circumferential surface 126 to the tapered surface 127 without falling at the corner portion connecting the inner circumferential surface 126 and the tapered surface 127. The liner 125 having the distal end portion moved to the tapered surface 127 rises against the tapered surface 127, with a lower portion 132 at the end of the liner 125 on the socket inner side in contact with the tapered surface 127.

Further, as shown in FIG. 52, the liner 125 is positioned on the axes of the socket 13 and the spigot 15 while being pushed by the spigot 15 with an end face 133 on the socket inner side in contact with the inner end surface 129 of the socket 13. The tapered surface 127 is formed so that the liner 125 can be self-aligned and positioned on the axes of the socket 13 and the spigot 15 when the end surface 133 of the liner 125 on the socket inner side is in brought into contact with the inner end surface 129 of the socket 13.

The liner 125 is center-aligned with the axes of the socket 13 and the spigot 15 with the lower portion 132 at the end on the socket inner side guided by the tapered surface 127. Thus, the liner 125 does not need to be larger in outer diameter and thickness than the spigot 15 for center-alignment, but the outer diameter and thickness of the liner 125 can be the same as those of the spigot 15 as described above.

Figure 53:
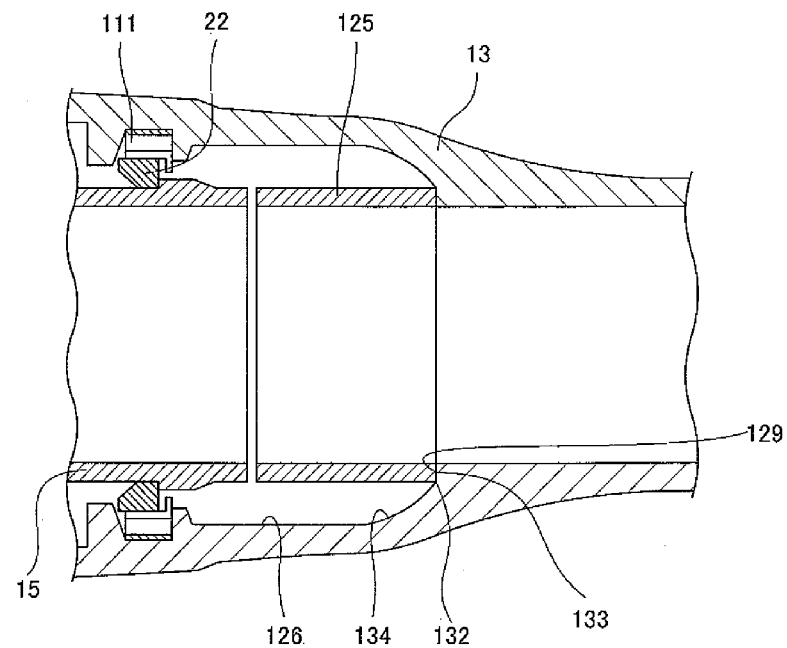
FIG. 53 shows a modification example of the pipe joint of FIGS. 50 to 52.

FIG. 53 shows a modification example of the pipe joint shown in FIGS. 50 to 52. In FIG. 53, instead of the tapered surface 127 of in FIGS. 50 to 52, a guiding surface 134 having an arc-shaped cross-section is formed in the socket 13. The guiding surface 134 is formed so as to be in smooth continuity with the inner circumferential surface 126 of the socket 13 and have an inner diameter reduced towards the inner side of the socket 13.

Similarly to the pipe joint of FIGS. 50 to 52, the liner 125 pushed by the spigot 15 can move on the inner circumferential surface 126 towards the inner side of the socket 13 and be smoothly transferred from the inner circumferential 126 onto the guiding surface 134.

The lower portion 132 of the liner 125 transferred to the guiding surface 134 rises against the guiding surface 134. Similarly to the pipe joint of in FIGS. 51 and 52, the liner 125 is center-aligned with the axes of the socket 13 and the spigot 15 while being pushed by the spigot 15 with the end surface 133 in contact with the inner end surface 129 of the socket 13.

Figure 54:
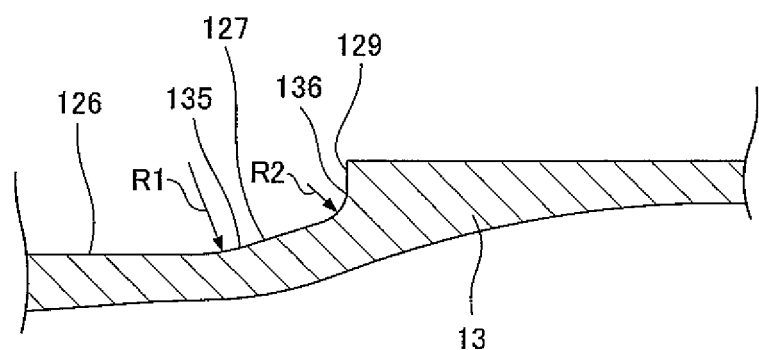
FIG. 54 shows a socket of the pipe joint of FIGS. 50 to 52 in another modification example.

FIG. 54 shows another modification example of the pipe joint shown in FIGS. 50 to 52. In FIG. 54, the inner circumferential surface 126 and the tapered surface 127 are smoothly connected to each other at a connecting surface 135 having an arc-shaped cross-section, and the tapered surface 127 and the inner end surface 129 of the socket are smoothly connected to each other at a connecting surface 136 having an arc-shaped cross-section. The tapered surface 127 and the connecting surfaces 135 and 136 each have a diameter reduced towards the inner side of the socket 13. Radius R1 of arc of the connecting surface 135 is larger than radius R2 of arc of the connecting surface 136.

With this configuration, the liner provided on the inner circumferential surface 126 can smoothly move by being pushed by the spigot (not shown). Thus, the liner can be easily center-aligned with the axes of the socket 13 and the spigot 15.

Figure 55:
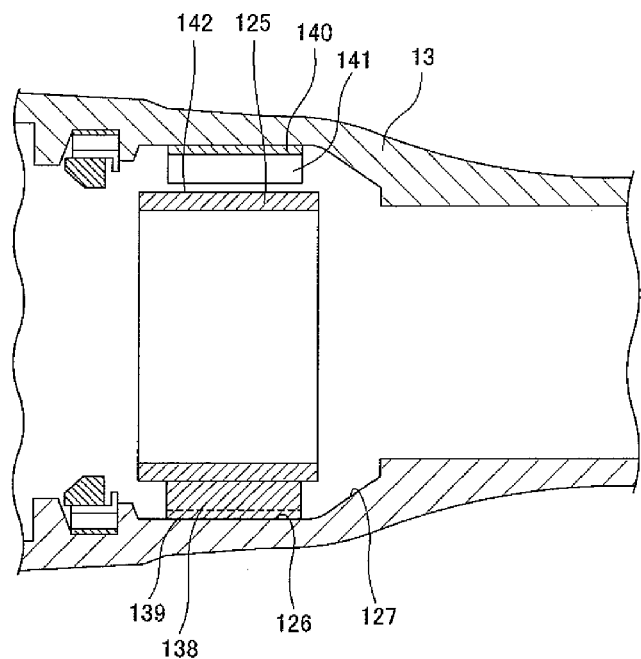
FIG. 55 shows the joining operation of the joint of the pipe joint of FIGS. 50 to 52 in still another modification example.
Figure 56:
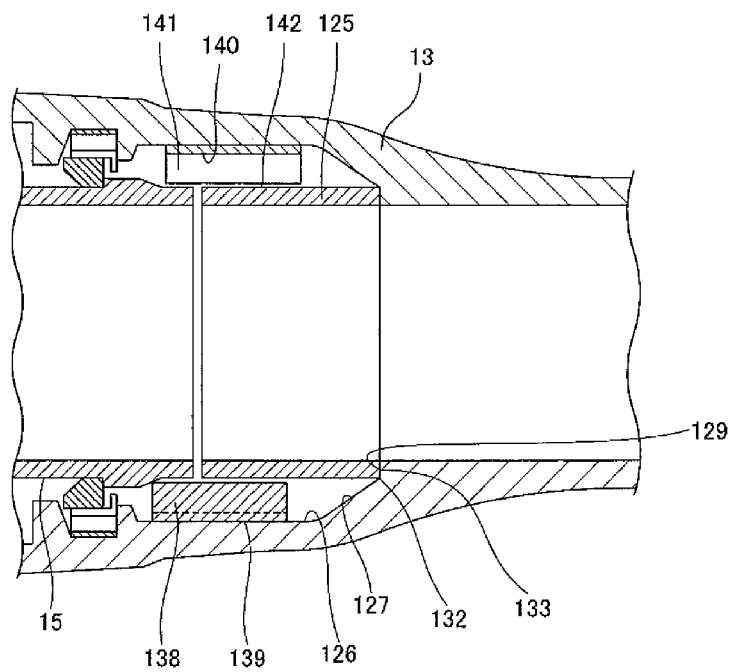
FIG. 56 shows the operating stage following the joining operation of FIG. 55.
Figure 57:
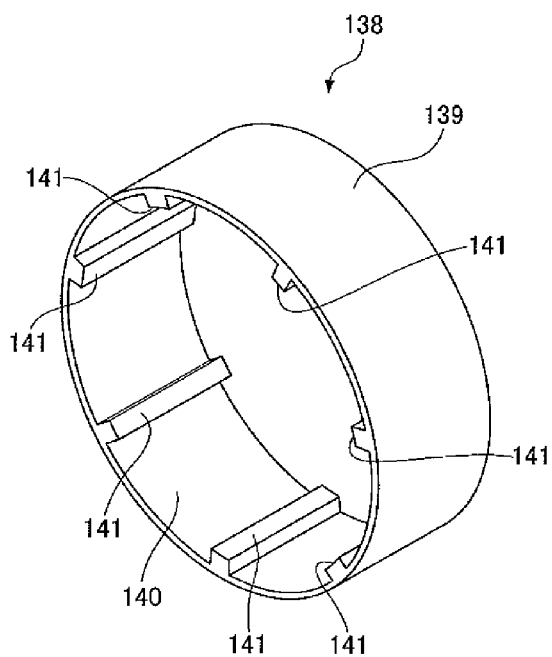
FIG. 57 is a three-dimensional view showing a liner centering member in the pipe joint of FIG. 55.

FIGS. 55 to 57 show still another modification example of the pipe joint of FIGS. 50 to 52. In the modification example, a liner centering member 138 is provided between the inner circumferential surface 126 and the liner 125. The liner centering member 138 leads the liner 125 to the center portion of the socket 13 along the pipe diameter direction. The liner centering member 138 is formed in a cylindrical shape by using resin such as nylon 6, and an outer peripheral surface 139 of the liner centering member 138 is provided in contact with the inner circumferential surface 126 of the socket 13. As shown in FIG. 57, the liner centering member 138 includes a plurality of projections 141 integrally formed along the circumferential direction on the inner circumference of a thin tubular member 140. Thus, the liner centering member 138 is lighter in weight than in a case where the overall periphery of the liner centering member 138 is uniform in thickness.

The outer peripheral surface 139 may be attached to the inner circumferential surface 126 to fix the liner centering member 138 on the inner circumferential surface 126. The cylindrical liner 125 has an outer peripheral surface 142 supported by the liner centering member 138.

The liner 125 supported by the liner centering member 138 is pushed by the spigot 15 to move to the inner side of the socket 13, so that the lower portion 132 is brought into contact with the tapered surface 127. The liner 125 rises against the tapered surface 127 with the lower portion 132 in contact with the tapered surface 127, and is self-aligned as shown in FIG. 56. Thereafter, the end surface 133 of the liner 125 hits against the inner end surface 129 of the socket 13.

With this configuration, since the liner 125 is supported by the centering member 138, the moving distance of the liner 125 in the pipe diameter direction is shortened during aligning, so that the aligning is facilitated. The liner 125 moved by being pushed by the spigot 15 is restricted and prevented from falling by the centering member 138.

The liner 125 can be inserted into the socket 13 after the liner centering member 138 is attached to the inner circumferential surface 126 of the socket 13, but the present invention is not limited to this. For example, after the liner 125 is inserted into the socket 13, the centering member 138 can be attached by being inserted into a gap between the liner 125 and the inner circumferential surface 126.

Figure 58:
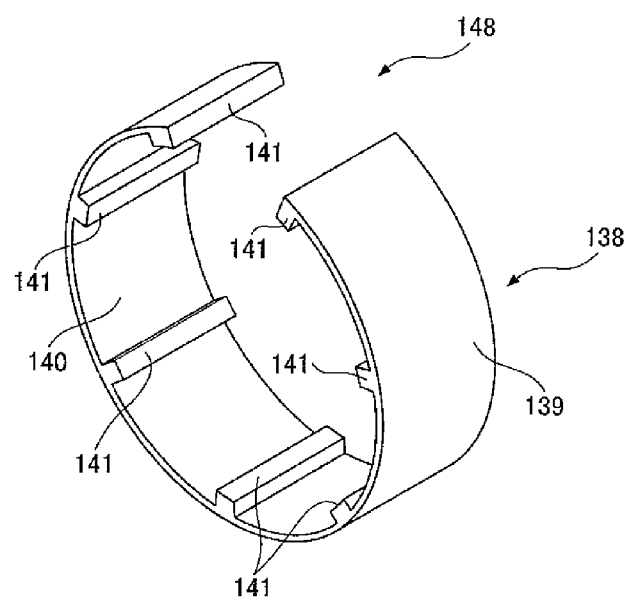
FIG. 58 shows a modification example of the liner centering member of FIG. 57.

FIG. 58 shows a modification example of the liner centering member 138. A liner centering member 138 of FIG. 58 is singularly divided such that the liner centering member 138 includes a tubular member 140 along the circumferential direction which is partly cut out. Reference numeral 148 denotes a singularly divided part. The liner centering member 138 singularly divided in this way is elastically reduced in diameter and easily inserted to the inner circumferential surface 126 of the socket 13. When the outer diameter of the liner centering member 138 is set in such a natural state that the liner centering member 138 elastically sticks to the inner circumferential surface 126 of the socket 13, the liner centering member 138 does not need to adhere to the inner circumferential surface 126 of the socket 13.

The liner centering member 138 is not limited to the above-described configuration. Specifically, the liner centering member 138 may have, for example, a half-arc-shaped or less-than-half-arc-shaped cross-section, as long as the liner centering member 138 supports the lower portion of the liner 125.

Figure 59:
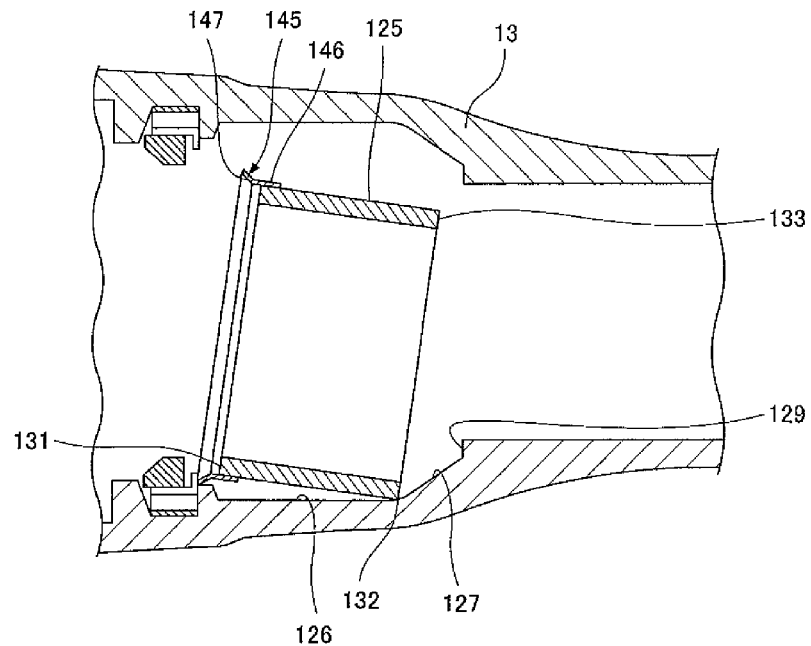
FIG. 59 shows the joining operation of the joint of the pipe joint of FIGS. 50 to 52 in still another modification example.
Figure 60:
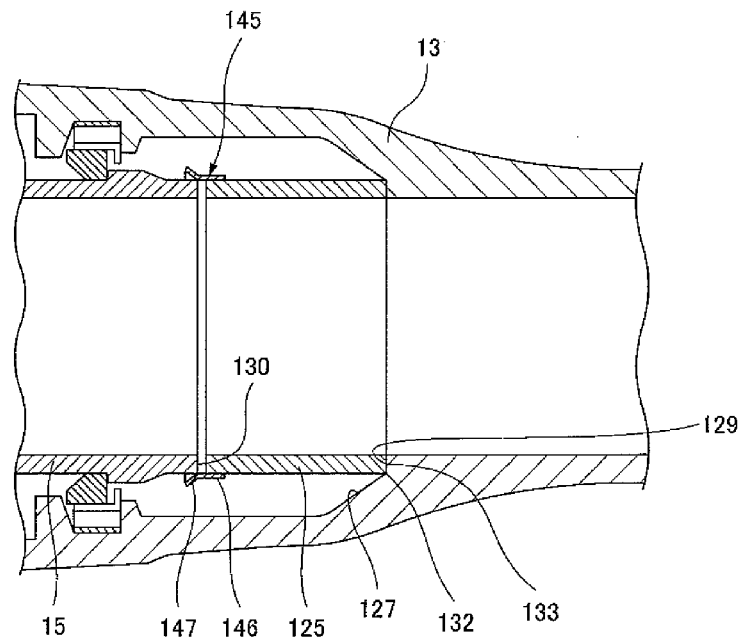
FIG. 60 shows the operating stage following the joining operation of FIG. 59.

FIGS. 59 and 60 show still another modification example of the pipe joint shown in FIGS. 50 to 52. In the modification example, a thin annular guiding member 145 is provided at the peripheral edge portion of a part of the liner 125 in contact with the spigot 15.

The guiding member 145 integrally has a cylindrical portion 146 fitted and fixed onto the end of the liner 125 and a tapered portion 147 provided so as to project from the liner 125. The guiding member 145 may be composed of, for example, a resin molded article.

In this configuration, first, the liner 125 is provided horizontally on the inner circumferential surface 126 of the socket 13, as shown in FIG. 59. In this state, when the spigot 15 is inserted into the socket 13, the liner 125 is pushed by the spigot 15 to move to the inner side of the socket 13. The lower portion 132 on the socket inner side rises against the tapered surface 127 of the socket 13 and is center-aligned with the socket 13, and in this state the end surface 133 of the liner 125 is brought into contact with the inner end surface 129 of the socket 13.

At this point, the distal end portion of the spigot 15 is guided by the tapered surface 147 of the guiding member 145 to enter the guiding member 145. In other words, the guiding member 145 covers the distal end portion of the spigot 15. Conversely, due to the entering of the spigot 15, the end of the liner 125 on the socket opening side with the guiding member 145 attached thereto rises against the spigot 15. Thus, the end of the liner 125 on the socket opening side is center-aligned with the spigot 15, and the end surface 130 of the spigot 15 is brought into contact with the end surface 131 of the liner 125.

With the above-described configuration, the liner 125 is center-aligned with the socket 13 and the spigot 15.

FIGS. 61 to 65 show a mechanical-type detachment preventive pipe joint according to another embodiment.

Figure 61:
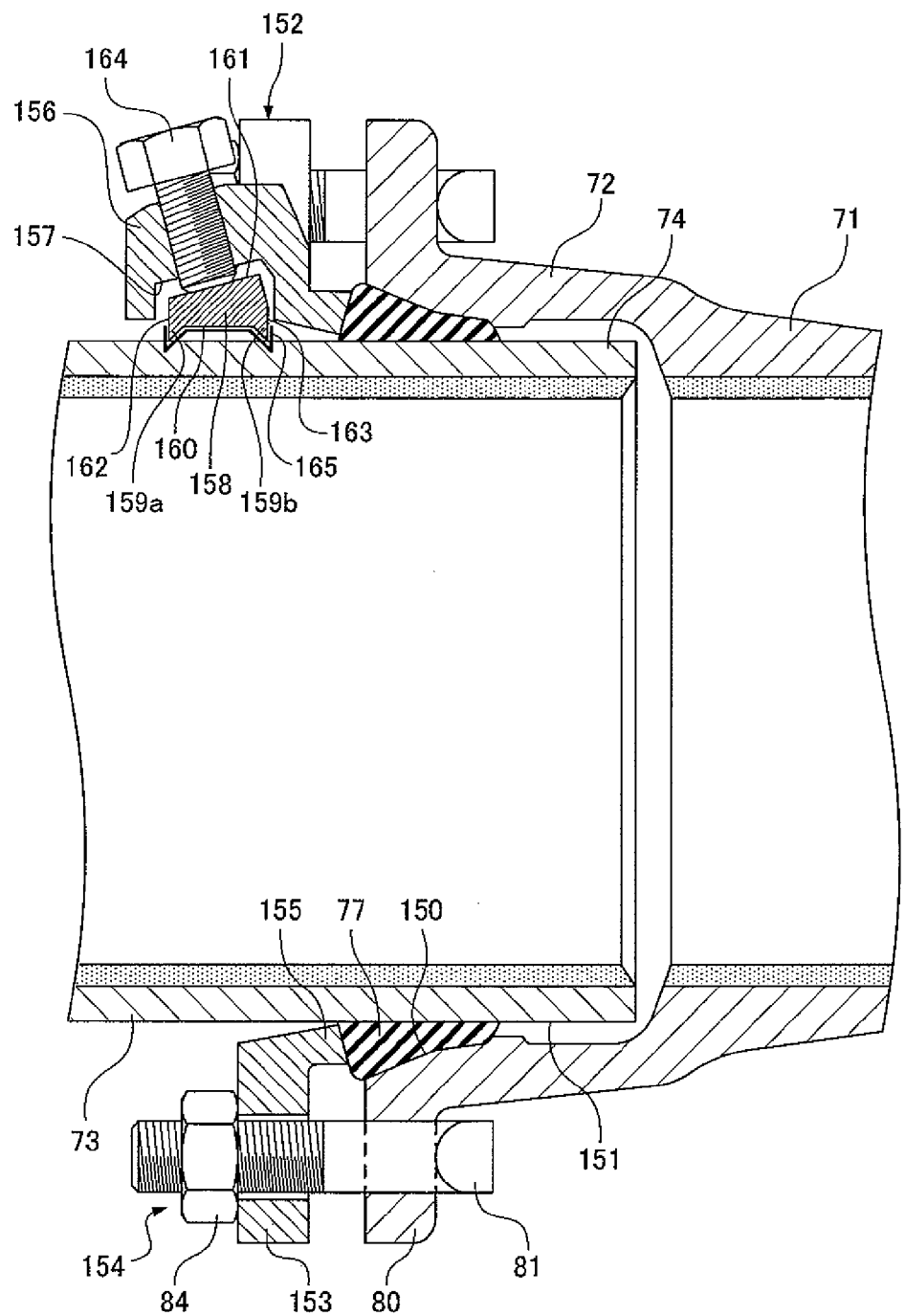
FIG. 61 is a cross-sectional view showing a pipe joint according to another embodiment of the present invention.

As shown in FIG. 61, a flange 80 is integrally formed on the outer periphery of the opening part of a socket 72 formed at the end of one pipe 71 made of ductile cast iron, and a tapered sealing material pressing surface 150 is formed on the inner circumference of the opening part of the socket 72. The tapered sealing material pressing surface 150 has a diameter expanded gradually towards the opening end of the opening part of the socket. An annular sealing material 77 made of rubber is fitted onto a spigot 74 formed at the end of another pipe 73 made of ductile cast iron, and the sealing material 77 is disposed between an outer peripheral surface 151 of the spigot 74 and the sealing material pressing surface 150.

A push ring 152 as an annular member is fitted onto a part of the spigot 74 outside the socket 72. The push ring 152 may be made of ductile cast iron as in the pipes 71 and 73 and formed in a continuous annular shape in the circumferential direction. Alternatively, the push ring 152 may be divided in an appropriate number along the circumferential direction, and the divided parts may be joined to each other by a bolt or the like.

A flange 153 is formed over multiple points of the push ring 152 along the circumferential direction. Across the flange 153 of the push ring 152 and the flange 80 of the socket 72, a fastening element 154 including a T-head type bolt 81 and a nut 84 is disposed in the pipe axial direction. The fastening element 154 provided across multiple points of the push ring 152 along the circumferential direction is operated, so that the sealing material 77 can be pressed against the pressing surface 150 by a pressing part 155 of the push ring 152. Thus, the sealing material 77 can be compressed between the pressing surface 150 and the outer peripheral surface 151 of the spigot 74 to exhibit desired sealing properties.

In addition to the above-described flange 153, a press claw accommodating portion 156 is formed over other multiple points of the push ring 152 along the circumferential direction. An accommodating recess 157 is formed on the inner circumferential part of the push ring 152 in the press claw accommodating portion 156. In the accommodating recess 157, a press claw 158 is accommodated which is formed of ductile cast iron with a constant length along the circumferential direction.

The press claw 158 includes double ridge type claw portions 159a and 159b formed in the inner circumferential portion of the press claw 158. The claw portions 159a and 159b are formed away from each other in the pipe axial direction. As a result, an inner circumferential surface 160 is formed between the claw portions 159a and 159b in a direction parallel to the pipe axis. A tapered surface 161 is formed in the outer peripheral portion of the press claw 158. The diameter of the tapered surface 161 is gradually reduced with distance from the socket 72. Reference numerals 162 and 163 denote the end surfaces of the press claw 158 along the pipe axial direction.

Reference numeral 164 denotes a press bolt which may be also made of ductile cast iron. The press bolt 164 is screwed into the push ring 152 along a direction orthogonal to the tapered surface 161 of the push claw 158, so that the tapered surface 161 can be pressed inward along the pipe diameter direction by the distal end of the press bolt 164.

On the outer peripheries of the pipes 71 and 73 including the socket 72 and the spigot 74, an anticorrosive coating is formed using a Zn—Sn alloy sprayed coating or Zn—Sn—Mg alloy sprayed coating. Further, a synthetic resin coating layer is formed on the outer periphery of the alloy sprayed coating.

Figure 62:
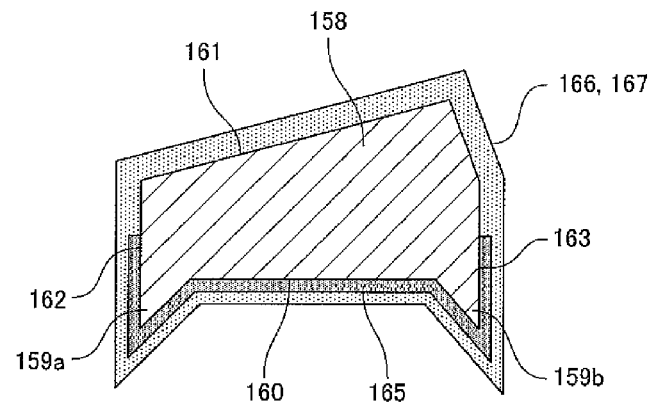
FIG. 62 shows an example of a state of an anticorrosive coating formed on a press claw in the pipe joint of FIG. 61.

As shown in FIGS. 61 and 62, an anticorrosive coating 165 is formed using a sprayed coating also in the inner circumferential portion of the push claw 158, that is, the claw portions 159a and 159b, the inner circumferential surface 160, and the inner circumferential portion of the end surfaces 162 and 163. As the anticorrosive coating 165, a Zn—Sn alloy sprayed coating or a Zn—Sn—Mg alloy sprayed coating may be used similarly to the pipes 71 and 73. Alternatively, as the anticorrosive coating 165 of the press claw 158, a Zn—Al alloy sprayed coating may be used. Further, on the anticorrosive coating 165, a synthetic resin coating is applied over the outer surface of the press claw 158. In FIG. 62, reference numeral 166 denotes a synthetic resin coating layer formed by the application of the synthetic resin coating. Alternatively, instead of the synthetic resin coating layer 166, a coating layer 167 may be formed using heavy coating. The heavy coating includes powder coating, liquid epoxy coating, and tar epoxy coating.

Figure 63:
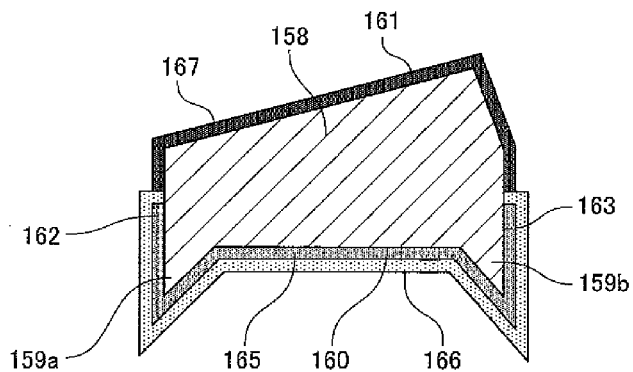
FIG. 63 shows another example of the state of the anticorrosive coating formed on the press claw.

Alternatively, as shown in FIG. 63, the anticorrosive coating 165 is formed in the inner circumferential portion of the press claw 158 using a sprayed coating, the synthetic resin coating film 166 may be formed on the anticorrosive coating 165, and the coating layer 167 may be formed on the outer periphery of the press claw 158 using heavy coating.

Figure 64:
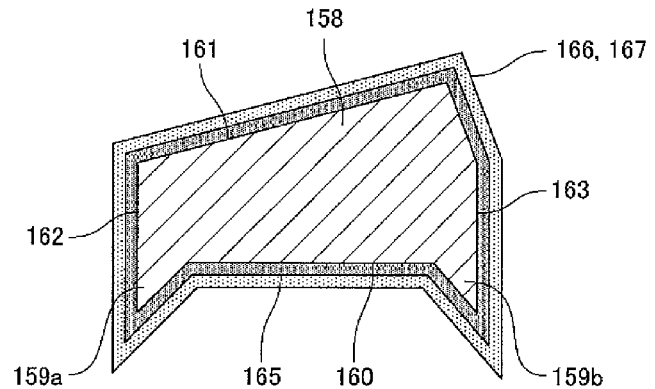
FIG. 64 shows still another example of the state of the anticorrosive coating formed on the press claw.

Further, as shown in FIG. 64, the anticorrosive coating 165 may be formed over the outer surface of the press claw 158 using a sprayed coating, and the synthetic resin coating layer 166 or the coating layer 167 using heavy coating may be formed over the outer surface of the anticorrosive coating 165.

It is necessary to select such a coating used for forming the coating layer 167 using heavy coating that the dried coating layer does not become harder than necessary. If the coating layer becomes excessively hard, the coating layer becomes brittle accordingly, so that peeling off of the coating layer may occur when a large removal force is applied on the pipe joint, thereby remarkably decreasing the corrosion resistance.

The sprayed coatings formed on the press claw 158 and the pipes 71 and 73 will be specifically described.

First, the Zn—Sn alloy sprayed coating will be described. It is preferable that the Zn—Sn alloy sprayed coating contains Sn of over 1 mass-% but less than 50 mass-% and Zn of the balance.

Since the alloy sprayed coating is obtained by adding Sn to Zn which is the essential component, the anticorrosive performance can be improved compared to a sprayed coating using only Zn. The anticorrosive performance may be about the same as Zn-15Al (Zn: 85 mass-%, Al: 15 mass-%). In a case where the content of Sn is not more than 1 mass-% or at least 50 mass-%, the anticorrosive performance cannot be actually improved by the addition of Sn.

The Zn—Sn alloy containing soft Sn has an advantage in that a Zn—Sn alloy wire can be easily made as a material for spraying. Further, the alloy sprayed coating containing only Zn and Sn does not cause hygienic problems even when water supply conduits are constructed by the pipes 71 and 73.

Next, the Zn—Sn—Mg alloy sprayed coating will be described. It is preferable that the sprayed coating contains Sn of over 1 mass-% but less than 50 mass-%, Mg of over 0.01 mass-% but less than 5 mass-%, and Zn of the balance.

Also in this case, the anticorrosive performance can be improved compared to the sprayed coating using only Zn. The anticorrosive performance can be the same as or greater than Zn-15Al (Zn: 85 mass-%, Al: 15 mass-%).

In a case where the content of Sn is not more than 1 mass-% and/or the content of Mg is not more than 0.01 mass-%, the anticorrosive performance cannot be actually improved by the addition of Sn and Mg. Also in a case where the content of Sn is equal to or more than 50 mass-% and/or the content of Mg is equal to or more than 5 mass-%, the anticorrosive performance cannot be actually improved by the addition of Sn and Mg.

The Zn—Sn—Mg alloy also has an advantage in that a wire can be easily made and hygienic problems are not caused, as in the Zn—Sn alloy sprayed coating.

Next, the Zn—Al alloy sprayed coating will be described. As shown in FIG. 61, the press claw 158 provided closer to the outer side of the socket 72 than the sealing material 77 does not contact water in the pipe. Thus, the press claw 158 does not cause any hygienic problems even when the Zn—Al alloy sprayed coating is formed.

It is preferable that the Zn—Al alloy sprayed coating contains Al of over 1 mass-% but less than 30 mass-% and Zn of the balance. Especially, the above-described Zn-15Al (Zn: 85 mass-%, Al: 15 mass-%) can be preferably used. In a case where the content of Al is equal to or less than 1 mass-% or equal to or more than 30 mass-%, the anticorrosive performance cannot be actually improved by the addition of Al.

The above-described alloy sprayed coatings may contain at least any one of Ti, Co, Ni, and P. That is, the alloy sprayed coatings may contain any one or two to four of Ti, Co, Ni, and P. It is preferable that the contents of the elements are each at least 0.001 mass-% but not more than 3 mass-%. If these elements are contained in addition to Sn, Sn—Mg, and Al, the amount of Zn is reduced accordingly.

By containing these elements in the alloy sprayed coatings, the anticorrosive performance can be improved. However, in a case where the contents of the elements are less than 0.001 mass-%, the anticorrosive performance cannot be actually improved by the addition of the elements. Also in a case where the contents of the elements exceed 3 mass-%, the anticorrosive performance cannot be actually improved by the addition of the elements.

Similarly, since the contents of the elements are low, an alloy wire can be made without any difficulties and hygienic problems are not caused.

The alloy sprayed coatings may be porous but the anticorrosive performance can be further improved by sealing the pores.

Next, a method of forming an alloy sprayed coating will be described. As a method for forming an alloy sprayed coating on the surfaces of the pipes 71 and 73 and a method for forming an alloy sprayed coating on the press claw 158, known spraying methods can be adopted. Specifically, the known spraying methods include a method of performing arc spraying using a Zn—Sn wire, a Zn—Sn—Mg wire, a Zn—Al wire (only when an alloy spraying coating is formed on the press claw 158), or a wire obtained by adding at least any one of Ti, Co, Ni, and P to the alloy, and a method of performing spraying using alloy powder instead of a wire.

Instead, the Zn—Sn alloy sprayed coating can be obtained by performing arc spraying using a Zn—Sn wire or a wire obtained by adding at least any one of Ti, Co, Ni, and P to Zn—Sn alloy as a first wire, and a Zn wire as a second wire. Similarly, the Zn—Sn—Mg alloy sprayed coating can be obtained by performing arc spraying using a Zn—Sn—Mg wire or a wire obtained by adding at least any one of Ti, Co, Ni, and P to the Zn—Sn—Mg alloy as a first wire, and a Zn wire as a second wire. The same applies to the Zn—Al alloy sprayed coating.

For example, in order to obtain an alloy sprayed coating containing Zn-25Sn-0.5Mg (Sn: 25 mass-%, Mg: 0.5 mass-%, Zn: balance, hereinafter, may be expressed the same), arc spraying can be performed using a Zn-50Sn-1.0Mg wire and a Zn wire in equal amounts, instead of using two Zn-25Sn-0.5Mg wires.

Thus, the anticorrosive performance can be further improved. Moreover, the amount of a Zn—Sn—Mg wire used can be reduced to half, so that a cost required for mixing can be reduced.

It is not clear why the anticorrosive performance can be further improved by adopting such spraying methods, but the improvement can be thought to be due to (i), (ii and (iii) described below or a synergy effect of them.

(i) For example, in a case where arc spraying is performed using a Zn—Sn—Mg alloy wire and a Zn wire, the Zn—Sn—Mg alloy and Zn are distributed in the formed sprayed coating. At this point, since the Zn—Sn—Mg alloy has a lower potential than the Zn, the Zn—Sn—Mg alloy is preferentially dissolved out when the Zn—Sn—Mg alloy and the Zn serve as a sacrificial anode. The dissolved Zn—Sn—Mg alloy forms, on the surface of the coating, another coating which is relatively stable. The improvement of the anticorrosive performance can be thought to be because the other coating suppresses the consumption and dissolution of the Zn—Sn—Mg alloy and the Zn.

(ii) The improvement of the anticorrosive performance can be thought to be because the Zn in the coating physically prevents the dissolution of the Zn—Sn—Mg alloy, and when the Zn—Sn—Mg alloy is dissolved, the corrosion product suppresses the dissolution of the Zn.

(iii) The present inventors observed that the porosity of the Zn-25Sn-0.5Mg sprayed coating obtained by using two Zn-25Sn-0.5Mg wires was about 15%. Meanwhile, the porosity of the Zn-25Sn-0.5Mg sprayed coating obtained by using a Zn-50Sn-1.0Mg wire and a Zn wire in equal amounts was about 12%. That is, since the latter porosity is lower, the anticorrosive performance can be considered to be improved. The lower porosity may be because different wires in hardness were used such that the Zn-50Sn-1.0Mg wire was softer than the Zn wire.

According to the present invention, it is preferable that a Zn—Sn alloy sprayed coating or a Zn—Sn—Mg alloy sprayed coating is formed and heated at least the eutectic temperature of alloy (198° C.) but less than the melting point. Such heating is performed, so that the anticorrosive performance can be further improved. This is presumed to be because heating is performed at a temperature in excess of the eutectic temperature of the Zn—Sn alloy or the Zn—Sn—Mg alloy to dissolve only Sn, thereby filling minute pores generated in the sprayed coating to prevent electrolytes from entering the coating when the cast iron pipes are buried in the ground.

Therefore, the Sn does not actually dissolve by heating at a temperature less than the eutectic temperature, and the above-described effect cannot be achieved. Conversely, if the heating temperature is not less than the melting point of the alloy sprayed coating, the alloy is further oxidized to lose the original anticorrosive performance.

The heating time is not particularly limited but is preferably 1 second to 60 minutes. When the heating time is shorter than this range, necessary heating is not sufficiently performed.

As described above, the coating layers 166 and 167 are formed after the alloy sprayed coating is formed.

As shown in FIGS. 62 to 64, the coating layer 166 or 167 forms a coating layer having high electrical insulation performance on a part of the press claw 158 on the outer peripheral portion, that is, the tapered surface 161. Thus, the press bolt 164 and the press claw 158 are insulated from each other, so that the press bolt 164 and the press claw 158 can be prevented from being electrically connected to each other to avoid corrosion due to electrical connection. As described above, when the coating layer 167 is formed by heavy coating on the outer periphery of the press claw 158, electrical insulation can be particularly favorably achieved.

In order that the coating layers 166 and 167 may not be damaged to inhibit the electrical insulation when the press claw 158 is pressed by the press bolt 164, a sheet material may be disposed between the press bolt 164 and the press claw 158. A sheet material made of metal can reliably prevent the coating layers 166 and 167 from being damaged. Alternatively, a sheet material made of resin can achieve insulation between the press bolt 164 and the press claw 158.

When the pipes 71 and 73 are joined to each other, the spigot 74 is inserted into the socket 72 with the push ring 152 accommodating the press claw 158 and the sealing material 77 externally fitted. Next, the push ring 152 is fastened to the socket 72 by the fastening element 154, so that the pressing part 155 compresses the sealing material 77 to exhibit desired sealing properties. After that, when the press bolt 164 is tightened up, the claw portions 159a and 159b of the press claw 158 cut into the outer peripheral surface of the spigot 74. Thus, the spigot 74 is integrated with the socket 72 by the press claw 158, the press bolt 164, the push ring 152, and the fastening element 154, to exert a desired detachment preventive function.

When a large removal force is applied between the socket 72 and the spigot 74 in the event of an earthquake, the tapered surface 161 causes the claw portions 159a and 159b of the press claw 158 to forcefully cut into the outer peripheral surface of the spigot 74, thereby resisting the removal force.

In such a case, the distal ends of the claw portions 159a and 159b of the press claw 158 and the inner circumferential surface 160 may be damaged, but an anticorrosion effect can be reliably obtained by the anticorrosive coatings of sprayed coatings formed on the pipes 71 and 73 and the anticorrosive coating 165 of a sprayed coating formed on the press claw 158. For example, when the distal ends of the claw portions 159a and 159b cut into the outer surface of the spigot 74 with a large removal force applied, the coating layer on portions into which the distal ends cut peels off, and then the portions generally corrode to cause water leakage due to the perforation corrosion of the pipe wall and inhibit the desired detachment preventive function. However, according to the present invention, since anticorrosive coatings of sprayed coatings are formed on the pipes 71 and 73 and the press claw 158, even when the coating layer peels off, the anticorrosive coatings impede the progress of corrosion.

In the above description, the anticorrosive coatings of sprayed coatings are formed on both the pipes 71 and 73 and the press claw 158. According to the present invention, the anticorrosive coating 165 has only to be formed on at least the press claw 158. The pipes 71 and 73 may have, for example, the above-described coating layer formed by heavy coating rather than a sprayed coating, as long as the coating layer exhibits a desired anticorrosive performance.

On the push ring 152, a highly anticorrosive coating layer can be formed by powder coating or epoxy resin coating to prevent the corrosion of the push ring 152 a result, it is possible to reduce the amounts of the anticorrosive coating 165 of a sprayed coating on the press claw 158 and the anticorrosive coatings of sprayed coatings on the pipes 71 and 73, serving as a sacrificial anode for anticorrosion.

Figure 65:
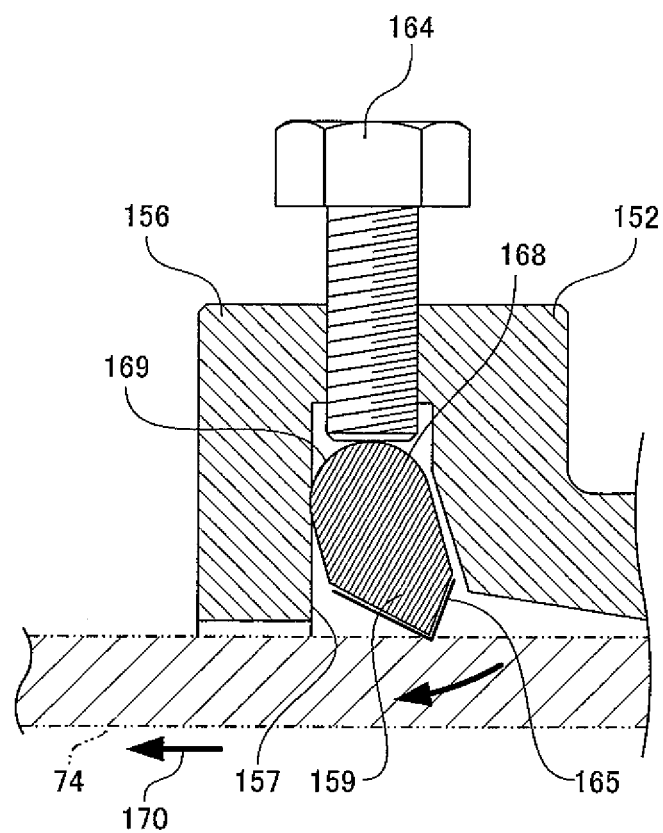
FIG. 65 shows a modification example of the pipe joint of FIG. 61.

FIG. 65 shows a modification example of the press claw. On a press claw 168 of FIG. 65, as on the above-described press claw 158, an outer peripheral surface 169 is formed which has a semicircular transverse section, instead of the tapered surface 161. A claw portion 159 has a single ridge.

In this case, when a large removal force 170 is applied between the socket 72 and the spigot 74, the removal force acts such that the press claw 168 rises up from the state of FIG. 65. Thus, the claw portion 159 significantly cuts into the spigot 74 to exert a desired detachment preventive function.

Also in this case, on the inner circumferential part of the press claw 168, that is, on and around the claw portion 159, an anticorrosive coating 165 of a sprayed coating is formed to exert the same anticorrosive function.

In the above description, the press claw accommodating portion 156 and the accommodating recess 157 are formed on the push ring 152 as a separate annular member from the socket 72. However, instead of this configuration, the press claw accommodating portion 156 and the accommodating recess 157 may be formed on the inner circumference closer to the opening side of the socket 72 than the accommodating portion of the sealing material 77 on the socket 72, the press claws 158 and 168 may be accommodated in the press claw accommodating portion 156 and the accommodating recess 157, and the press bolt 164 may be screwed in from the outer surface side of the socket 72.

As described in Japanese Patent Application Laid-Open No. 2009-138737 of the present applicant, when a pipe for a detachment preventive pipe joint having an annular projection on the outer periphery of the distal end of a spigot is cut to have a desired length, the socket of another pipe having a socket-spigot structure is joined to the end of the cut pipe. An annular projection for detachment prevention is formed on the outer periphery of the spigot of the other pipe. When the total length of the cut pipe and the other pipe is the above-described desired length, a pipe can be configured which is shorter than a standard length with the same detachment preventive function as a pipe having the standard length. In this case, according to the present invention, the end of the cut pipe and the socket of the other pipe can be joined to each other with the detachment preventive structure having the above-described press claw of the present invention.

Results of a corrosion test actually conducted will be described.

Experimental Examples 1, 2

The detachment preventive pipe joint of FIG. 61 was used which includes the pipes 71 and 73, the push ring 152, the press claw 158, and the press bolt 164 all made of ductile cast iron. The pipes 71 and 73 had a nominal diameter D of 75 mm. A Zn—Sn—Mg alloy sprayed coating was formed with a thickness of about 50 μm on the outer peripheries of the pipes 71 and 73. After filling the pores of the coating, a synthetic resin coating layer was formed with a thickness of about 100 μm on the outer surface of the coating.

As shown in FIG. 62, the Zn—Sn—Mg alloy sprayed coating 165 was formed with a thickness of about 50 μm on the inner circumferential part of the press claw 158, the filling of the pores was performed on the coating 165, and the synthetic resin coating layer 166 was formed with a thickness of about 100 μm so as to cover the entire outer surface of the press claw 158 including the alloy sprayed coating 165 (Experimental Example 1).

Further, instead of the synthetic resin coating layer 166 of Experimental Example 1, an epoxy resin powder coating layer which was the coating layer 167 obtained by heavy coating was formed with a thickness of about 300 μm, so as to cover the entire outer surface of the press claw 158 including the sprayed coating 165 (Experimental Example 2).

Electrical insulation was provided between the press bolt 164 and the press claw 158 by the coating layers 166 and 167 or by interposing an insulating sheet between the press bolt 164 and the press claw 158 as necessary.

In the detachment preventive pipe joints of Experimental Examples 1 and 2 thus obtained, as described above, when the pipes 71 and 73 had the diameter D [mm] and a removal force of 3D [kN] was applied to the joint portion, the coating layer 166 or 167 obtained by coating and the sprayed coating 165 peeled off on the claw portions 159a and 159b of the press claw 158, but peeling-off was not found on other portions.

After the removal force of 3D [kN] was applied in this way, a cyclic corrosion test (by means of Society of Automotive Engineers of Japan, Inc. (antifreezing agent to be tested), JASO M609, 610) was conducted on the pipe joints of Experimental Examples 1 and 2. Specifically, a cycle of the following conditions was repeated.

(1) salt spray (two hours, 35±1° C., 5% NaCl solution)
(2) dry condition (four hours, 60±1° C., 20 to 30±5% RH)
(3) wet condition (two hours, 50±1° C., >95% RH)

After the test had been continued for four months, red rust was not observed with the naked eye on the press claw 158 and the claw portions 159a and 159b, and on the pipe 71 near the press claw 158 in both of the detachment preventive pipe joints of Experimental Examples 1 and 2.

Experimental Example 3

Compared to Experimental Example 1, the Zn—Sn—Mg alloy sprayed coating 165 was formed with a thickness of about 50 μm on the inner circumferential part of the press claw 158 as shown in FIG. 63, sealing was performed on the coating 165, and the synthetic resin coating layer 166 was formed with a thickness of about 100 μm on the outer surface of the coating 165. Further, on a portion of the press claw 158 where the coating 165 and the synthetic resin coating layer 166 were not formed, that is, the outer peripheral part of the press claw 158, an epoxy resin powder coating layer was formed as the coating layer 167 obtained by heavy coating with a thickness of about 300 μm. Other configurations were the same as those in Experimental Example 1.

Under such conditions, similarly to Experimental Example 1, when a removal force of 3D [kN] was applied to the joint portion, the coating layer 166 obtained by coating and the sprayed coating 165 peeled off on the claw portions 159a and 159b of the press claw 158 but did not peel off on the other portions. Further, the above-described cyclic corrosion test was conducted on the pipe joint with a removal force applied thereto and had been continued for four months. After that, red rust was not observed with the naked eye on the press claw 158 and the claw portions 159a and 159b, and on the pipe 71 near the press claw 158.

Experimental Examples 4 and 5

Compared to Experimental Example 1, as shown in FIG. 64, the Zn—Sn—Mg alloy sprayed coating 165 was formed with a thickness of about 50 μm so as to cover the entire outer surface of the press claw 158, and the filling of the pores was performed on the coating 165. Other configurations were the same as those in Experimental Example 1 (Experimental Example 4).

Compared to Experimental Example 2, as shown in FIG. 64, the Zn—Sn—Mg alloy sprayed coating 165 was formed with a thickness of about 50 μm so as to cover the entire outer surface of the press claw 158, and sealing was performed on the coating 165. Other configurations were the same as those in Experimental Example 2 (Experimental Example 5).

Under such conditions, when a removal force of 3D [kN] was applied to the joint portion, the coating layer 166 or 167 obtained by coating and the sprayed coating 165 peeled off on the claw portions 159a and 159b of the press claw 158 but did not peel off in the other portions. Further, after the above-described corrosion test had been conducted on the pipe joint with a removal force applied thereto and continued for four months, red rust was not observed with the naked eye on the press claw 158 and the claw portions 159a and 159b and on the pipe 71 near the press claw 158.

Comparative Examples 1 and 2

Compared to Experimental Example 1, the press claw 158 did not have an alloy sprayed coating formed thereon but had only the synthetic resin coating layer 166 formed with a thickness of about 100 μm thereon. Other configurations were the same as those in Experimental Example 1 (Comparative Example 1).

Compared to Experimental Example 2, the press claw 158 did not have an alloy sprayed coating formed thereon but had only an epoxy resin powder coating layer which is the coating layer 167 obtained by heavy coating with a thickness of about 300 μm. Other configurations were the same as those in Experimental Example 2 (Comparative Example 2).

Under such conditions, in both of Comparative Examples 1 and 2, when a removal force of 3D [kN] was applied to the joint portion, the coating layer 166 or 167 by coating peeled off on the claw portions 159a and 159b of the press claw 158 but did not peel off on the other portions.

However, when the above-described cyclic corrosion test had been conducted on the pipe joint with a removal force applied thereto, in Comparative Example 1, red rust was found on the entire press claw 158 in two weeks after the beginning of the test, while in Comparative Example 2, red rust was found on the claw portions 159a and 159b of the press claw 158 in two weeks after the beginning of the test.

Comparative Example 3

Compared to Experimental Example 1, a Zn sprayed coating was formed with a thickness of about 20 μm on the outer peripheries of the pipes 71 and 73, and a synthetic resin coating layer was formed with a thickness of about 100 μm on the outer surface of the sprayed coating. The press claw 158 did not have an alloy sprayed coating formed thereon but had only the synthetic resin coating layer 166 formed with a thickness of about 100 μm. Other configurations were the same as those in Experimental Example 1.

Under such conditions, similarly to Experimental Example 1, when a removal force of 3D [kN] was applied to the joint portion, the coating layer 166 peeled off on the claw portions 159a and 159b of the press claw 158 but did not peel off on the other portions.

However, when the above-described cyclic corrosion test had been conducted on the pipe joint with a removal force applied thereto, red rust was found on the entire press claw 158 in a week after the beginning of the test.

FIGS. 66 to 79 show still another embodiment of the present invention.

Figure 66:
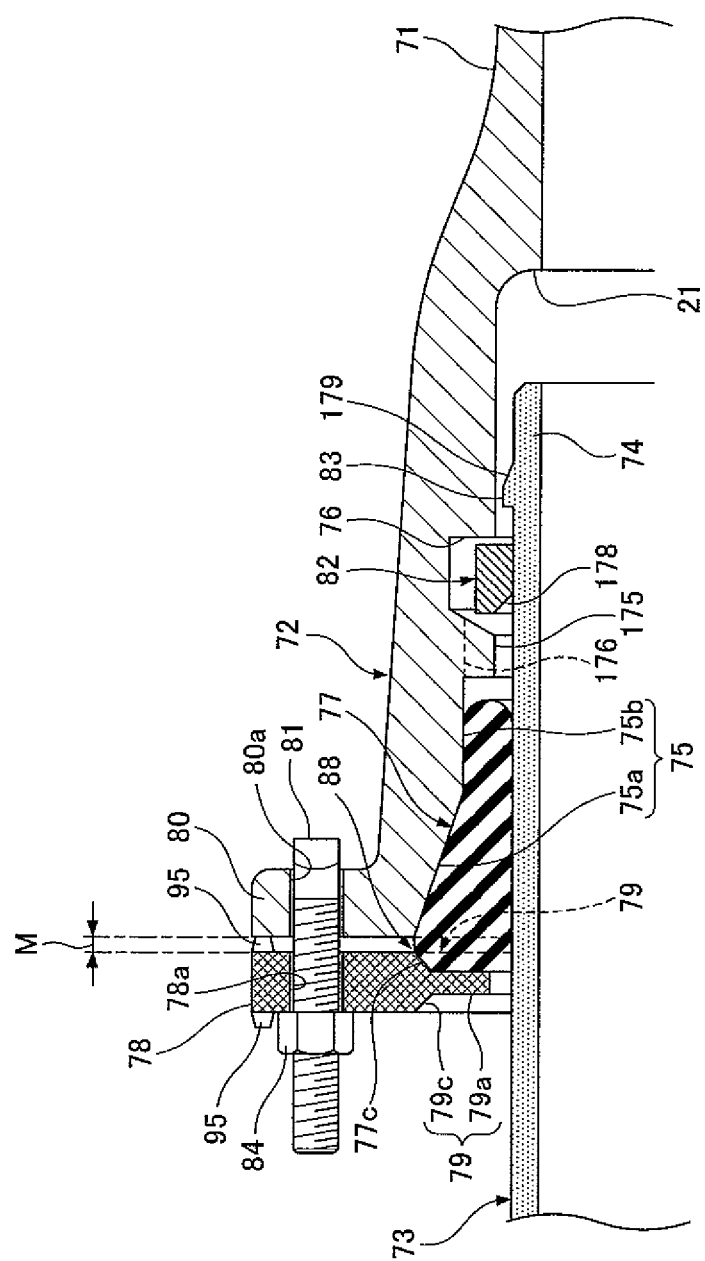
FIG. 66 is a cross-sectional view showing a pipe joint according to another embodiment of the present invention.

FIG. 66 shows a mechanical-type pipe joint according to the embodiment. The pipe joint has the same configuration as that of the pipe joint having a detachment preventive function or earthquake-proof function shown in FIGS. 30 and 40. The present embodiment is applicable to the slip-on type pipe joint shown in FIG. 1.

Figure 67:
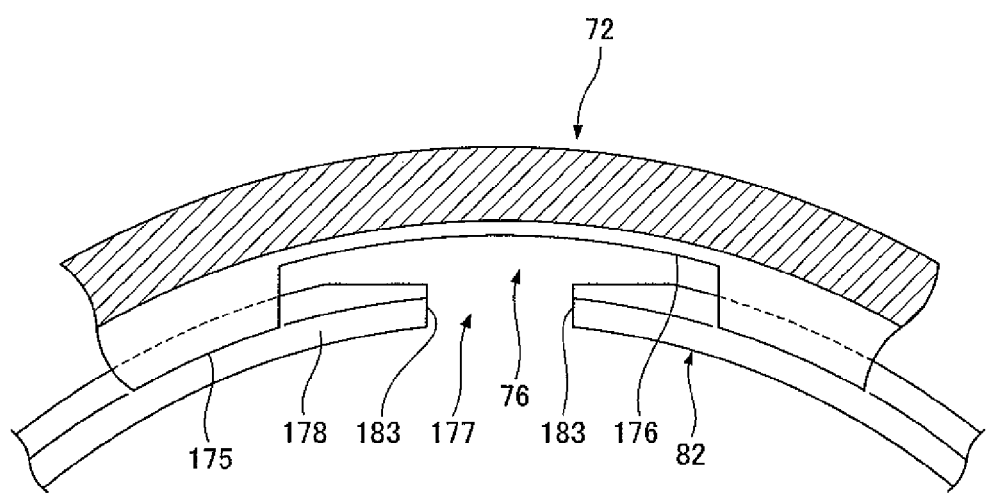
FIG. 67 is a side view enlargedly showing the essential part of the pipe joint of FIG. 66.
Figure 68:
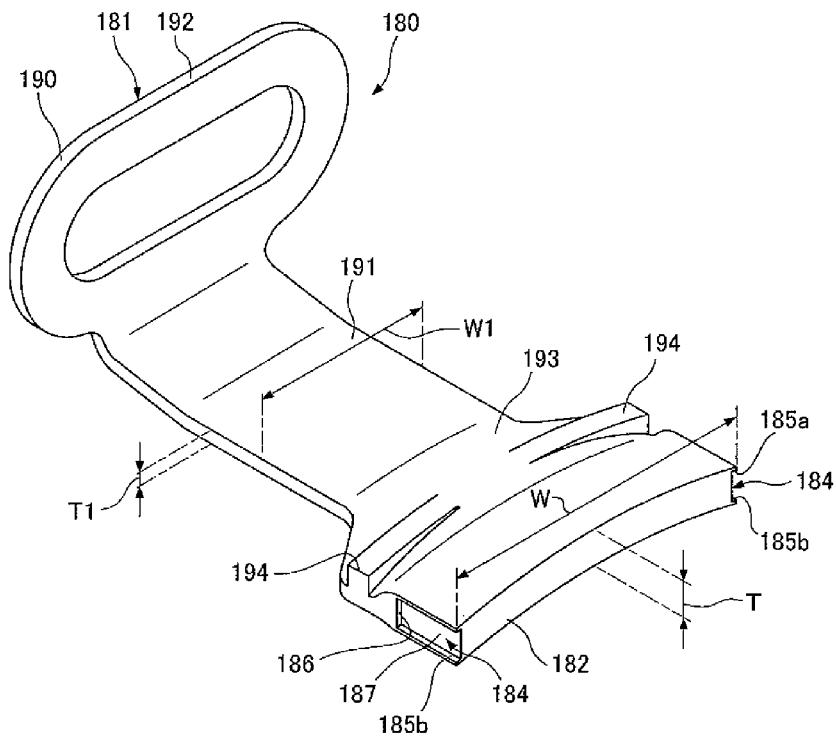
FIG. 68 is a three-dimensional view showing a spacer which can be used in the pipe joint of FIG. 66.

In the pipe joint of FIG. 66, an inner circumferential protrusion 175 is formed between a sealing material accommodating portion 75 and a lock ring accommodating groove 76. The inner circumferential protrusion 175 protrudes inward along the pipe diameter direction and is formed over the periphery of a socket 72 to form the lock ring accommodating groove 76. As shown in FIGS. 66 and 67, in a proper position along the circumferential direction of the inner circumferential protrusion 175, an arc-like cut-out portion 176 is formed to have the lock ring accommodating groove 76 communicating with the opening side of the socket 72. The end of a sealing material 77 on the socket inner side is placed between the inner circumferential protrusion 175 and the opening side of the socket 72 without contacting the inner circumferential protrusion 175.

As shown in FIG. 67, a lock ring 82 is an annular member having a divided part 177 at one point in the circumferential direction. On the inner circumference of the end of the lock ring 82 on the opening side of the socket 72, a tapered surface 178 is formed which expands towards the opening side of the socket 72.

A protrusion 83 on the outer periphery of the distal end portion of a spigot 74 is formed at a predetermined distance from the distal end surface of the spigot 74. In other words, a straight pipe portion is formed between the protrusion 83 and the distal end surface of the spigot 74. A tapered surface 179 is formed on the outer periphery of the protrusion 83 on the spigot distal end side.

When a compression force is applied in the pipe axial direction to the pipe joint due to an earthquake, the protrusion 83 of the spigot 74 can move from the position of a lock ring 82 towards an inner end surface 21 of the socket 72. Further, when a tensile force is applied to the pipe joint, the protrusion 83 is engaged with the lock ring 82 from the inner side of the socket 72, so that the spigot 74 can be reliably prevented from being detached from the socket 72. Thus, the pipe joint as in the illustration is provided with an earthquake-proof function.

When the socket 72 of one pipe 71 and the spigot 74 of another pipe 73 are joined to each other, the lock ring 82 is maintained to elastically have an expanded diameter such that the protrusion 83 of the spigot 74 can easily pass through the lock ring 82. Thus, a spacer 180 is used to maintain the lock ring 82 to elastically have an expanded diameter. The following will describe the spacer 180.

As shown in FIGS. 68 to 74, the spacer 180 is made of a synthetic resin such as polycarbonate, and integrally includes a handle 181 and a maintaining portion 182 for maintaining the diameter of the lock ring 82 in an expanded state. The maintaining portion 182 can be freely inserted into or removed from the socket 72 through the opening of the socket 72, and can be interposed between two end surfaces 183, 183 in the circumferential direction of a lock ring constituting member at the divided part 177, shown in FIGS. 67 and 70, of the diameter-expanded lock ring 82 accommodated in the lock ring accommodating groove 76 of FIG. 66. The lock ring 82 is maintained to elastically have an expanded diameter with the maintaining portion 182 interposed thus. The spacer 180 can be passed through a gap between the socket 72 and the spigot 74 and be removed out of the socket 72 when the spigot 74 is inserted into the socket 72.

The maintaining portion 182 is formed in an arc shape corresponding to the cut-out portion 176. As shown in FIGS. 68 to 74, on two side portions of the maintaining portion 182 along the width direction, that is, the pipe circumferential direction at the distal end of the maintaining portion 182, insertion grooves 184 are formed in the pipe axial direction. The insertion grooves 184 are opened at the distal end portions of the maintaining portion 182 and the lateral side portions in the width direction thereof. Thus, the maintaining portion 182 includes a pair of guiding surfaces 185a and 185b facing each other in the thickness direction, that is, the pipe diameter direction, regulating surfaces 186 constituted by the end walls of the insertion grooves 184, and groove bottom surfaces 187.

Figure 69:
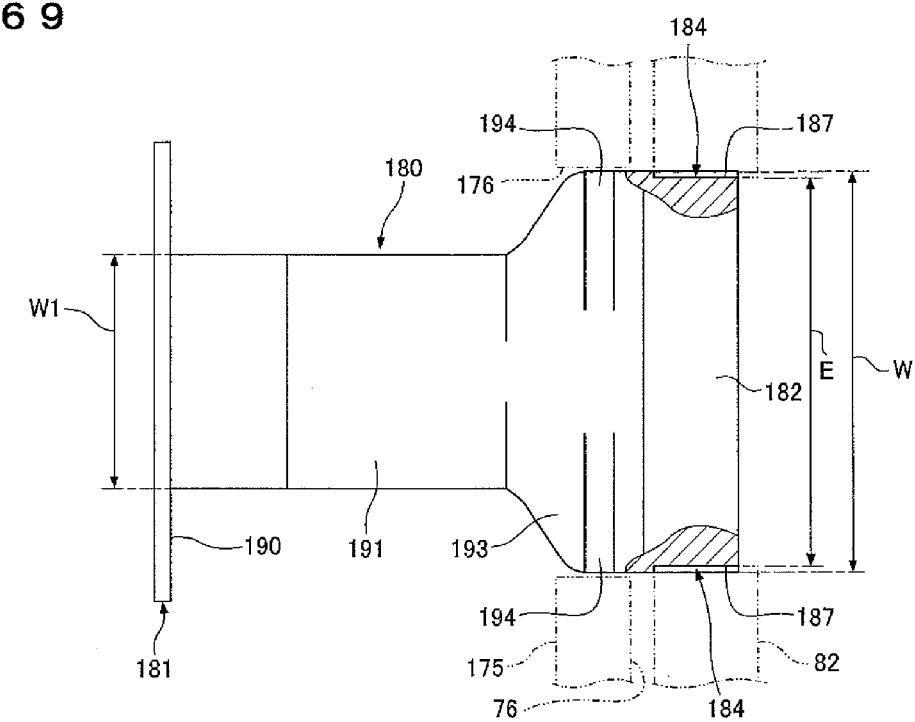
FIG. 69 is a plane view showing the spacer of FIG. 68.
Figure 72:
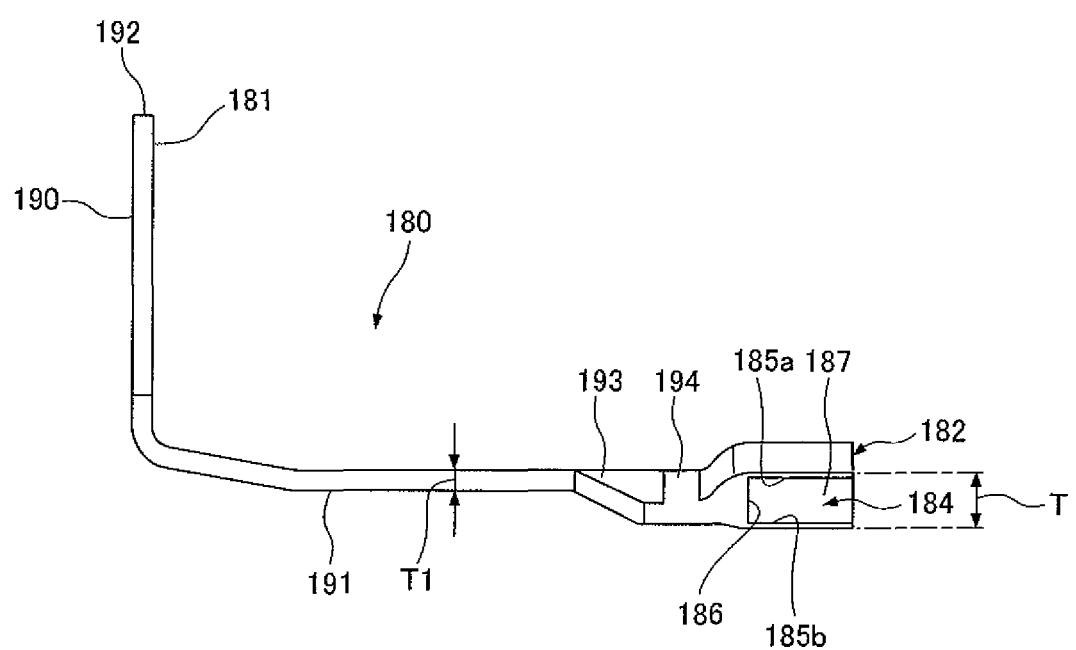
FIG. 72 is a front view showing the spacer of FIG. 69.
Figure 73:
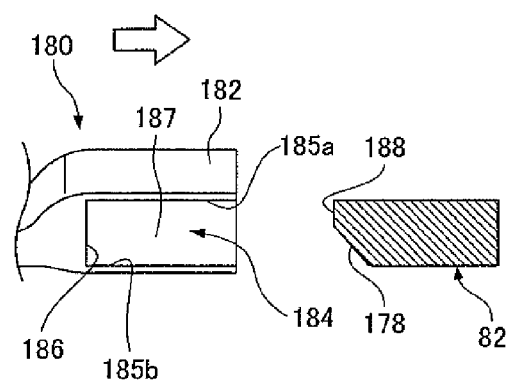
FIG. 73 shows the essential part of the spacer of FIG. 72.
Figure 74:
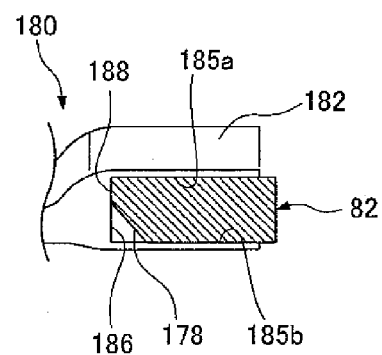
FIG. 74 is another drawing showing the essential part of the spacer of FIG. 72.

When the maintaining portion 182 of the spacer 180 is inserted into the divided part 177 of the lock ring 82, the two end portions of the constituting member of the lock ring 82 at the divided part 177 of the lock ring 82 are fitted into the insertion grooves 184, as shown in FIGS. 69 and 74. When the two end portions of the constituting member of the lock ring 82 are fitted into the insertion grooves 184, the regulating surfaces 186 hit against an end surface 188 on the socket opening side of the lock ring 82 to regulate the further movement of the spacer 180 as shown in FIG. 74. As shown in FIGS. 70 and 71, when the two end portions of the member at the divided part 177 of the lock ring 82 are fitted into the insertion grooves 184, 184 of the spacer 180, the groove bottom surfaces 187 of the insertion grooves 184 are brought into surface contact with the end surfaces 183 of the lock ring 82.

The groove bottom surfaces 187, 187 of the insertion grooves 184, 184 are parallel to each other. Face-to-face dimension E of the groove bottom surfaces 187, 187 shown in FIG. 69 is set in such a range that the diameter of the lock ring 82 can be expanded to allow the protrusion 83 of the spigot 74 to smoothly pass through the lock ring 82, and the lock ring 82 can be elastically reduced in diameter and be restored to the original state when the spacer 180 is removed.

Thickness T of the maintaining portion 182 of the spacer 180 is set such that the maintaining portion 182 has a sufficient strength to withstand a tightening force as a reaction force from the lock ring 82 whose diameter is elastically expanded by the spacer 180.

The handle 181 has an annular grip 190 exposed outside from the opening of the socket 72, and a connecting portion 191 connecting the grip 190 and the maintaining portion 182. As shown in FIG. 75, a distal end portion 192 of the grip 190 in the pipe diameter direction is located more inward in the pipe diameter direction than the outer peripheral surface of a flange 80 of the socket 72. The grip 190 is formed like a plate having a hole, and as shown in FIG. 75, can be placed parallel to the end surface of the flange 80. Width W1 of the connecting portion 191 is smaller than width W of the maintaining portion 182. Thickness T1 of the connecting portion 191 is smaller than the thickness T of the maintaining portion 182.

Reference numeral 193 denotes the linking portion of the connecting portion 191 and the maintaining portion 182, and the width dimension of the linking portion gradually increases from the connecting portion 191 towards the diameter-expanded maintaining portion 182.

Figure 76:
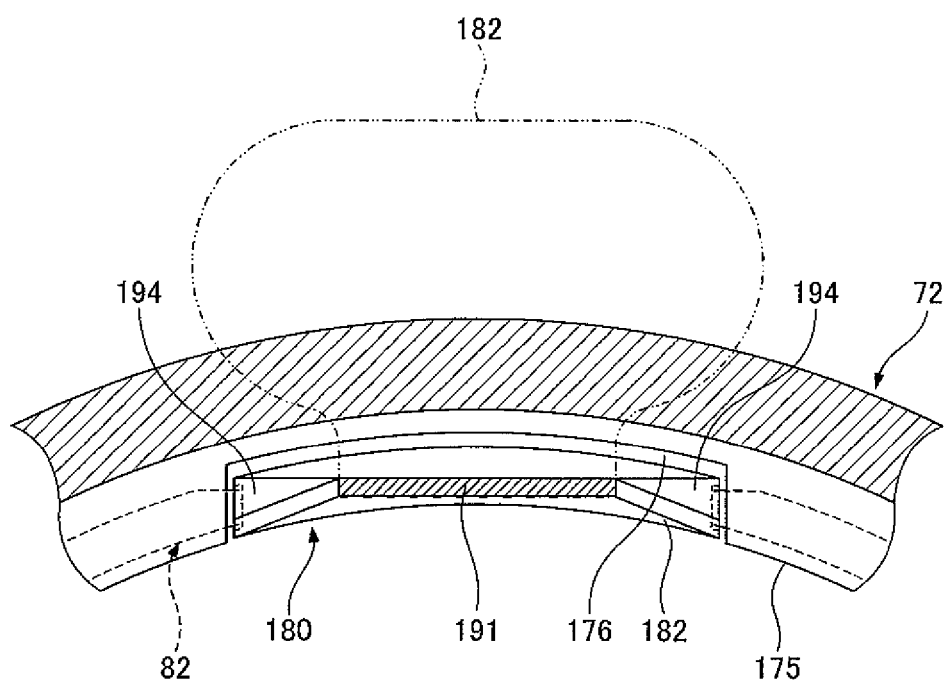
FIG. 76 is a cross-sectional view showing the essential part of the pipe joint of FIG. 75.

As shown in FIGS. 76 to 78, the maintaining portion 182 of the spacer 180 can pass by the cut-out portion 176 of the inner circumferential protrusion 175 of the socket 72 in the pipe axial direction and enter the lock ring accommodating groove 76. The spacer 180 integrally has a displacement preventive portion 194 formed in accordance with the dimension of the cut-out portion 176 to prevent the spacer 180 from being displaced in the circumferential direction of the pipe when the diameter-expanded maintaining portion 182 enters the lock ring accommodating groove 76. The displacement preventive portion 194 protrudes outward in the pipe diameter direction from the linking portion 193 in the vicinity of the maintaining portion 182.

The operation of joining the socket 72 and the spigot 74 using the spacer 180 having such a configuration will be described.

Before the pipes 71 and 73 separated from each other are shipped to a piping construction site, as shown in FIG. 67, the lock ring 82 has been accommodated in the accommodating groove 76 of the socket 72, and the divided part 177 of the lock ring 82 along the pipe circumferential direction has been aligned with the cut-out portion 176 of the socket 72. As shown in FIG. 79, the distal end portion of a scissors-like lock ring diameter expansion member 195 is inserted into the divided part 177 of the lock ring 82, and the lock ring diameter expansion member 195 is opened, so that the inner diameter of the lock ring 82 is expanded to be larger than the outer diameter of the protrusion 83 of the spigot 74.

In this state, as shown in FIGS. 76 and 77, the maintaining portion 182 of the spacer 180 is caused to pass by the cut-out portion 176 of the protrusion 175 from the opening end of the socket 72 and is inserted into the divided part 177 of the lock ring 82. Thereafter, the lock ring diameter expansion member 195 of FIG. 79 is taken off from the lock ring 82. Thus, as shown in FIGS. 70 and 75, the lock ring 82 is maintained to have an expanded diameter by the spacer 180.

At this point, as in the illustration, the two end portions of the lock ring constituting member at the divided part 177 of the lock ring 82 are inserted into the insertion grooves 184 of the spacer 180. Thus, misalignment of the spacer 180 and the lock ring 82 is prevented in the pipe axial direction and the pipe diameter direction, so that the diameter-expanded maintaining portion 182 of the spacer 180 can be set at a normal position of the divided part 177 of the lock ring 82 without misalignment.

Further, since the displacement preventive portion 194 of the spacer 180 is fitted into the cut-out portion 176 of the protrusion 175, the spacer 180 is prevented from being displaced in the circumferential direction with respect to the cut-out portion 176.

With the spacer 180 set thus to maintain the lock ring 82 in the diameter-expanded state, the pipes 71 and 73 separated from each other are shipped from a manufacturing facility. While the shipped pipes 71 and 73 are transported to a destination where a pipeline is to be constructed, since the distal end portion 192 of the grip 190 of the spacer 180 recedes more inward in the pipe diameter direction than the outer peripheral surface of the flange 80 of the socket 72, the spacer 180 can be prevented from hitting against a foreign matter and being damaged or falling off.

Thereafter, the pipes 71 and 73 are joined to each other at the piping construction site. At this point, as shown in FIG. 75, the protrusion 83 of the spigot 74 inserted into the socket 72 passes inside the diameter-expanded lock ring 82. At this point, the tapered surface 179 of the protrusion 83 and the tapered surface 178 of the lock ring 82 interact with each other to allow smooth passage of the protrusion 83.

When the protrusion 83 passes inside the lock ring 82 and reaches the inner side of the socket 72 beyond the lock ring 82, an operator holds the grip 190 of the spacer 180, pulls the grip 190 out from the opening end of the socket 72, and pulls the spacer 180 out from the socket 72 through the gap between the socket 72 and the spigot 74. At this point, since the insertion grooves 184 have the ends on the inner side of the socket 72 opened as in the illustration, the spacer 180 can move in the pull-out direction without any troubles. As a result, as indicated by the virtual line of FIG. 75 and FIG. 78, the maintaining portion 182 is removed out from the divided part 177 of the lock ring 82. Consequently, the diameter-expanded state of the lock ring 82 is released, and as shown in FIG. 66, the lock ring 82 is elastically reduced in diameter and is pressed against the outer periphery of the spigot 74.

After the spacer 180 is removed out thus, as shown in FIG. 66, the sealing material 77 and a push ring 78 are moved along the outer surface of the spigot 74 to a predetermined position, and a bolt 81 and a nut 84 are tightened up. Thus, the push ring 78 presses the sealing material 77, the sealing material 77 accommodated in the accommodating portion 75 seals the joint portion, and the pipes 71 and 73 are joined to each other.

The operation of joining the pipes at the piping construction site is completed.

The cut-out portion 176 can be formed at least one position along the circumferential direction of the inner circumferential protrusion 175 of the socket 72.

In the illustration, only the lock ring 82 is accommodated in the lock ring accommodating groove 76 but in addition to the lock ring 82, a centering rubber member 23 of FIG. 1 or a centering member 111 of FIGS. 45 to 49 may be accommodated in the lock ring accommodating groove 76.

The invention claimed is:

1. A pipe joint in which a spigot formed at an end of one pipe is inserted into a socket formed at an end of another pipe, the pipes being joined to each other, the pipe joint comprising:
a lock ring accommodating groove formed on an inner circumference of the socket;
a lock ring accommodated in the accommodating groove and singularly divided in a circumferential direction;
an annular centering member disposed between an inner circumferential surface of the accommodating groove and an outer peripheral surface of the lock ring, for holding the lock ring centered with respect to the socket when the spigot is not inserted into the socket; and
a protrusion which is formed on an outer periphery of a distal end of the spigot, is capable of elastically pushing out the lock ring accommodated in the accommodating groove with the spigot inserted into the socket in a pipe diameter direction to pass through an inner circumference side of the lock ring, and is capable of being engaged with the lock ring from an inner side of the socket when a detachment force is applied in a pipe axial direction between the socket and the spigot joined to each other to prevent the spigot from being detached from the socket,
the centering member including a plurality of divided parts in a pipe circumferential direction, and a connecting part connecting the adjacent divided parts in the pipe circumferential direction,
the divided part including a holder holding the lock ring from an outer peripheral side, and a hold width protruding inward in the diameter direction from a socket inner side portion of the holder so as to be engaged with the lock ring in the pipe axial direction, wherein
the connecting part is disposed closer to an outer peripheral side than the divided parts and is elastically deformable in the pipe diameter direction in response to the elastically pushed-out lock ring.

2. The pipe joint according to claim 1, wherein the connecting part is arc-shaped, and one end and another end of the arc are connected respectively to the pair of adjacent divided parts in the pipe circumferential direction.

3. The pipe joint according to claim 1, wherein an inner circumferential protrusion for forming the lock ring accommodating groove is formed closer to the inner side of the socket than the lock ring accommodating groove, and in the divided part, the hold width protrudes more inward in the pipe diameter direction than the inner circumferential protrusion when the holder holds the lock ring from the outer peripheral side before the spigot is inserted into the socket.

4. An annular centering member in a pipe joint in which a spigot formed at an end of one pipe is inserted into a socket formed at an end of another pipe, the pipes being joined to each other, the centering member being disposed between an inner circumferential surface of a lock ring accommodating groove formed on an inner circumference of the socket and an outer peripheral surface of a lock ring accommodated in the accommodating groove and singularly divided in a circumferential direction, for holding the lock ring centered with respect to the socket when the spigot is not inserted into the socket, the spigot including a protrusion on an outer periphery of the spigot, wherein the protrusion is capable of elastically pushing out the lock ring accommodated in the accommodating groove with the spigot inserted into the socket to pass through an inner circumferential side of the lock ring, and is capable of being engaged with the lock ring from an inner side of the socket when a detachment force is applied in a pipe axial direction between the socket and the spigot joined to each other to prevent the spigot from being detached from the socket, the centering member includes a plurality of divided parts in a pipe circumferential direction and a connecting part connecting the adjacent divided parts in the pipe circumferential direction, the divided part includes a holder holding the lock ring from an outer peripheral side, and a hold width protruding inward in the diameter direction from a socket inner side portion of the holder so as to be engaged with the lock ring in the pipe axial direction, and the connecting part is disposed closer to an outer peripheral side than the divided parts and is elastically deformable in the pipe diameter direction in response to the elastically pushed-out lock ring.

\* \* \* \* \*